(12) United States Patent
Sollami

(10) Patent No.: US 6,817,429 B2
(45) Date of Patent: Nov. 16, 2004

(54) ROOF BIT CARBIDE BLADE

(76) Inventor: Jimmie Sollami, 1017 Weaver Rd., Herrin, IL (US) 62948

( * ) Notice: Subject to any disclaimer, the term of this patent is extended or adjusted under 35 U.S.C. 154(b) by 0 days.

(21) Appl. No.: 10/264,121

(22) Filed: Oct. 3, 2002

(65) Prior Publication Data
US 2004/0065483 A1 Apr. 8, 2004

(51) Int. Cl.$^7$ ............................................. E21B 10/46
(52) U.S. Cl. ................................. 175/420.1; 175/427
(58) Field of Search ........................... 175/420.1, 427, 175/435, 426

(56) References Cited

U.S. PATENT DOCUMENTS

| | | | |
|---|---|---|---|
| 2,707,619 A | * | 5/1955 | Andersson .................. 175/435 |
| 2,902,260 A | * | 9/1959 | Tilden ........................ 175/394 |
| 3,447,616 A | * | 6/1969 | Granat ....................... 175/394 |
| 4,314,616 A | * | 2/1982 | Rauckhorst et al. ........ 175/394 |
| 4,342,368 A | | 8/1982 | Denman |
| 4,489,796 A | | 12/1984 | Sanchez et al. |
| 4,550,791 A | | 11/1985 | Isakov |
| 4,787,464 A | | 11/1988 | Ojanen |
| 5,184,689 A | | 2/1993 | Sheirer et al. |
| D340,248 S | | 10/1993 | Brady |
| 5,269,387 A | | 12/1993 | Nance |
| 5,287,937 A | | 2/1994 | Sollami et al. |
| 5,297,643 A | | 3/1994 | Montgomery, Jr. et al. |
| 5,311,959 A | | 5/1994 | Adams |
| D351,174 S | | 10/1994 | Brady |
| 5,375,672 A | | 12/1994 | Peay et al. |
| 5,429,199 A | | 7/1995 | Sheirer et al. |
| 5,458,210 A | | 10/1995 | Sollami |
| 5,628,376 A | | 5/1997 | Kleine |
| 5,630,478 A | | 5/1997 | Schimke |
| 5,735,648 A | | 4/1998 | Kleine |
| 5,829,540 A | | 11/1998 | Reay et al. |
| 5,996,715 A | | 12/1999 | Reay et al. |
| 6,026,918 A | | 2/2000 | Briese |
| 6,044,919 A | | 4/2000 | Briese |
| D424,579 S | | 5/2000 | Brady |
| D430,578 S | | 9/2000 | Brady |
| 6,145,606 A | | 11/2000 | Haga |
| 6,260,637 B1 | | 7/2001 | Haussmann et al. |
| 6,260,638 B1 | | 7/2001 | Massa et al. |
| 6,267,542 B1 | | 7/2001 | Salmon |

* cited by examiner

Primary Examiner—Hoang Dang
(74) Attorney, Agent, or Firm—Pitts & Brittian P.C.

(57) ABSTRACT

A roof bit blade insert for use in mining and other associated applications. The blade defines two opposing faces, each having a leading end and a trailing end. The blade defines an indexed protrusion disposed at either or both of the leading and trailing ends of each face. A centered protrusion is defined on several embodiments. Each of the protrusions are provided to strengthen the blade and to assist in centering the blade in a drill body slot. The protrusions defined by the leading and trailing ends of the blade are defined by either an arcuate configuration, a compound curve, an outward taper from the center of the blade, or a selected location along the leading end, to the outer edge thereof. The drill body defines a transverse slot for mounting the blade, the slot having opposing parallel faces adapted to loosely receive the blade such that it is centered therein.

39 Claims, 37 Drawing Sheets

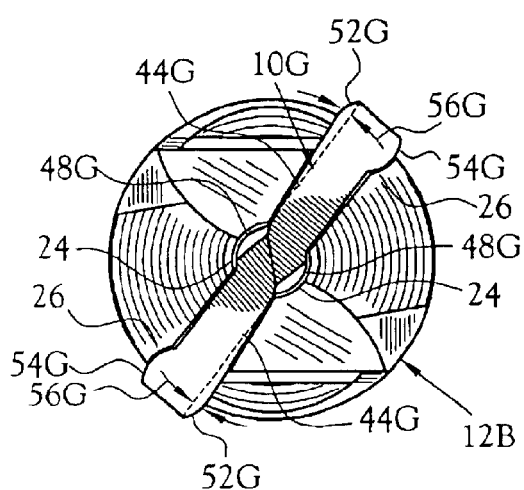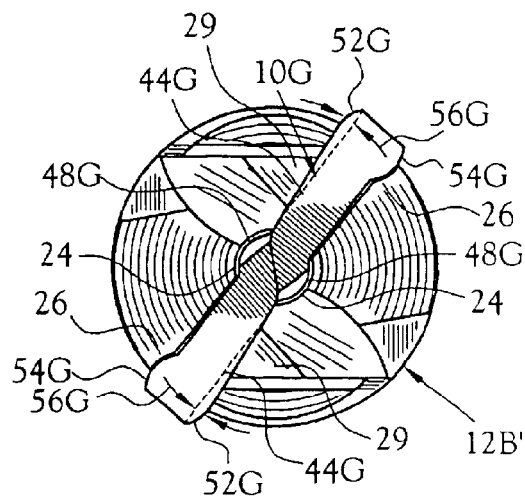
Fig.33  Fig.33a
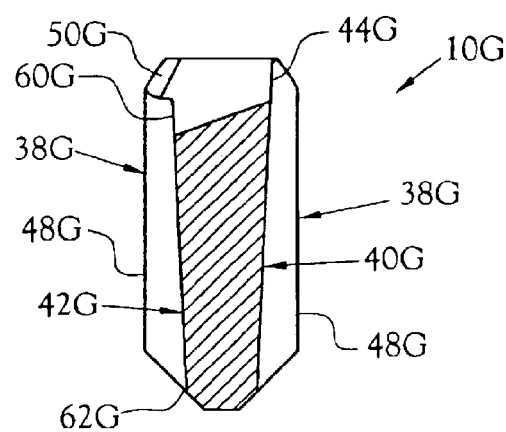
Fig.34

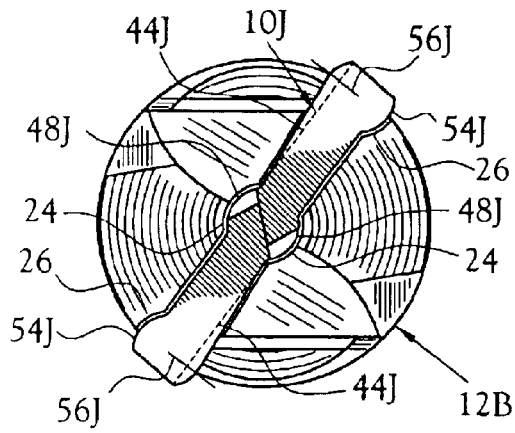
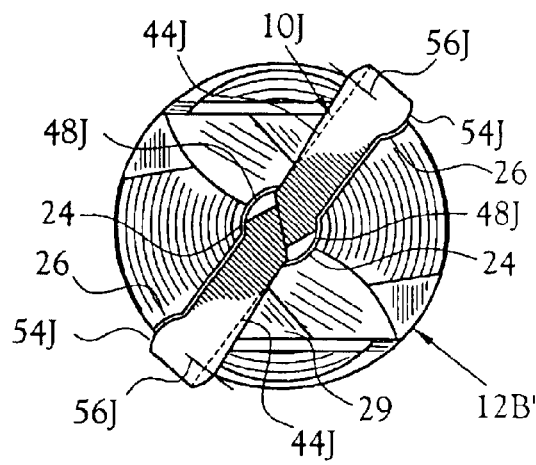
Fig.46　　　　　Fig.46a
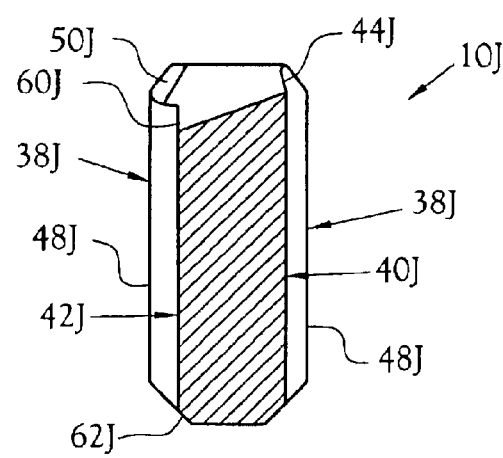
Fig.47

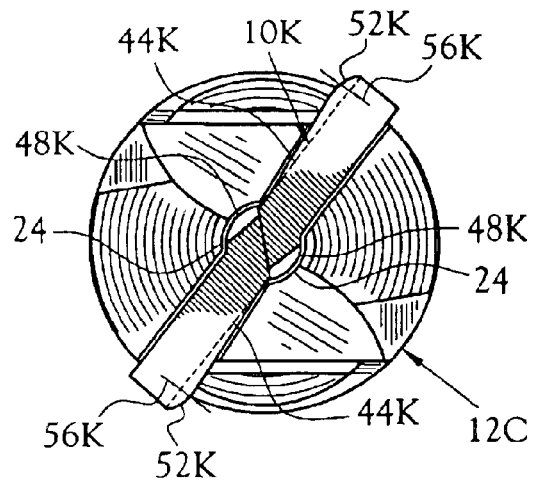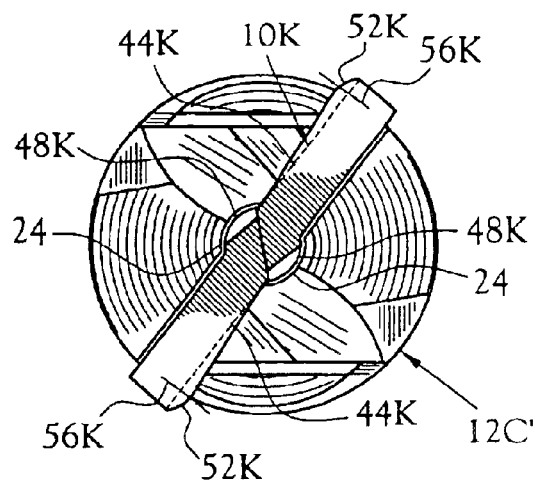
Fig.50    Fig.50a
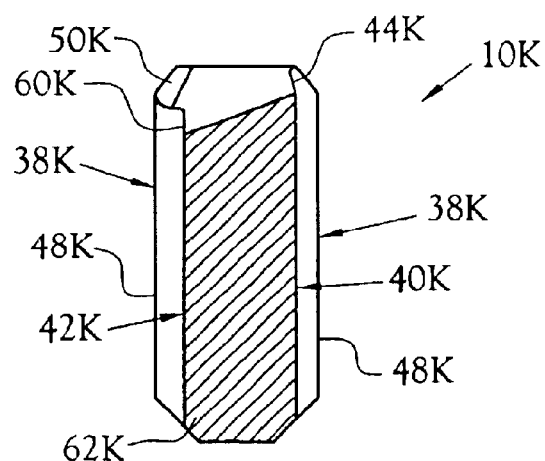
Fig.51

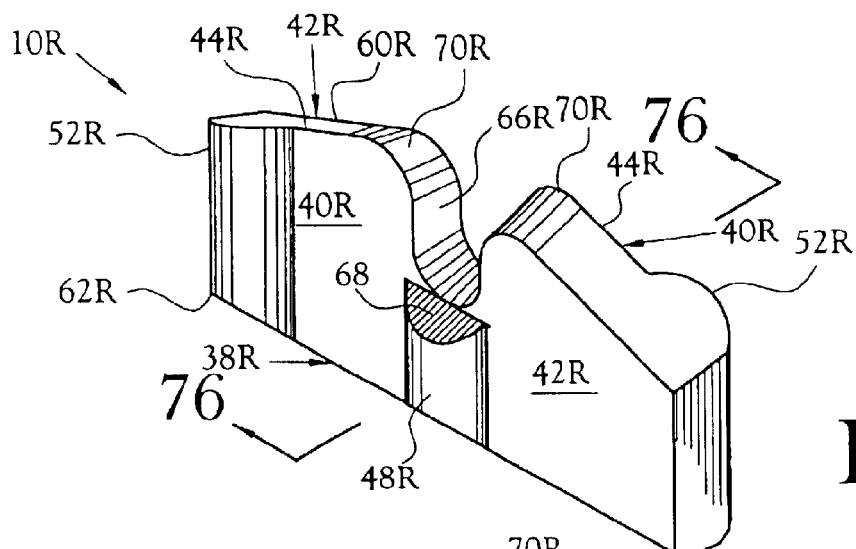
Fig.74
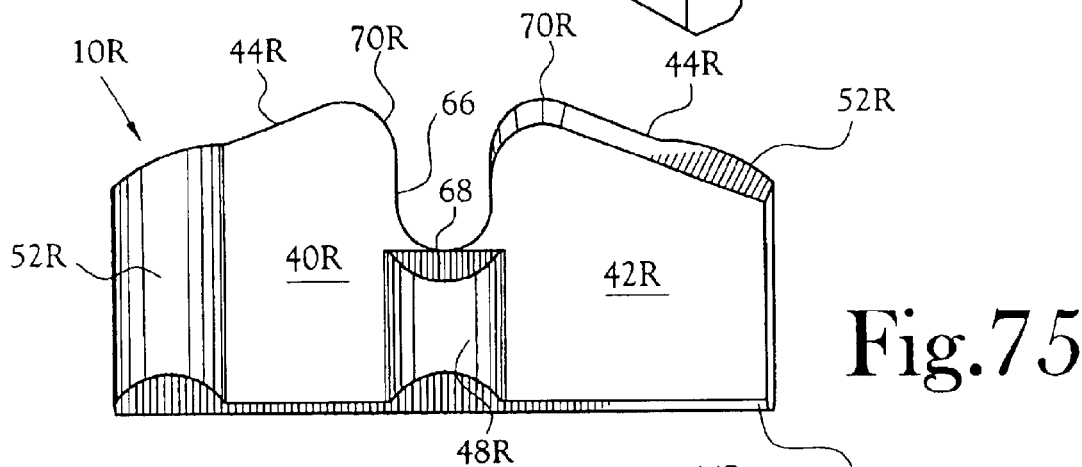
Fig.75
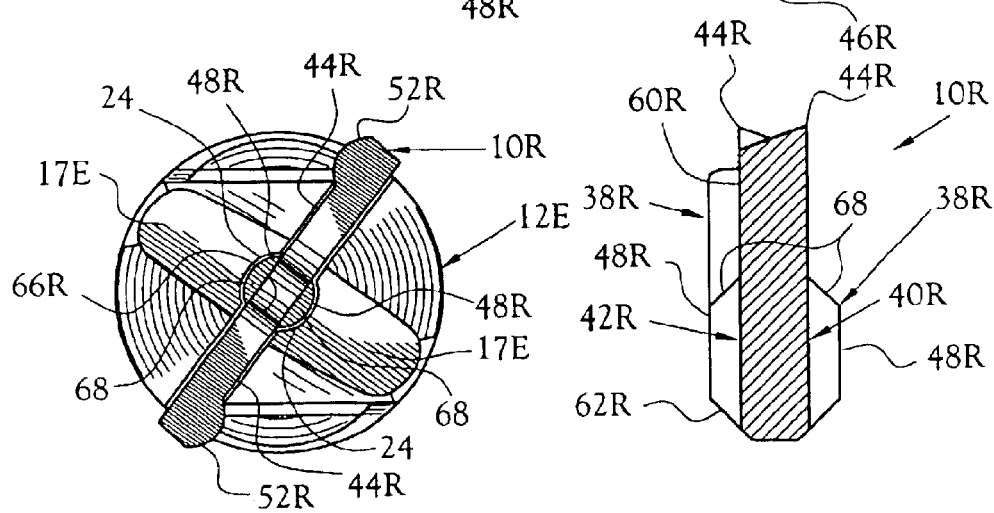
Fig.76
Fig.77

ROOF BIT CARBIDE BLADE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to drill bits. More specifically, the present invention is directed to drill bit blades adapted to be received in a drill body, the drill bit blades and drill body being keyed or indexed to facilitate centering.

2. Description of the Related Art

It is well known that drill bits adapted to bore through rock for the installation of roof bolts or to drill and blast to allow material to be removed in mines and the like have a carbide blade mounted or brazed in a transverse slot at the distal end of a drill body such as an elongate hollow tubular body or the like. One drill body used in association with a conventional dust collection system has access ports positioned near the blade, and the ports communicate with the inner bore of the body. Another embodiment used in association with a conventional auger system, for example, defines a post for mounting. Such blades are adapted to drill holes having a diameter of one inch and larger into the strata in the roof of a mine or the like. A vacuum is drawn through the hollow drill body to draw cuttings removed by the blade through the ports, through the hollow shaft of the drill bit, and to a collection location remote from the drilling. Alternately, a water flushing system may be used in which pressurized water is forced through the drill body, and out through the ports to flush the cuttings out the mouth of the hole. Also, an auger system can be used to remove the cuttings or material.

To withstand the wear incurred as such drill bits bore through the strata or rock, the blades of such drill bits are typically made of tungsten carbide and have a hardness in the range of 89.0 to 91.0 on the Ra hardness scale. A relatively small increase in the hardness of the tungsten carbide of the blade will substantially extend the useful life of a drill bit and enable the drill bit to bore or drill through substantially more rock before it becomes unusably dull. For example, a first drill blade which is harder than a second blade by a hardness rating of 0.5 on the Ra hardness scale may be capable of drilling through 50 percent or more rock or strata such as salt, gypsum, etc., when compared to the second drill blade.

On the other hand, harder carbide blades are more brittle than softer tungsten carbide blades and tend to fracture as a result of the stresses upon the blade. It has been found that tungsten carbide blades typically fracture along the central longitudinal axis of the blade as a result of the thrust forces applied during the drilling.

A drill blade attached to a drill bit and used to bore a cylindrical hole is subjected to a number of forces. At the center of the drill blade, the thrust forces arising from the drill being forced into the hole are maximized. At the outer edges of the blade, strong shear forces are developed as the blade removes stone to extend the hole. The cutting edges of drill blades generally wear most noticeably at the outer ends rather than at their centers because the blade surface footage and the sheer forces are greater at the ends of the blade than at the center. To wit, speed is measured as the ratio of distance to time. The time to complete one rotation of the blade is the same at any distance from the center. The distance traveled through one rotation is measured by the circumference at the particular radius, which is measured by $\pi r^2$. Because one factor of the circumference is the square of the radius, the speed of the blade at any point increases exponentially from the center (zero) to the outer limit. If the blade is not centered on the body of the drill bit, it will be subjected to uneven forces causing stress and breakage of the blade.

Various drill bit blades have been provided for various uses. Typical of the art are those devices disclosed in the following U.S. Patents:

| U.S. Pat. No. | Inventor(s) | Issue Date |
|---|---|---|
| 4,342,368 | D. Denman | Aug. 3, 1982 |
| 4,489,796 | J. Sanchez et al. | Dec. 25, 1984 |
| 4,550,791 | E. Isakov | Nov. 5, 1985 |
| 4,787,464 | R. W. Ojanen | Nov. 29, 1988 |
| 5,184,689 | D. C. Sheirer et al. | Feb. 9, 1993 |
| 5,269,387 | L. S. Nance | Dec. 14, 1993 |
| 5,287,937 | P. A. Sollami et al. | Feb. 22, 1994 |
| 5,297,643 | R. H. Montgomery, Jr. et al. | Mar. 29, 1994 |
| 5,311,959 | W. F. Adams | May 17, 1994 |
| 5,375,672 | K. Peay et al. | Dec. 27, 1994 |
| 5,429,199 | D. C. Sheirer et al. | Jul. 4, 1995 |
| 5,458,210 | P. Sollami | Oct. 17, 1995 |
| 5,628,376 | W. Kleine | May 13, 1997 |
| 5,630,478 | T. O. Schimke | May 20, 1997 |
| 5,735,648 | W. Kleine | Apr. 7, 1998 |
| 5,829,540 | K. Reay et al. | Nov. 3, 1998 |
| 5,996,715 | K. Reay et al. | Dec. 7, 1999 |
| 6,026,918 | L. A. Briese | Feb. 22, 2000 |
| 6,044,919 | L. A. Briese | Apr. 4, 2000 |
| 6,145,606 | P. W. Haga | Nov. 14, 2000 |
| 6,260,637 | A. Hausmann et al. | Jul. 17, 2001 |
| 6,260,638 | T. R. Massa et al. | Jul. 17, 2001 |
| 6,267,542 | A. Salmon | Jul. 31, 2001 |
| Des. 340,248 | W. J. Brady | Oct. 12, 1993 |
| Des. 351,174 | W. J. Brady | Oct. 4, 1994 |
| Des. 424,579 | W. J. Brady | May 9, 2000 |
| Des. 430,578 | W. J. Brady | Sep. 5, 2000 |

Of these patents, the '638 patent issued to Massa et al., discloses several embodiments of cutting inserts. One in particular, illustrated in FIGS. 20A and 20B therein, includes a bottom surface defining a saw tooth shaped notch. The notch as a generally vertical surface, perpendicular to the bottom surface, and an inclined surface. A portion of the bit body including the slot has a bottom surface defining a saw tooth shaped projection. The projection has a surface which is generally perpendicular to the bottom surface of the slot and an inclined surface. The configurations of the cutting insert notch and the bit body projection are complementary, thereby serving a means for fixing the position of the cutting insert relative to the bit body. Other similar embodiments are disclosed by Massa et al., as well. However, Massa et al., do not disclose a cutting bit that extends across the entire diameter of the bit body and therefore are not concerned with centering the cutting insert.

Sheerer et al., in the '689 patent, disclose an insert for use in a rotary drill bit define two opposing portions, each having a leading face. The first and second portions of the insert are offset from the center such that the cutting edge on the first portion is linearly aligned with the cutting edge on the second portion, the cutting edges meeting at the center of the cutting insert. The drill bit body must define a slot having a configuration to complement the offset configuration of the insert. If the slot in the drill bit body is closely toleranced, then the insert will be centered.

In the '478 patent, Schimke discloses a masonry drill having an elongated axial body with at least one discharge groove and a transverse slot located at one end with a hardened drill bit insert brazed within the slot. The hardened insert has projections extending outward from flat planar surfaces which hold the insert in proper orientation within the axial drill body so that it may be brazed into place subsequent to insertion into the drill body. More specifically, the cylindrical drill body defines a transverse slot having smooth channel side walls. The drill bit insert defines at least one rib member on either side thereof, the rib members being fabricated from hardened carbide material. The drill bit insert is pressed into slot using a press with force sufficient enough to insert the carbide insert fully into the slot and allow the rib members to engage the side walls. As the drill bit insert is pressed into the drill body slot, the rib members score the side walls when properly inserted. Scoring of the side wall faces ensures the snug fit of the drill bit insert into the slot so that the insert may be subsequently properly affixed thereto by thorough brazing. However, Schimke does not address centering of the drill bit insert.

Sollami et al., in their '937 patent, disclose a drill bit and blade. The blade defines a vertical rib positioned axially along the centerline of at least one side of the blade. The body defines a slot adapted to retain the blade. To wit, the slot is provided with a centrally located vertical recess along at least one side of the slot, each recess being adapted to receive a rib of the blade when the blade is positioned in the slot. Each rib serves not only to assist in centering the bit, but also to strengthen the bit.

In the '210 patent, Sollami discloses a drill blade for a drill bit intended to be used to bore holes in the roofs of mines is made of hardened tungsten carbide. The blade has two end sections, one on each side of a central section, and the end sections have a higher degree of hardness than the hardness of the central section. Also, the central portion of the blade is made thicker than the distance between the planar surfaces of the end portions thereof such that the blade has a central protrusion and will be self centered on a slot in the bit body having a recess adapted to receive the central protrusion. A central insert is also made of a softer grade of tungsten carbide. In one embodiment, illustrated in FIG. 11 of '210 patent, the insert has opposing sides each defining an arcuate shaped protrusion such that the width of the insert is greater than the distance between the sides of the blade body. As in the '937 patent, these protrusions assist in centering the blade in the drill bit body.

The '464 patent issued to Ojanen discloses a mine tool roof bit insert having a leading face inclined at a constant angle of between zero to three degrees with respect to the axis of rotation. The tapered leading face on either side of the insert yields a decrease in thickness from the top of the insert to the bottom. While Ojanen teaches a tapered bit, there is no provision for centering the bit in the drill body.

The '540 and '715 patents issued to Peay et al., are directed toward rotary roof mine bits comprising a bit body and an insert mounted therein. A top surface of the insert comprises two top sections which intersect a respective main surface of the insert to define first and second non-linear cutting edge. As indicated, the preferred embodiment includes an axial notch disposed at a center of the top surface. It was disclosed by Peay et al., that it has been conventional to provide a roof bit insert with a center notch in lieu of a chisel edge in order to increase the penetration rate of the bit. Due to the low rotational speed as described above, a chisel edge does not perform a cutting action, but rather serves to grind or pulverize the center region of the hole being drilled. By providing a center notch in lieu of a chisel, a center core of rock material is formed, that core being more easily broken into fragments, thereby improving the penetration rate.

Another prior art device not disclosed in the aforementioned patents is illustrated in FIGS. 1 and 2. The illustrated prior art blade defines a rectangular extension on the leading end of each face of the blade. At the distal end of each cutting edge, a sharp corner is defined. In operation, such a configuration leads to premature failure of the blade as the point is disposed where the greatest rotational velocity is achieved.

BRIEF SUMMARY OF THE INVENTION

The present invention is a roof bit blade insert for use in mining and other associated applications. The blade is configured to be readily centered within a drill body slot in order to equalize stress on each side of the blade during a drilling operation. Various embodiments of the blade of the present invention are provided.

Generally, the blade defines two opposing faces, each having a leading end and a trailing end. The top surface of the blade is generally sloped down from the leading end of one face to the trailing end of the opposing face to form a cutting edge. Further, the leading end of one face extends slightly beyond the trailing end of the opposing face in order to prevent the blade from binding during a cutting operation. The opposing faces are disposed either vertically or with a taper from a top edge to a bottom edge of the blade. Each embodiment of the blade of the present invention defines an indexed protrusion disposed at either or both of the leading and trailing ends of each face. A centered protrusion is defined on several embodiments.

The centered protrusion is provided to strengthen the mid-section of the blade, as well as to assist in centering the blade in a drill body slot. A relief is defined at the upper end of the centered protrusions. Each relief slopes inwardly so as to converge toward the center of the blade, thereby reducing the thickness of the blade in the immediate proximity of the center. The relief helps reduce stress at the center of the blade, thereby enabling better penetration through the rock strata and prolonging its useful life.

The indexed protrusions defined by the leading and trailing ends of the blade are defined by several configurations. In one embodiment, each of the leading end and trailing end protrusions defines an arcuate configuration. In a further embodiment, the leading end and trailing end protrusions are defined by a compound curve. In another embodiment, the leading end protrusions are defined by a butterfly taper, which is an outward taper from the center of the blade to the outer edge thereof. In an alternate to this embodiment, a curved relief surface transitioning from the leading end protrusion to the end of the blade is defined. In a still further embodiment, the leading end protrusions are defined by half-butterfly taper, or an outward taper from an approximate midpoint between the center of the blade and the outer edge of the blade to the outer edge of the blade. In an alternate to this embodiment, a curved relief surface transitioning from the leading end protrusion to the end of the blade is defined.

In several of the embodiment, the blade defines a notch at the center thereof. The center notch reduces stress created by grinding and allows rock to be more efficiently broken and removed. The notch is defined by a symmetrical geometric configuration such as circular, elliptical, rectangular, and combinations thereof. A curved transition from the notch to the cutting edge is provided to allow for grinding of the blade without immediately defining a point at the top of the cutting edge, thereby strengthening the transition and extending the life of the blade. A drill point is defined at the bottom of the center notch in several embodiments. In other embodiments, a chisel point is defined.

The drill body for use in association with the roof bit blade insert of the present invention defines an upper end and a lower end. The upper end is configured to receive a blade of the present invention. A transverse slot for mounting the blade has opposing parallel faces, the planes of which are parallel to the longitudinal axis of the body. The faces of the slot are separated by a distance slightly greater than the thickness of the blade. Generally, the transverse slot of the drill body is configured to loosely receive the blade such that it is centered therein. The blade is then brazed to the body in order to be deployed in the field.

For those blades defining a centered protrusion, each of the faces of the slot defines a centered longitudinal recess having an arcuate surface. For those blade embodiments defining trailing end protrusions, each face of the slot is adapted to define a complimentary recess. For those blade embodiments having leading end protrusions defined by either a butterfly taper or a half-butterfly taper, each face of the slot defines a complimentary taper.

BRIEF DESCRIPTION OF THE SEVERAL VIEWS OF THE DRAWINGS

The above-mentioned features of the invention will become more clearly understood from the following detailed description of the invention read together with the drawings in which:

FIG. 33 is a top plan view of the roof bit blade insert of FIG. 31 inserted in the drill body of FIG. 30;

FIG. 33A is a top plan view of the roof bit blade insert of FIG. 31 inserted in the drill body of FIG. 30A;

FIG. 34 is an end view, in section along lines 34—34, of the roof bit blade of FIG. 31;

FIG. 46 is a top plan view of the roof bit blade insert of FIG. 44 inserted in the drill body of FIG. 30;

FIG. 46A is a top plan view of the roof bit blade insert of FIG. 44 inserted in the drill body of FIG. 30A;

FIG. 47 is an end view, in section along lines 47—47, of the roof bit blade of FIG. 44;

FIG. 50 is a top plan view of the roof bit blade insert of FIG. 48 inserted in the drill body of FIG. 35;

FIG. 50A is a top plan view of the roof bit blade insert of FIG. 48 inserted in the drill body of FIG. 35A;

FIG. 51 is an end view, in section along lines 51—51, of the roof bit blade of FIG. 48;

FIG. 74 is a perspective view of a further alternate embodiment of the roof bit blade insert of the present invention wherein the opposing faces are parallel to one another, wherein leading end protrusions are provided, wherein a center notch is defined, and wherein the centered protrusion defines a relief below the center notch;

FIG. 75 is an elevation view of the roof bit blade insert of FIG. 74;

FIG. 76 is a top plan view of the roof bit blade insert of FIG. 74 inserted in the drill body of FIG. 69;

FIG. 77 is an end view, in section along lines 78—78, of the roof bit blade of FIG. 74;

DETAILED DESCRIPTION OF THE INVENTION

A roof bit blade insert is provided for use in mining and other industries. The roof bit blade insert is illustrated generally at 10 in the figures. The roof bit blade insert, or blade 10, is preferably fabricated from tungsten carbide and is adapted to be received within a lateral slot 16 defined by a drill body 12. The blade 10 is configured to be readily centered within the drill body slot 16 in order to equalize stress on each side of the blade 10 during a drilling operation. The blade 10 is brazed to the drill body in a conventional manner.

Figure 1:
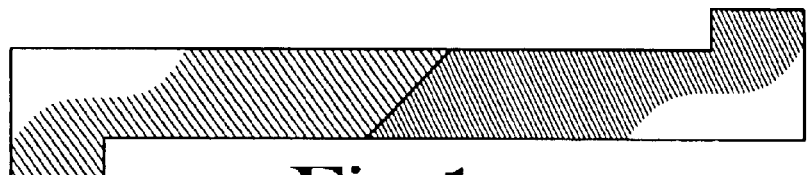
FIG. 1 is a top plan view of a prior art blade wherein rectangular extensions are defined on the leading end of each face.
Figure 2:
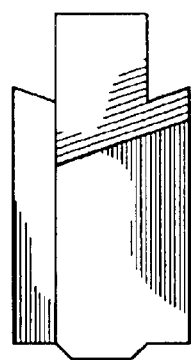
FIG. 2 is an end view of the prior art blade illustrated in FIG. 1.
Figure 3:
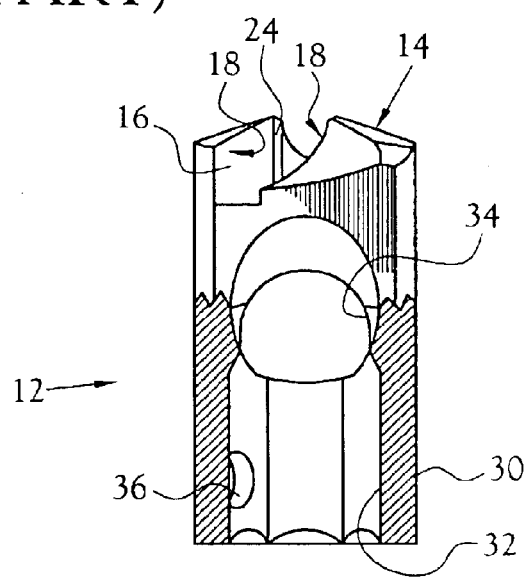
FIG. 3 is an elevation view of a prior art drill body adapted to receive a roof bit blade insert.
Figure 4:
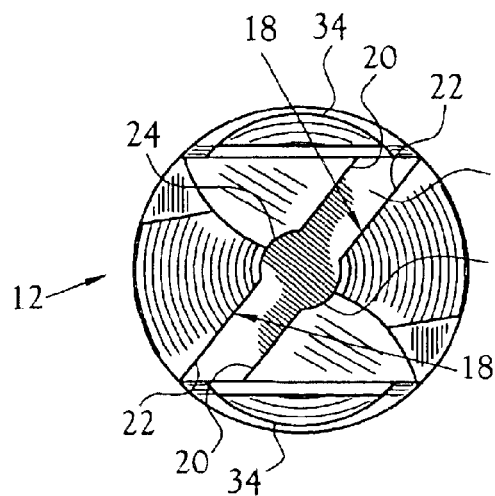
FIG. 4 is a top plan view of the prior art drill body of FIG. 3.

FIGS. 3 and 4 illustrate a conventional drill body 12. This embodiment of the drill body 12 is useful in applications having a dust collection apparatus. The upper end 14 of the body 12 is configured to receive a blade 10. To wit, a transverse slot 16 for mounting the blade 10 is provided having opposing parallel faces 18, the planes of which are generally parallel to the longitudinal axis of the body 12. The faces 18 of the slot 16 are separated by a distance slightly greater than the thickness of the blade 10. Each of the faces 18 defines a centered longitudinal recess 24 having an arcuate surface. Each face 18 defines a leading end 20 and a trailing end 22 on either side of the centered longitudinal recess 24.

The lower end 30 of the drill body 12 defines an axial bore 32 adapted to be fitted on a tubular drill steel, or shaft (not shown). A pair of transverse ports 34 extend from a mid portion of the body 12 to assist, using a vacuum, in drawing drilled material fragments to a dust collection system for accumulation and removal. A transverse opening 36 is adapted to receive a retainer clip (not shown) or any appropriate means to retain the body 12 to a drill steel.

Figure 3A:
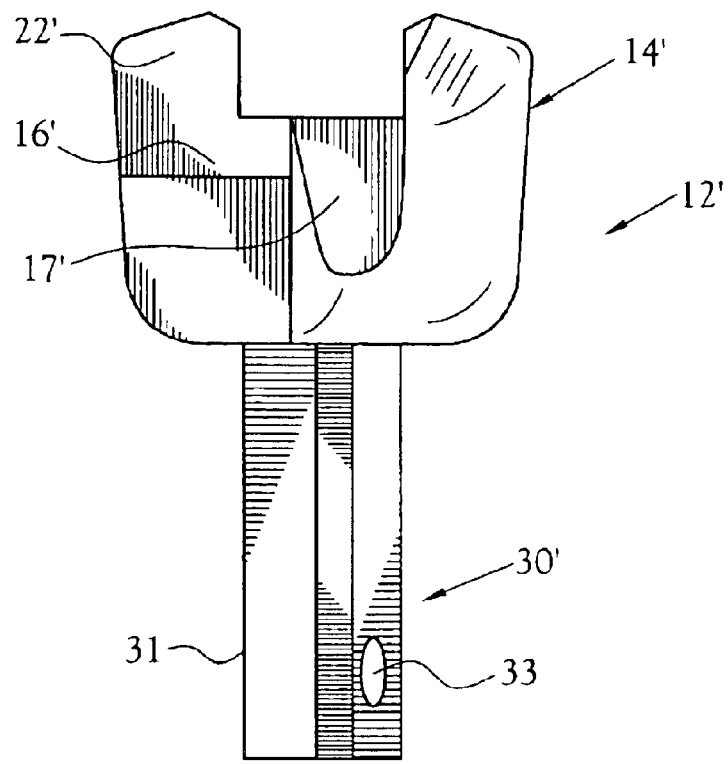
FIG. 3A is an elevation view of an improved drill body adapted to receive a roof bit blade insert.
Figure 4A:
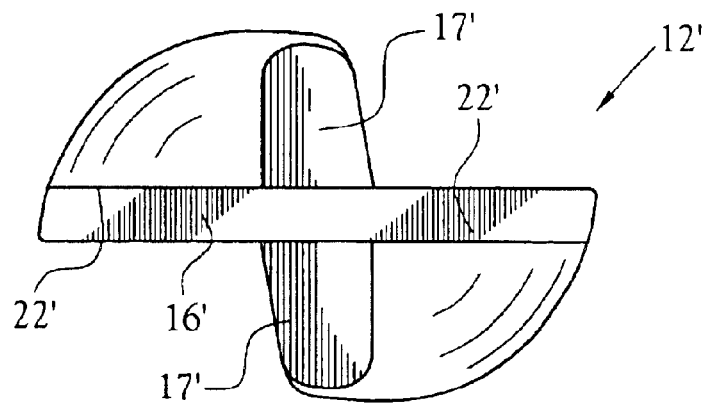
FIG. 4A is a top plan view of the drill body of FIG. 3A.
Figure 5:
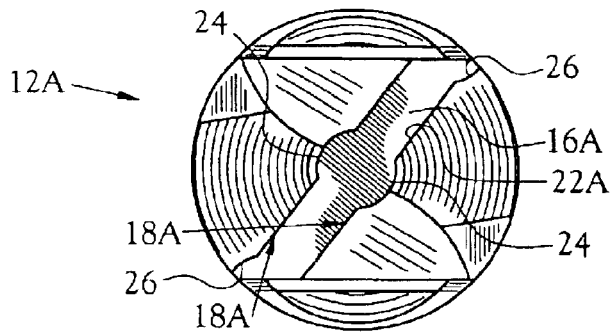
FIG. 5 is a top plan view of a drill body modified to receive various embodiments of the roof bit blade insert of the present invention.

FIGS. 3A and 4A illustrate an alternate embodiment of a conventional drill body 12'. This embodiment of the drill body 12' is especially useful in drilling applications wherein a hole is drilled such as for receiving a blasting charge. The upper end 14' is substantially similar to that of the previously described drill body 12. The lower end 30' is defined by a post 31 configured to be received by a conventional auger system (not shown). A transverse opening 33 is defined at the lower end of the post 31 for receiving a conventional fastener associated with the drilling apparatus. An orthogonal slot 17' is defined on each side of the upper end 14' for removing drilled material from the center of the blade 10, especially in embodiments defining a center notch 66 as described below. The orthogonal slot 17' extends from the center of the drill body 12' at a generally orthogonal orientation relative to the transverse slot 16' and is sloped toward the lower end 30' of the drill body 12' to effectuate removal of drilled material. While the present invention is primarily described in use in association with the drill body 12 of FIGS. 3 and 4, and improvements thereto, it will be understood that similar improvements on the drill body 12' are encompassed in the present invention. Further, similar improvements to other conventional drill bodies having a transverse slot for receiving a drill bit blade insert are deemed to be encompassed by the present invention.

FIGS. 5, 30, 30A, 35, 35A, 64, 69, 86, 86A, 90, 94 and 98 depict various embodiments of the drill body 12 which have been improved for purposes of the present invention. Specifically, the lateral slot 16 is modified to receive various embodiments of the blade 10 of the present invention. In the embodiment illustrated in FIG. 5, the slot 16A defined by the body 12A is modified to define a longitudinal recess 26 at the trailing end 22A of each of the parallel faces 18A defining the slot 16A.

Figure 30:
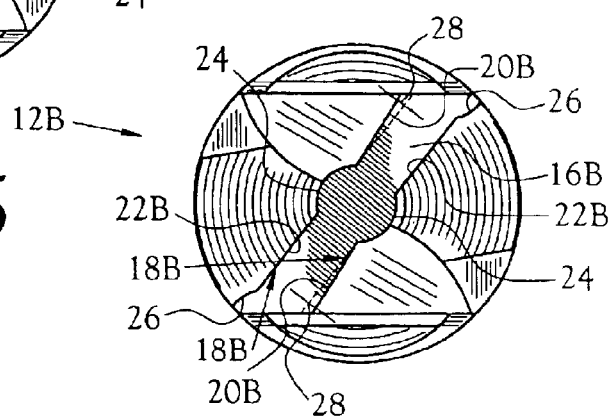
FIG. 30 is a top plan view of an alternate embodiment of a drill body modified to receive various other embodiments of the roof bit blade insert of the present invention.

In the embodiment illustrated in FIG. 30, the slot 16B defined by the body 12B is modified to define a longitudinal recess 26 at the trailing end 22B of each of the parallel faces 18B defining the slot 16B. The leading end 20B of each face 18B defines a beveled recess 28 such that the width of the slot 16B gradually increases from the center to the outer circumference of the body 12B. To wit, the beveled recess 28 extends between the centered longitudinal recess 24 to the outer circumference of the body 12B.

Figure 30A:
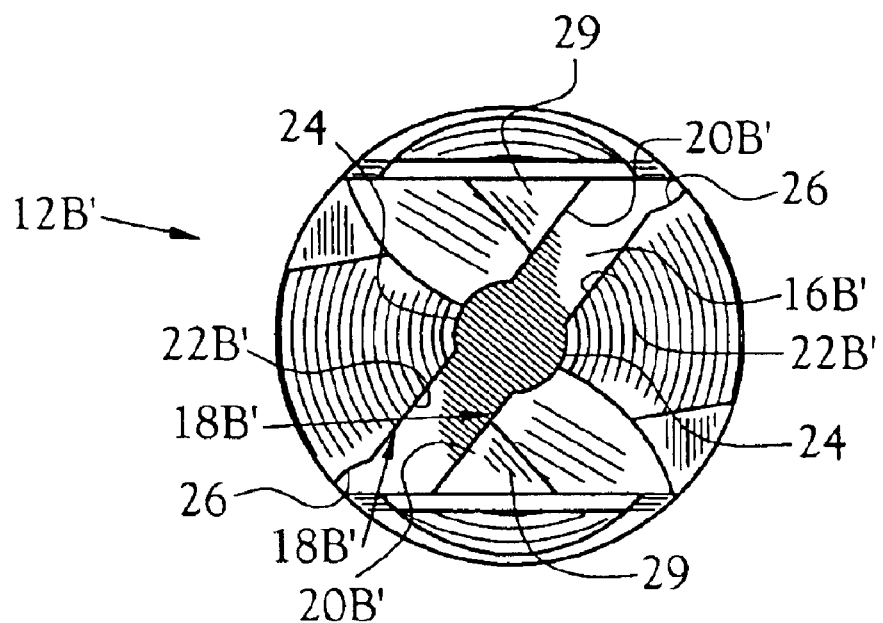
FIG. 30A is a top plan view of an alternate embodiment of the drill body of FIG. 30 modified to receive various other embodiments of the roof bit blade insert of the present invention.

The embodiment illustrated in FIG. 30A is similar to that of FIG. 30 with the exception that the leading end 20B' of each face 18B' defines a relief 29 in lieu of the beveled recess 28.

Figure 35:
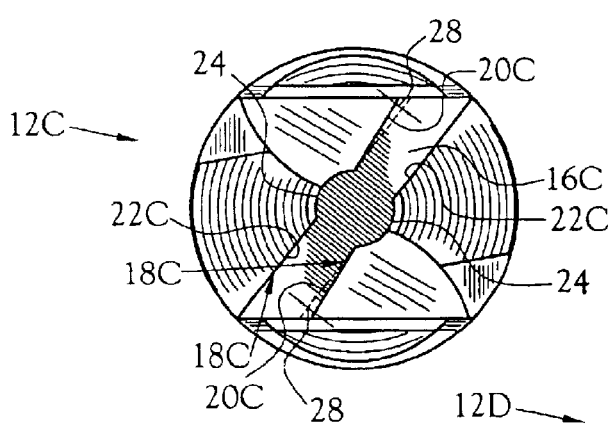
FIG. 35 is a top plan view of another alternate embodiment of a drill body modified to receive various other embodiments of the roof bit blade insert of the present invention.

The body 12C illustrated in FIG. 35 is similar to that illustrated in FIG. 30 with the exception that there is no longitudinal recess 26. The leading end 20C of each face 18C defines a beveled recess 28 such that the width of the slot 16C gradually increases from the center to the outer circumference of the body 12C. As in the previously described embodiment, the beveled recess 28 extends between the centered longitudinal recess 24 to the outer circumference of the body 12C.

Figure 35A:
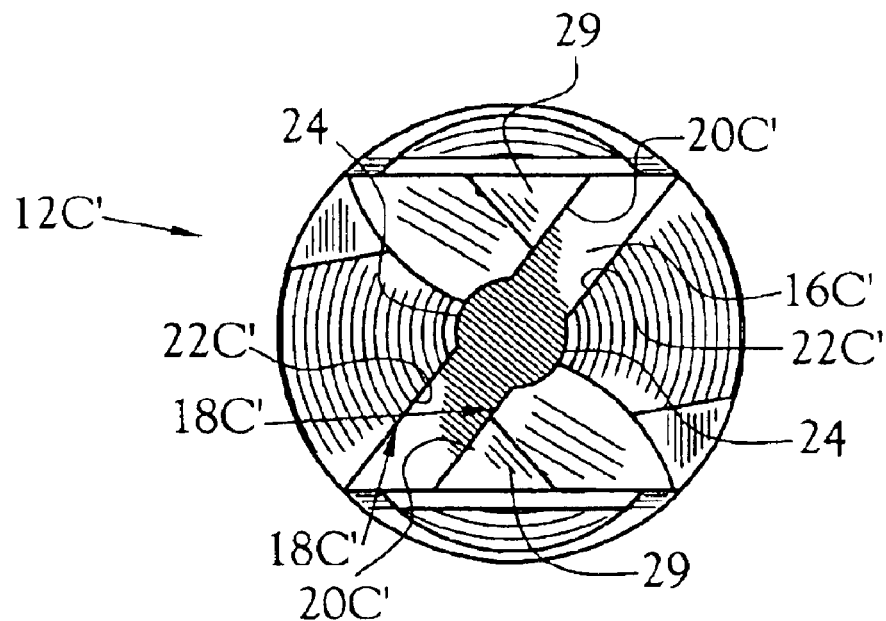
FIG. 35A is a top plan view of another alternate embodiment of the drill body of FIG. 35 modified to receive various other embodiments of the roof bit blade insert of the present invention.
Figure 31:
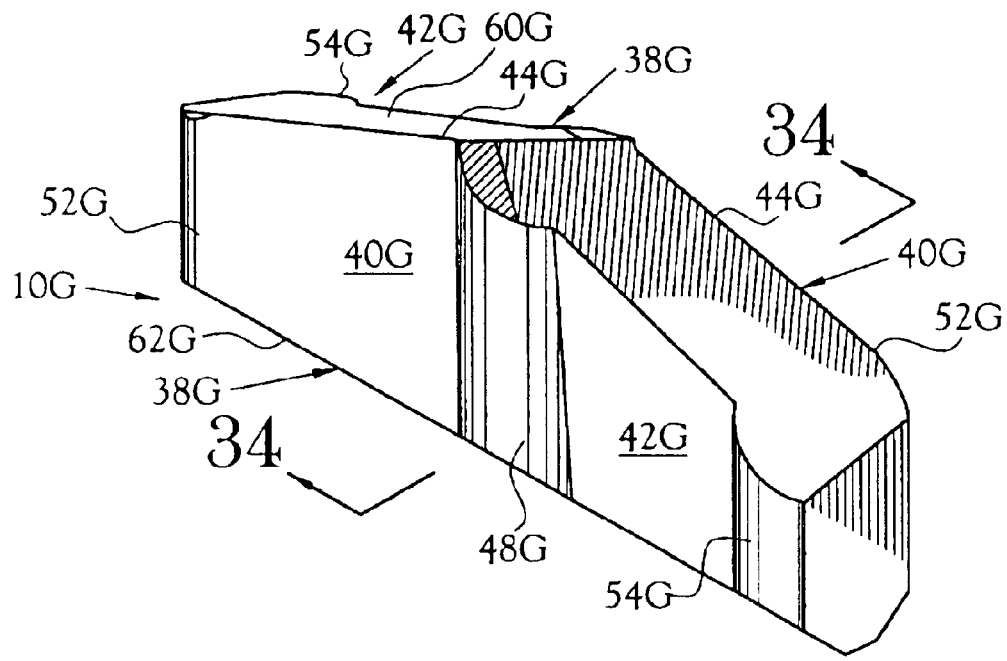
FIG. 31 is a perspective view of a further alternate embodiment of the roof bit blade insert of the present invention wherein the opposing faces are tapered from the top edge to the bottom edge thereof, wherein leading end protrusions and trailing end protrusions are provided, and wherein the leading end of each face defines an outward taper from the center of the blade insert to the outer edge thereof.
Figure 32:
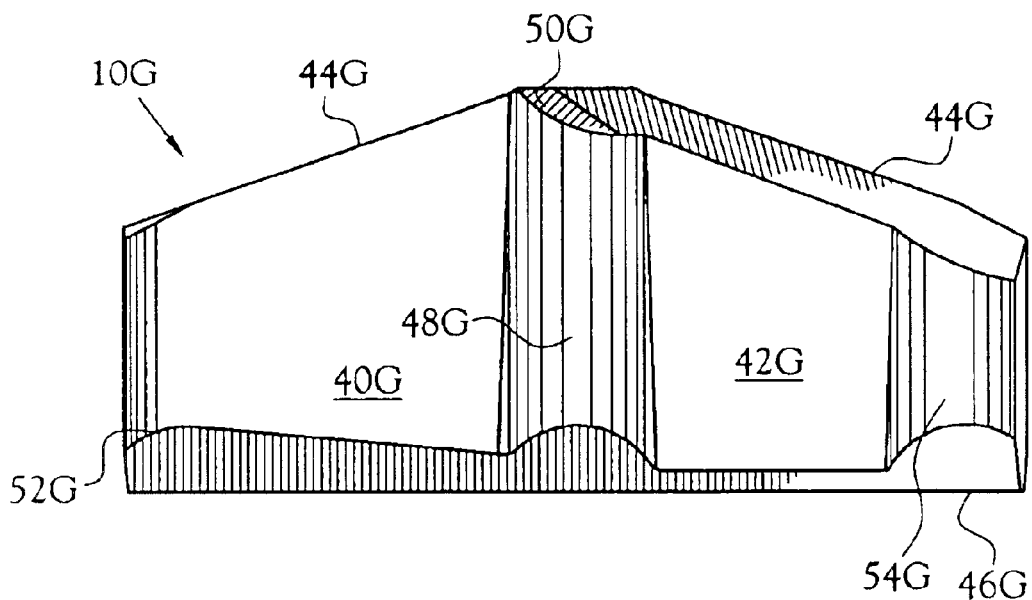
FIG. 32 is an elevation view of the roof bit blade insert of FIG. 31.
Figure 36:
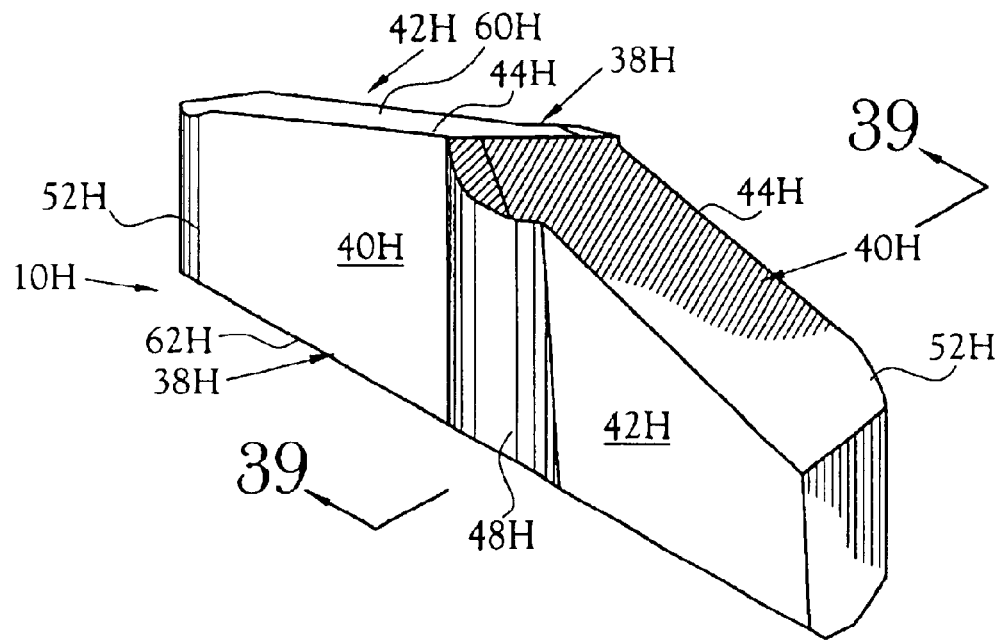
FIG. 36 is a perspective view of a further alternate embodiment of the roof bit blade insert of the present invention wherein the opposing faces are tapered from the top edge to the bottom edge thereof, wherein leading end protrusions are provided, and wherein the leading end of each face defines an outward taper from the center of the blade insert to the outer edge thereof.
Figure 37:
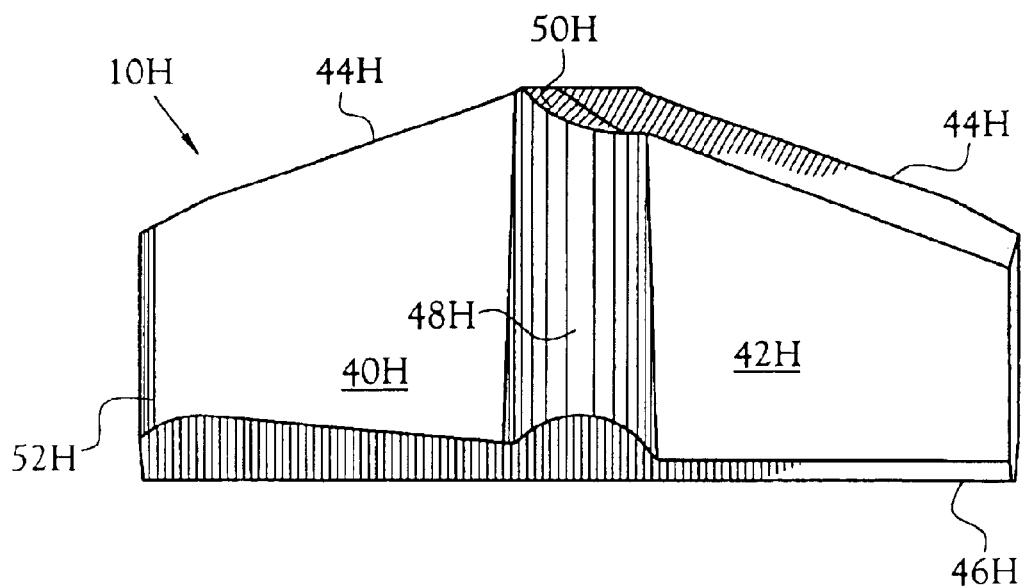
FIG. 37 is an elevation view of the roof bit blade insert of FIG. 36.

The body 12C' illustrated in FIG. 35A is similar to the body 12C of FIG. 35 with the exception that the leading end 20C' of each face 18C' defines a relief 29 in lieu of the beveled recess 28.

Figure 64:
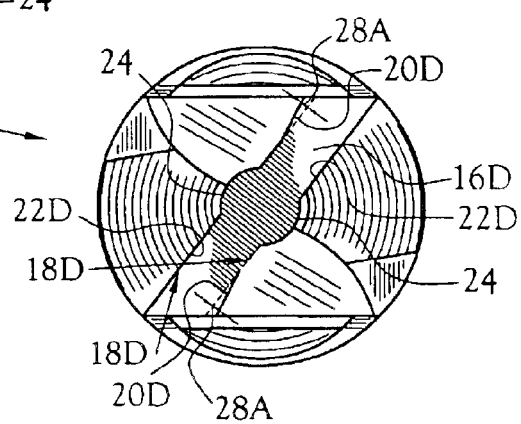
FIG. 64 is a top plan view of a further alternate embodiment of a drill body modified to receive various other embodiments of the roof bit blade insert of the present invention.
Figure 6:
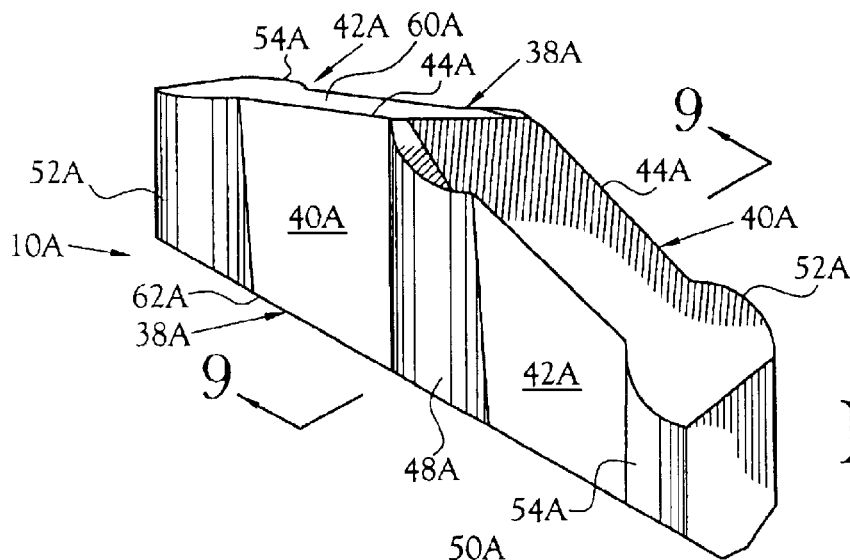
FIG. 6 is a perspective view of one embodiment of the roof bit blade insert of the present invention wherein the opposing faces are tapered from the top edge to the bottom edge thereof, and wherein both leading end protrusions and trailing end protrusions are provided.
Figure 7:
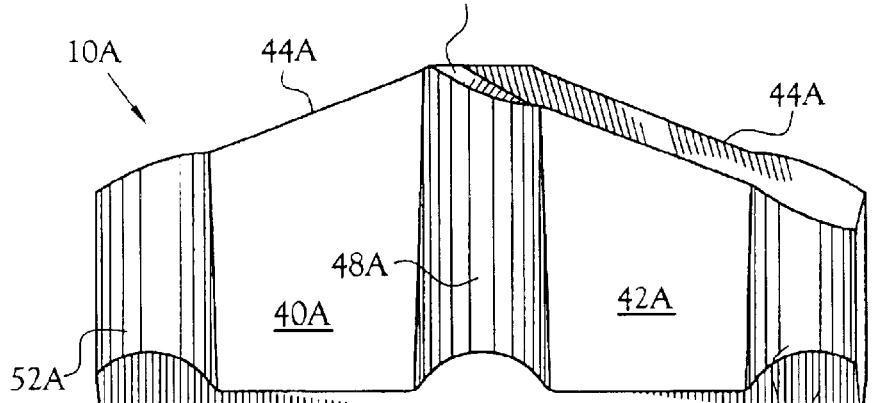
FIG. 7 is an elevation view of the roof bit blade insert of FIG. 6.

The body 12D illustrated in FIG. 64 is similar to that illustrated in FIG. 35 with the exception that beveled recess 28A extends from approximately a midpoint between the center of the face 18D and the outer circumference of the body 12D. Thus, the width of the slot 16D gradually increases from the a point approximately midway between the center of the face 18D and the outer circumference of the body 12D to the outer circumference of the body 12D. The body 12C' illustrated in FIG. 35A is an alternate embodiment of the body 12D, with the relief 29 in the body 12C' serving the same purpose as the beveled recess 28A in the body 12D.

Figure 69:
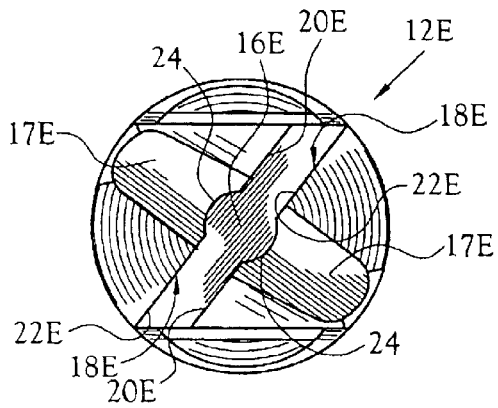
FIG. 69 is a top plan view of a further alternate embodiment of a drill body modified to receive various other embodiments of the roof bit blade insert of the present invention.

The body 12E illustrated in FIG. 69 is similar to the drill body 12 illustrated in FIGS. 3 and 4. The transverse slot 16E defines opposing parallel faces 18E, the planes of which are parallel to the longitudinal axis of the body 12E. The faces 18E of the slot 16E are separated by a distance slightly greater than the thickness of the blade 10. Each of the faces 18E defines a centered longitudinal recess 24 having an arcuate surface. An orthogonal slot 17E is defined on each side of and substantially orthogonally to the transverse slot 16E. The orthogonal slots 17E are centrally located on the drill body 12E to evacuate material broken from the center of the blade 10. The drill body 12E, as will be discussed below, is useful with blades 10 defining a center notch 66. The width and depth of the orthogonal slots 17E are at least equal to the width and depth of the center notch 66 defined by the blade 10.

Figure 86:
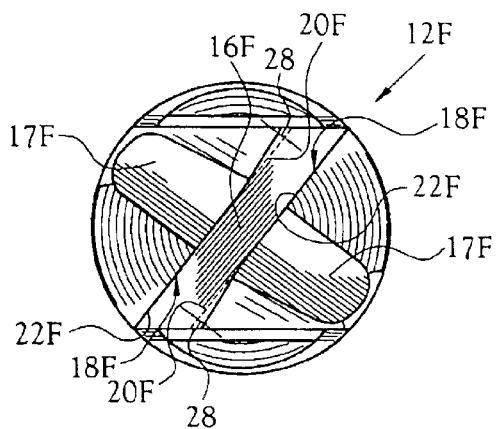
FIG. 86 is a top plan view of a further alternate embodiment of a drill body modified to receive various other embodiments of the roof bit blade insert of the present invention.

The body 12F illustrated in FIG. 86 is similar to the drill body 12C illustrated in FIG. 35. The leading end 20F of each face 18F defines a beveled recess 28 such that the width of the slot 16F gradually increases from the center to the outer circumference of the body 12F. The beveled recess 28 extends between the centered longitudinal recess 24 to the outer circumference of the body 12F. Further, each of the faces 18F defines an orthogonal slot 17F, as described in association with the drill body 12E above.

Figure 86A:
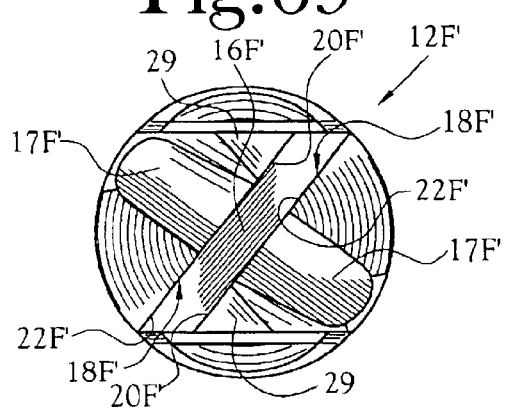
FIG. 86A is a top plan view of a further alternate embodiment of the drill body of FIG. 86 modified to receive various other embodiments of the roof bit blade insert of the present invention.

The embodiment illustrated in FIG. 86A is similar to that of FIG. 86 with the exception that the leading end 20F' of each face 18F' defines a relief 29 in lieu of the beveled recess 28.

Figure 90:
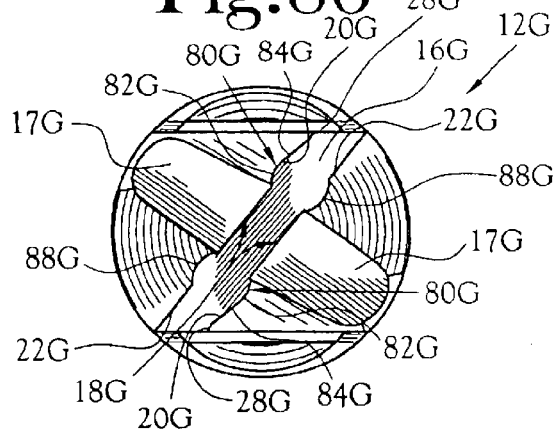
FIG. 90 is a top plan view of a further alternate embodiment of a drill body modified to receive various other embodiments of the roof bit blade insert of the present invention.

The body 12G illustrated in FIG. 90 defines a slot 16G wherein each face 18G defines a leading end beveled recess 80G having a radiused surface 82G initiating on the leading end 20G of the face 18G and terminating in a beveled surface 84G. The beveled surface 84G terminates at the face 18G proximate a beveled recess 28G. The trailing end 22G of each face 18G defines a medial recess 88G which is defined by a radiused surface. Further, each of the faces 18G defines an orthogonal slot 17G, as described in association with the drill body 12E above.

Figure 94:
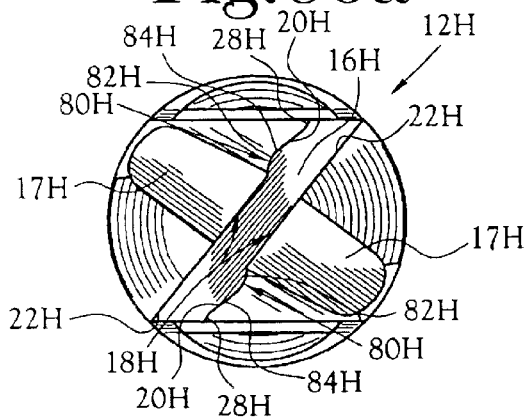
FIG. 94 is a top plan view of a further alternate embodiment of a drill body modified to receive various other embodiments of the roof bit blade insert of the present invention.

The body 12H illustrated in FIG. 94 is similar to the body 12G of FIG. 90 with the exception that the slot 16H does not define a medial recess 88 on the trailing end 22H of the faces 18H. The body 12H defines a slot 16H wherein each face 18H defines a leading end beveled recess 80H having a radiused surface 82H initiating on the leading end 20H of the face 18H and terminating in a beveled surface 84H. The beveled surface 84H terminates at the face 18H proximate a beveled recess 28H. Further, each of the faces 18H defines an orthogonal slot 17H, as described in association with the drill body 12E above.

Figure 98:
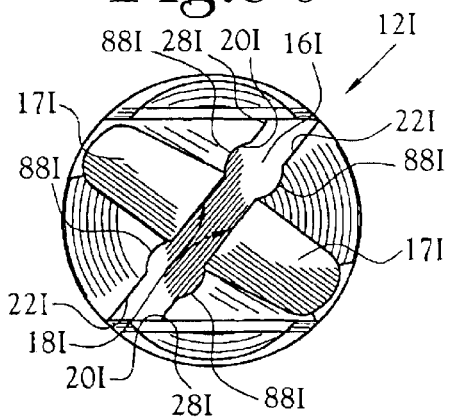
FIG. 98 is a top plan view of a further alternate embodiment of a drill body modified to receive various other embodiments of the roof bit blade insert of the present invention.
Figure 70:
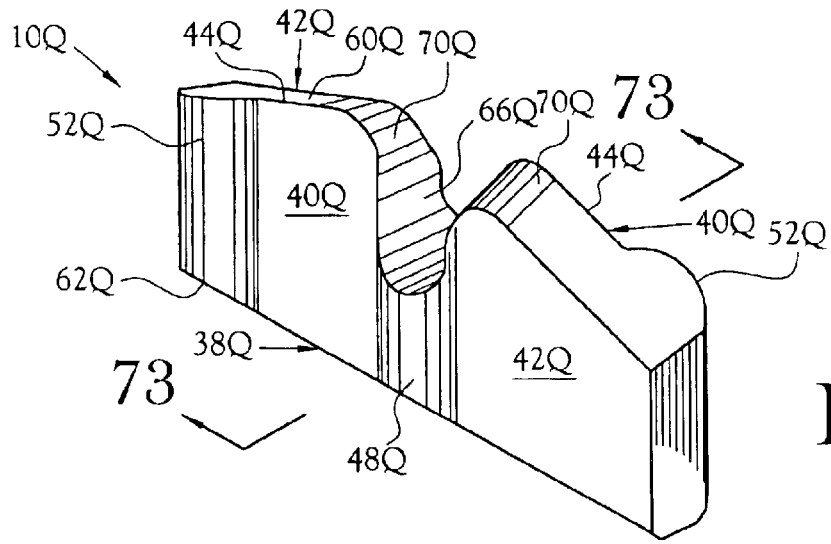
FIG. 70 is a perspective view of a further alternate embodiment of the roof bit blade insert of the present invention wherein the opposing faces are parallel to one another, wherein leading end protrusions are provided, and wherein a center notch is defined.
Figure 71:
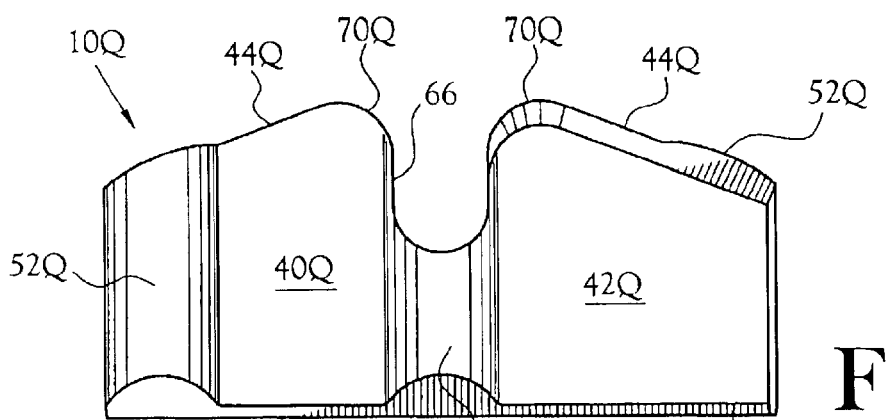
FIG. 71 is an elevation view of the roof bit blade insert of FIG. 70.

The body 12I illustrated in FIG. 98 is similar to the body 12G of FIG. 90. The body 12I defines a slot 16I wherein both the leading end 20I and the trailing end 22I of each face 18I defines a medial recess 88I having a radiused surface. The leading end 20I of each face 18I further defines a beveled recess 28I. Further, each of the faces 18I defines an orthogonal slot 17I, as described in association with the drill body 12E above.

FIGS. 6–29, 31–34, 36–63, 65–68, 70–85, 87–89, 91–93, 95–97 and 99–101 depict various embodiments of the blade 10 of the present invention. Generally, each embodiment of the blade 10 of the present invention defines an indexed protrusion disposed at each end on either or both of the leading and trailing ends 40, 42 of each face 38 to complement the shape of the recesses 24, 26, 28 defined at the center, trailing end 22 and/or leading end 20, respectively, of the slot 16 of the drill body 12. Generally, the slot 16 of the body 12 is configured to loosely receive the blade 10 of the present invention, such that the blade 10 is centered therein. The blade 10 is then brazed to the body 12 in order to be deployed in the field.

The blade 10 of the present invention defines two opposing faces 38. Each face 38 defines a leading end 40 and a trailing end 42. A centered protrusion 48 is defined to cooperate with the centered recess 24 of the drill body slot 16. The top surface of the blade 10 is generally sloped down from the leading end 40 of one face 38 to the trailing end 42 of the opposing face 38 to form a cutting edge 44. Further, the leading end 40 of one face 38 extends slightly beyond the trailing end 42 of the opposing face 38 in order to prevent the blade 10 from binding during a cutting operation.

The centered protrusion 48 is provided to strengthen the mid-section of the blade 10, as well as to assist in centering the blade 10 in the drill body slot 16. A relief 50 is defined at the upper end of the centered protrusions 48. Each relief 50 slopes inwardly so as to converge toward the center of the blade 10, thereby reducing the thickness of the blade 10 in the immediate proximity of the center. The relief 50, otherwise known as a negative grind, helps reduce stress at the center of the blade 10, thereby prolonging the useful life of the blade 10, and enabling better penetration into the strata being drilled.

FIGS. 6–9 illustrate one embodiment of the roof bit blade insert 10A of the present invention. The blade 10A defines the opposing faces 38A which are tapered from the top edge 60A to the bottom edge 62A thereof. The leading end 40A of each face 38A defines a protrusion 52A. Further, the trailing end 42A of each face 38A defines a protrusion 54A. Each of the protrusions 52A,54A defines an arcuate configuration. In the various embodiments of the blade 10 of the present invention, the protrusions 52,54 are illustrated as defining a cylindrical configuration. However, it will be understood that the protrusions 52,54 may define a frusto-conical configuration, wherein a slope similar to that of the leading and trailing ends 40,42 of each face 38 is defined.

Figure 8:
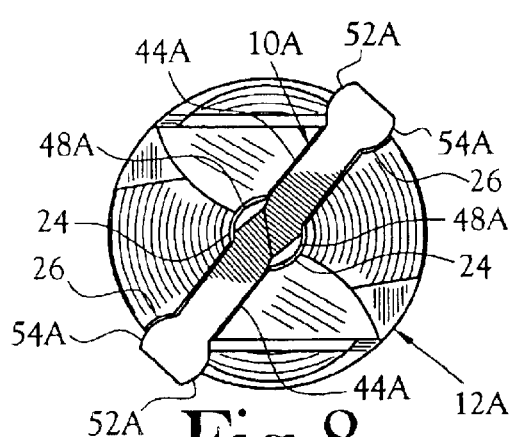
FIG. 8 is a top plan view of the roof bit blade insert of FIG. 8 inserted in the drill body of FIG. 5.
Figure 9:
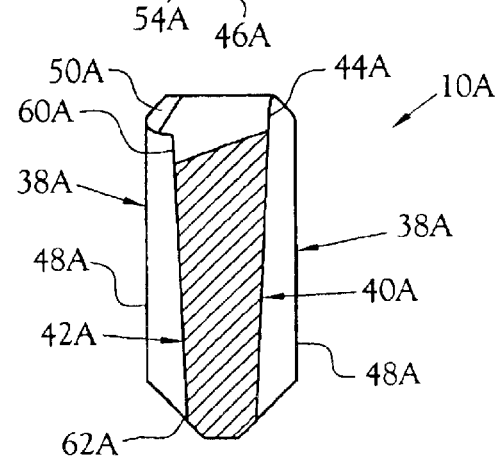
FIG. 9 is an end view, in section along lines 9—9, of the roof bit blade of FIG. 6.
Figure 10:
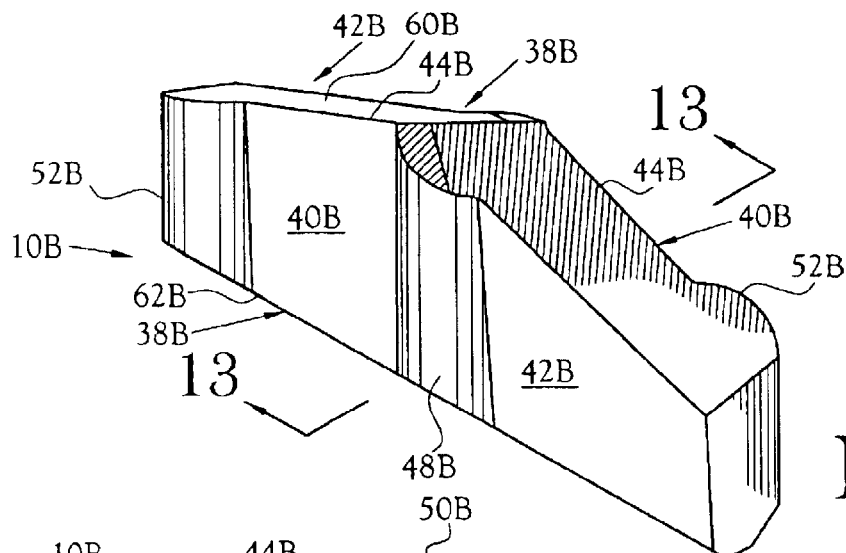
FIG. 10 is a perspective view of an alternate embodiment of the roof bit blade insert of the present invention wherein the opposing faces are tapered from the top edge to the bottom edge thereof, and wherein leading end protrusions are provided.
Figure 11:
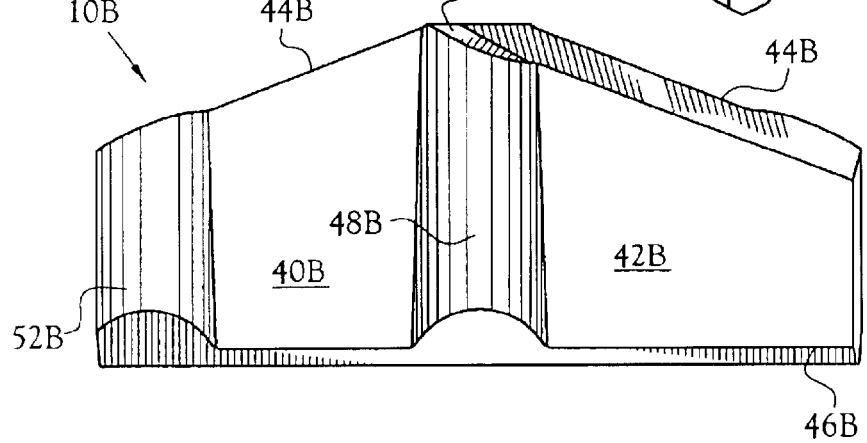
FIG. 11 is an elevation view of the roof bit blade insert of FIG. 10.

While the leading end protrusion 52A of the preferred embodiment does not interfere with the slot 16 of the conventional drill body 12, the trailing end protrusion 54A does. Accordingly, as illustrated in FIG. 8, the blade 10A is used in association with the drill body 12A illustrated in FIG. 5. The drill body longitudinal recess 26 as described is configured to closely receive the trailing end protrusion 54A.

Figure 12:
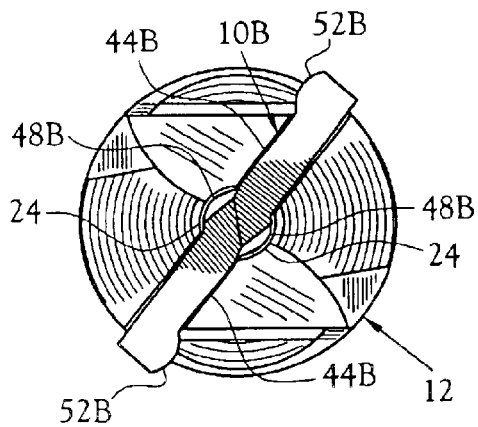
FIG. 12 is a top plan view of the roof bit blade insert of FIG. 10 inserted in the drill body of FIG. 4.
Figure 13:
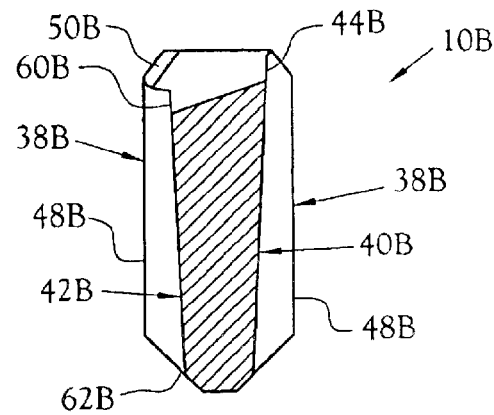
FIG. 13 is an end view, in section along lines 13—13, of the roof bit blade of FIG. 10.
Figure 14:
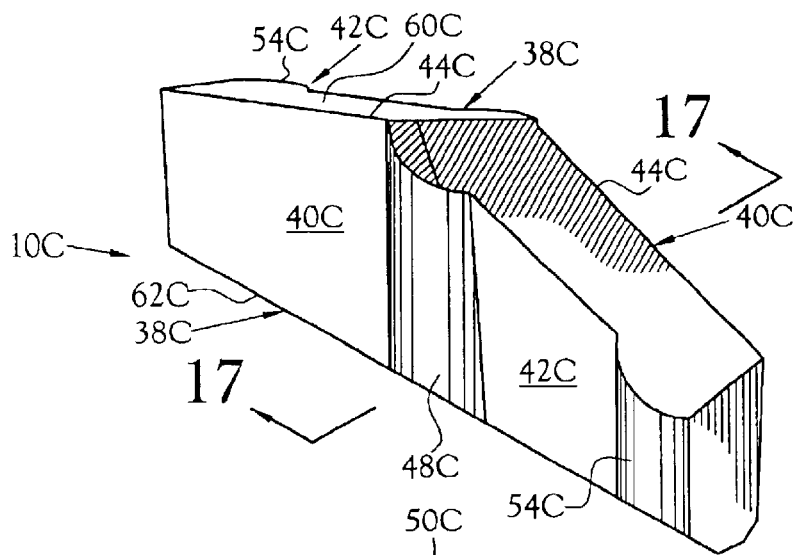
FIG. 14 is a perspective view of a further alternate embodiment of the roof bit blade insert of the present invention wherein the opposing faces are tapered from the top edge to the bottom edge thereof, and wherein trailing end protrusions are provided.
Figure 15:
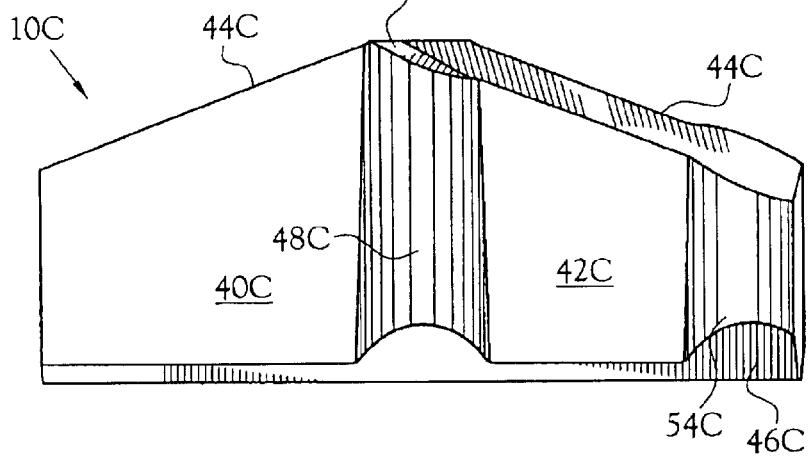
FIG. 15 is an elevation view of the roof bit blade insert of FIG. 14.

FIGS. 10–13 illustrate an alternate embodiment of the roof bit blade insert 10B of the present invention. The blade 10B defines the opposing faces 38B which are tapered from the top edge 60B to the bottom edge 62B thereof. The leading end 40B of each face 38B defines a protrusion 52B. The protrusion 52B defines an arcuate configuration. As in the previous embodiment, the leading end protrusion 52B does not interfere with the slot 16 of the conventional drill body 12. Accordingly, as illustrated in FIG. 12, the blade 10B is used in association with the drill body 12 illustrated in FIG. 4.

Figure 16:
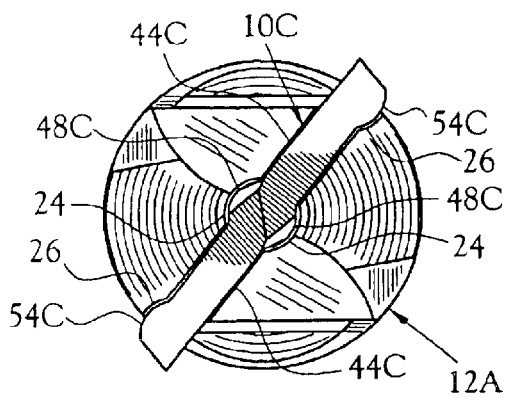
FIG. 16 is a top plan view of the roof bit blade insert of FIG. 14 inserted in the drill body of FIG. 5.
Figure 17:
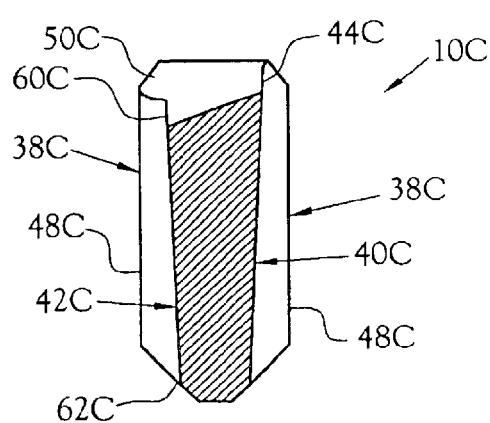
FIG. 17 is an end view, in section along lines 17—17, of the roof bit blade of FIG. 14.
Figure 18:
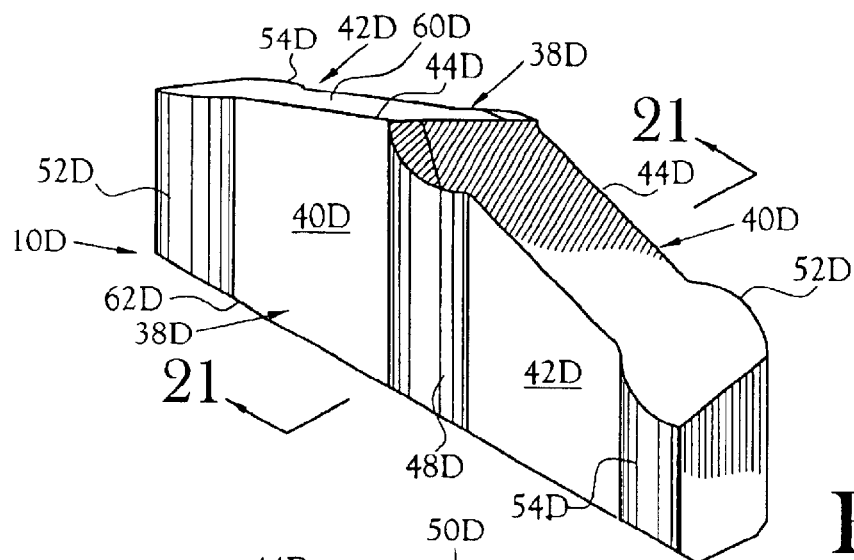
FIG. 18 is a perspective view of a further alternate embodiment of the roof bit blade insert of the present invention wherein the opposing faces are parallel to one another, and wherein both leading end protrusions and trailing end protrusions are provided.
Figure 19:
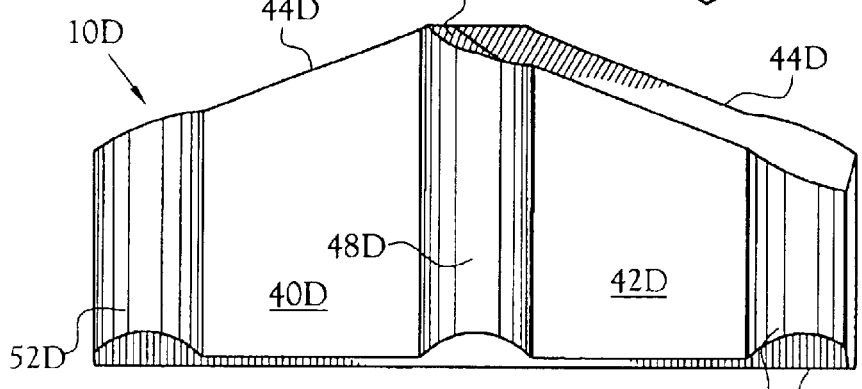
FIG. 19 is an elevation view of the roof bit blade insert of FIG. 18.

FIGS. 14–17 illustrate a further alternate embodiment of the roof bit blade insert 10C of the present invention. The blade 10C defines the opposing faces 38C which are tapered from the top edge 60C to the bottom edge 62C thereof. The trailing end 42C of each face 38C defines a protrusion 54C. As in the first embodiment, the protrusion 54C defines an arcuate configuration which interferes with the slot 16 of the conventional drill body 12. Accordingly, as illustrated in FIG. 16, the blade 10C is used in association with the drill body 12A illustrated in FIG. 5. The drill body longitudinal recess 26 as described is configured to closely receive the trailing end protrusion 54C.

Figure 20:
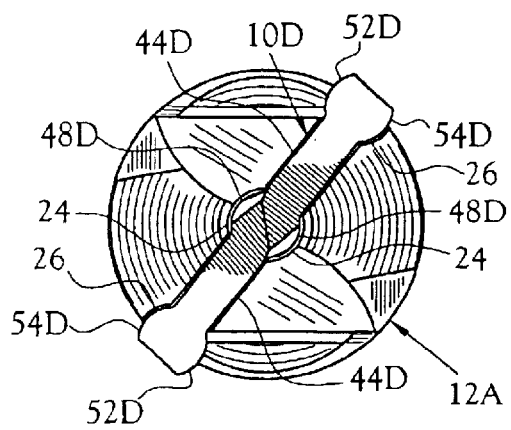
FIG. 20 is a top plan view of the roof bit blade insert of FIG. 18 inserted in the drill body of FIG. 5.
Figure 21:
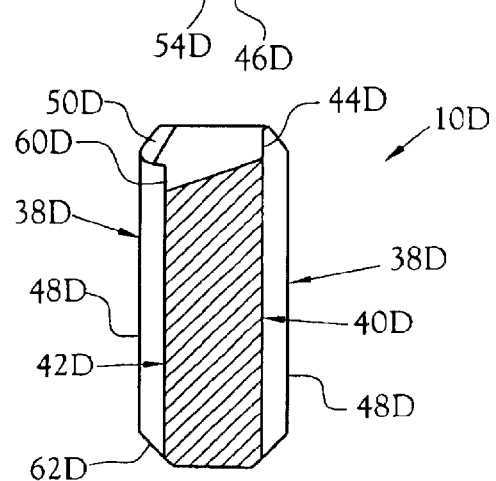
FIG. 21 is an end view, in section along lines 21—21, of the roof bit blade of FIG. 18.
Figure 22:
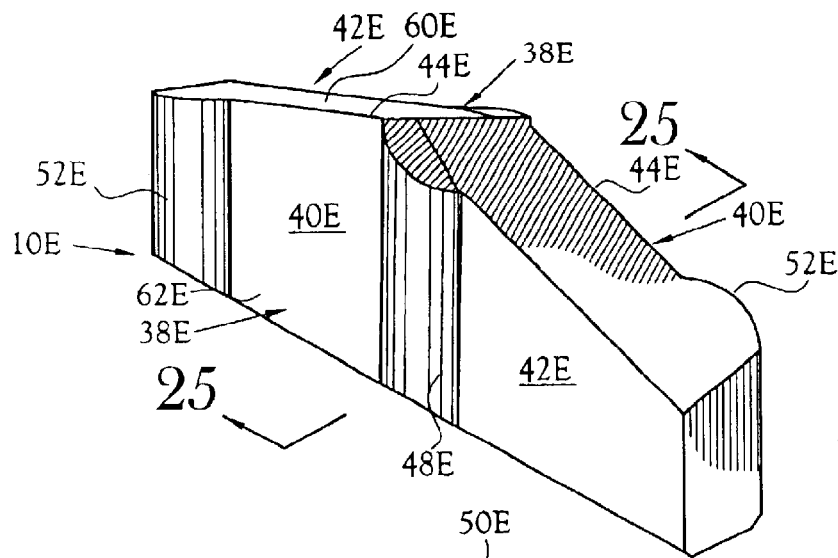
FIG. 22 is a perspective view of a further alternate embodiment of the roof bit blade insert of the present invention wherein the opposing faces are parallel to one another, and wherein leading end protrusions are provided.
Figure 23:
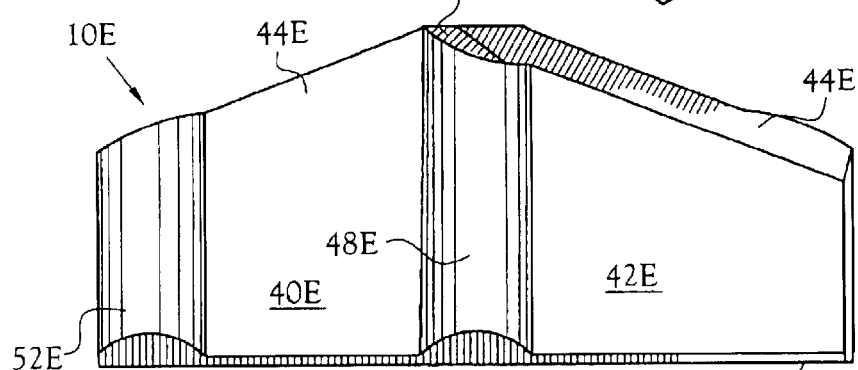
FIG. 23 is an elevation view of the roof bit blade insert of FIG. 22.

FIGS. 18–21 illustrate a further embodiment of the roof bit blade insert 10D of the present invention. The blade 10D defines the opposing faces 38D which are parallel to one another. The leading end 40D of each face 38D defines a protrusion 52D. Further, the trailing end 42D of each face 38D defines a protrusion 54D. Each of the protrusions 52D,54D defines an arcuate configuration. As in the first embodiment the trailing end protrusion 54D interferes with the slot 16 of the conventional drill body 12. Accordingly, as illustrated in FIG. 20, the blade 10D is used in association with the drill body 12A illustrated in FIG. 5. The drill body longitudinal recess 26 as described is configured to closely receive the trailing end protrusion 54D.

Figure 24:
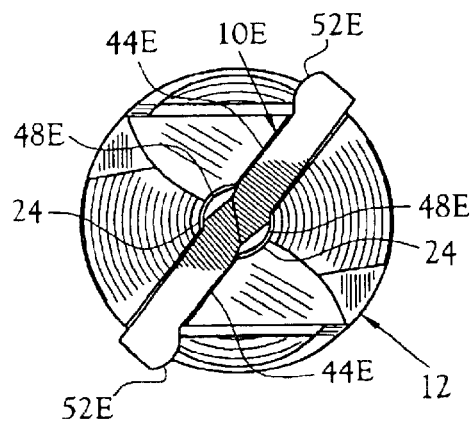
FIG. 24 is a top plan view of the roof bit blade insert of FIG. 22 inserted in the drill body of FIG. 4.
Figure 25:
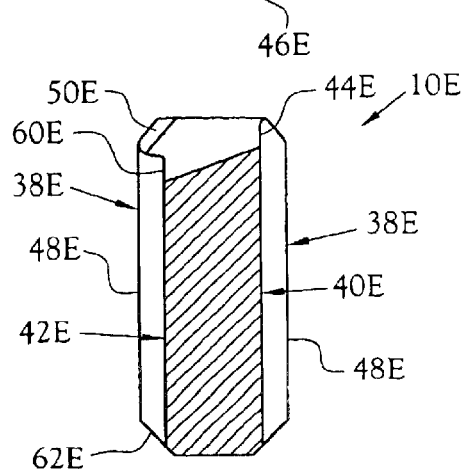
FIG. 25 is an end view, in section along lines 25—25, of the roof bit blade of FIG. 22.
Figure 26:
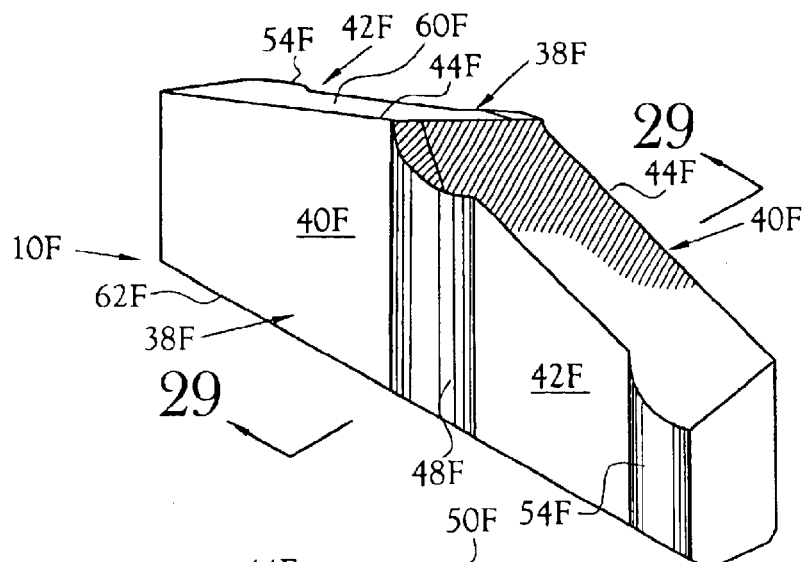
FIG. 26 is a perspective view of a further alternate embodiment of the roof bit blade insert of the present invention wherein the opposing faces are parallel to one another, and wherein trailing end protrusions are provided.
Figure 27:
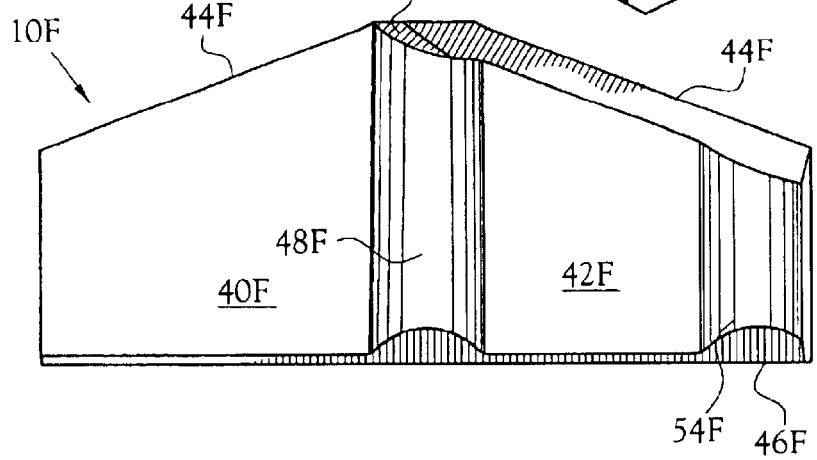
FIG. 27 is an elevation view of the roof bit blade insert of FIG. 26.

FIGS. 22–25 illustrate a further alternate embodiment of the roof bit blade insert 10E of the present invention. The blade 10E defines the opposing faces 38E which are parallel to one another. The leading end 40E of each face 38E defines a protrusion 52E. The protrusion 52E defines an arcuate configuration. As in the first embodiment, the leading end protrusion 52E does not interfere with the slot 16 of the conventional drill body 12. Accordingly, as illustrated in FIG. 24, the blade 10E is used in association with the drill body 12 illustrated in FIG. 4.

Figure 28:
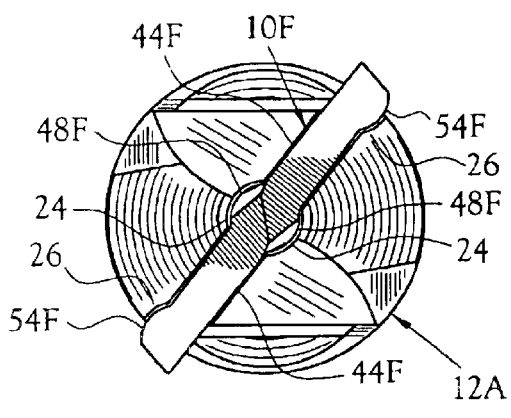
FIG. 28 is a top plan view of the roof bit blade insert of FIG. 26 inserted in the drill body of FIG. 5.
Figure 29:
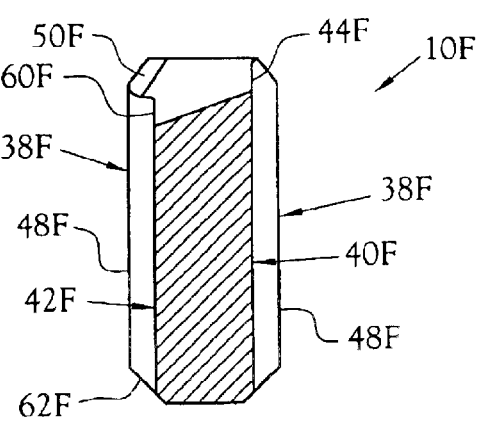
FIG. 29 is an end view, in section along lines 29—29, of the roof bit blade of FIG. 26.

FIGS. 26–29 illustrate a further alternate embodiment of the roof bit blade insert 10F of the present invention. The blade 10F defines the opposing faces 38F which are parallel to one another. The trailing end 42F of each face 38F defines a protrusion 54F. As in the first embodiment, the protrusion 54F defines an arcuate configuration which interferes with the slot 16 of the conventional drill body 12. Accordingly, as illustrated in FIG. 28, the blade 10F is used in association with the drill body 12A illustrated in FIG. 5. The drill body longitudinal recess 26 as described is configured to closely receive the trailing end protrusion 54F.

FIGS. 31–34 illustrate a further embodiment of the roof bit blade insert 10G of the present invention. The blade 10G defines the opposing faces 38G which are tapered from the top edge 60G to the bottom edge 62G thereof. The leading end 40G of each face 38G defines a protrusion 56G which is an outward taper from the center of the blade 10G to the outer edge thereof. The protrusion 56G is also referred to herein as a butterfly protrusion 56G. The leading end 40G of each face 38G further defines a protrusion 52G, which is a curved relief surface transitioning from the protrusion 56G to the end of the blade 10G. Further, the trailing end 42G of each face 38G defines a protrusion 54G. Each of the protrusions 52G,54G defines an arcuate configuration. The butterfly protrusion 56G of the preferred embodiment interferes with the slot 16 of the conventional drill body 12, as does the trailing end protrusion 54G. Accordingly, as illustrated in FIG. 33, the blade 10G is used in association with the drill body 12B illustrated in FIG. 30. The drill body longitudinal recess 26 as described is configured to closely receive the trailing end protrusion 54G and the leading end beveled recess 28 is configured to closely receive the protrusion 56G. In the alternative, as illustrated in FIG. 33A, the blade 10G is used in association with the drill body 12B' illustrated in FIG. 30A.

Figure 38:
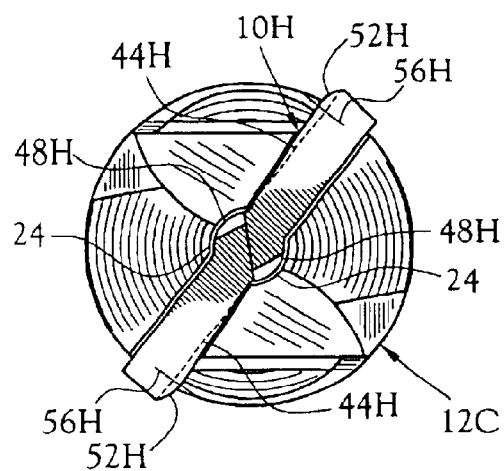
FIG. 38 is a top plan view of the roof bit blade insert of FIG. 36 inserted in the drill body of FIG. 35.
Figure 38A:
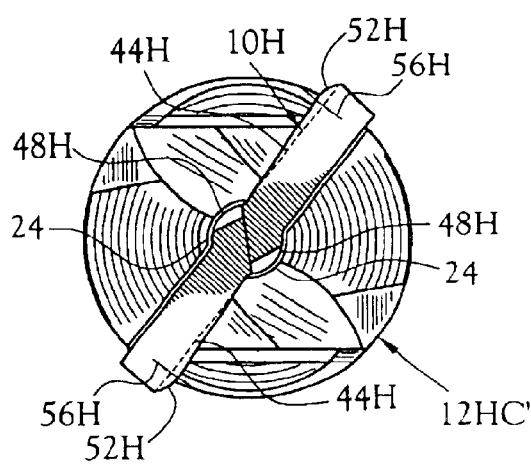
FIG. 38A is a top plan view of the roof bit blade insert of FIG. 36 inserted in the drill body of FIG. 35A.
Figure 39:
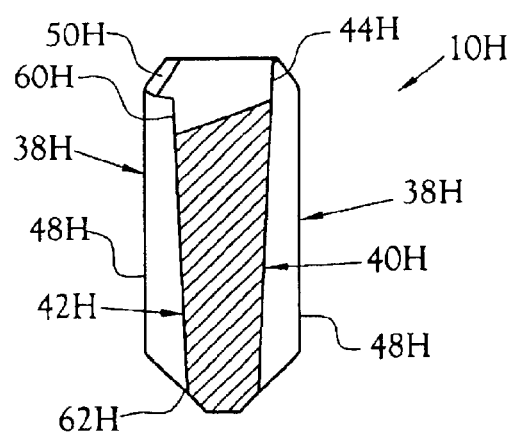
FIG. 39 is an end view, in section along lines 39—39, of the roof bit blade of FIG. 36.
Figure 40:
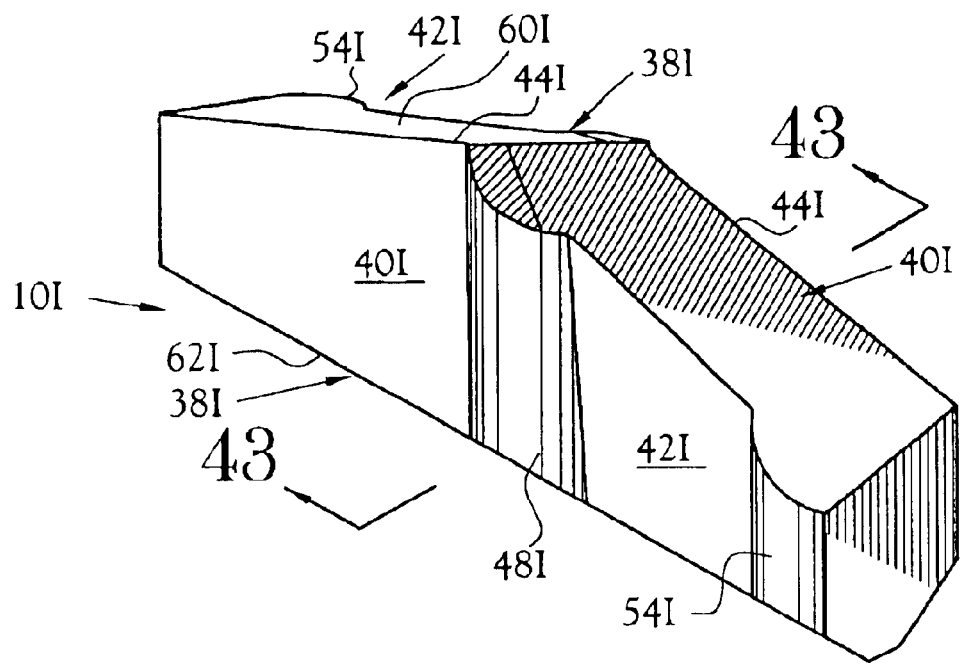
FIG. 40 is a perspective view of a further alternate embodiment of the roof bit blade insert of the present invention wherein the opposing faces are tapered from the top edge to the bottom edge thereof, wherein trailing end protrusions are provided, and wherein the leading end of each face defines an outward taper from the center of the blade insert to the outer edge thereof.
Figure 41:
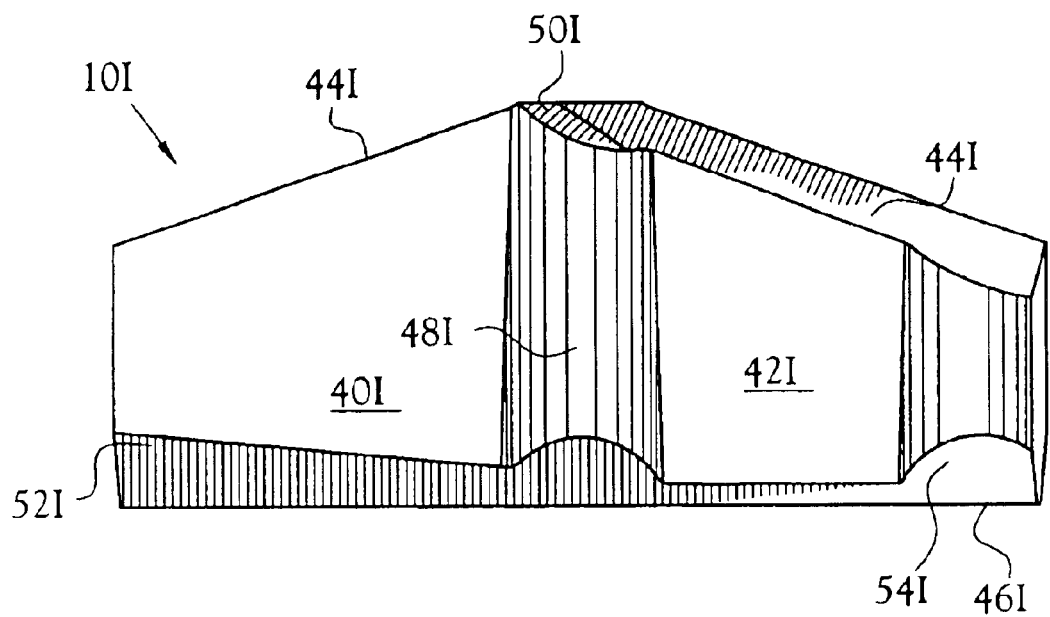
FIG. 41 is an elevation view of the roof bit blade insert of FIG. 40.

FIGS. 36–39 illustrate a further embodiment of the roof bit blade insert 10H of the present invention. The blade 10H defines the opposing faces 38H which are tapered from the top edge 60H to the bottom edge 62H thereof. The leading end 40H of each face 38H defines a butterfly protrusion 56H. The leading end 40H of each face 38H further defines a protrusion 52H, which is a curved relief surface transitioning from the protrusion 56H to the end of the blade 10H. The butterfly protrusion 56H of the preferred embodiment interferes with the slot 16 of the conventional drill body 12. Accordingly, as illustrated in FIG. 38, the blade 10H is used in association with the drill body 12C illustrated in FIG. 35. The drill body leading end beveled recess 28 is configured to closely receive the protrusion 56H. In the alternative, as illustrated in FIG. 38A, the blade 10H is used in association with the drill body 12C' illustrated in FIG. 35A.

Figure 42:
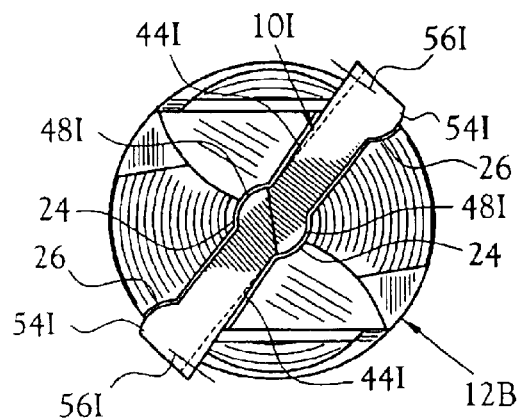
FIG. 42 is a top plan view of the roof bit blade insert of FIG. 40 inserted in the drill body of FIG. 30.
Figure 42A:
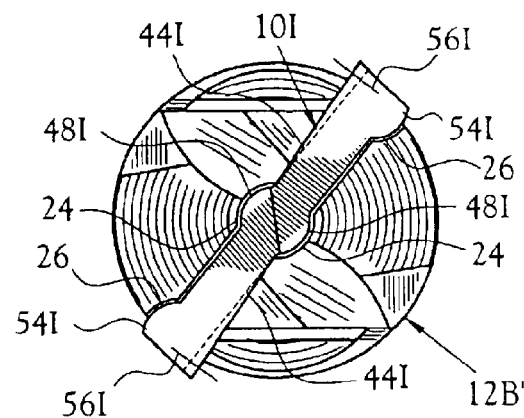
FIG. 42A is a top plan view of the roof bit blade insert of FIG. 40 inserted in the drill body of FIG. 30A.
Figure 43:
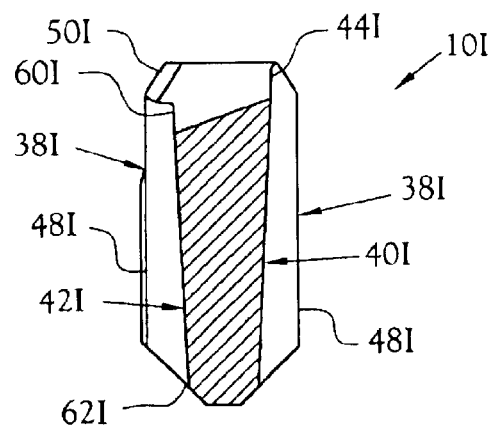
FIG. 43 is an end view, in section along lines 43—43, of the roof bit blade of FIG. 40.
Figure 44:
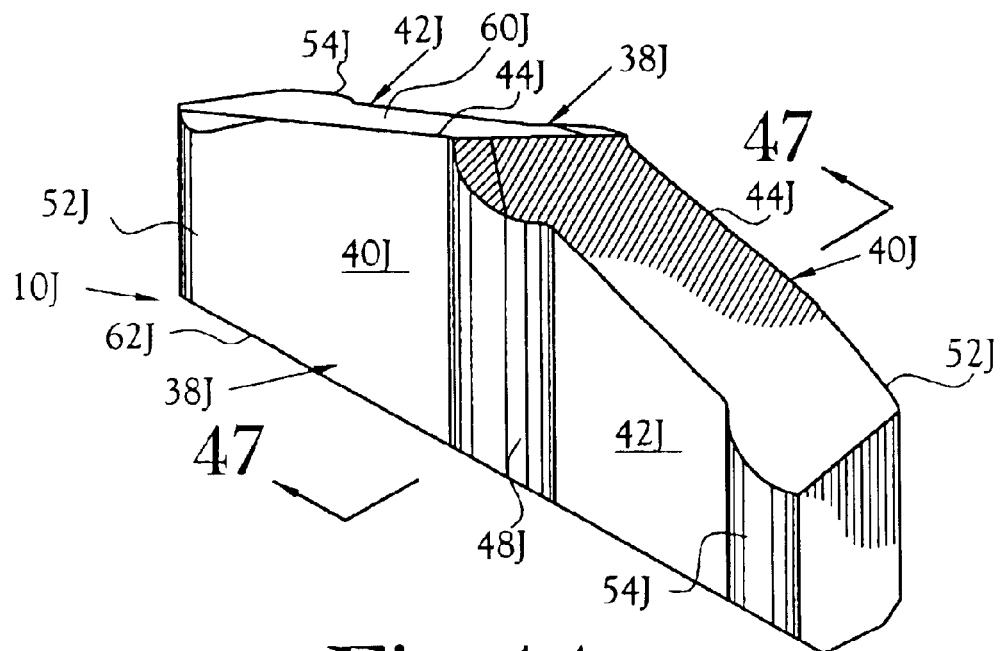
FIG. 44 is a perspective view of a further alternate embodiment of the roof bit blade insert of the present invention wherein the opposing faces are defined by intersecting vertical planes, wherein leading end protrusions and trailing end protrusions are provided, and wherein the leading end of each face defines an outward taper from the center of the blade insert to the outer edge thereof.
Figure 45:
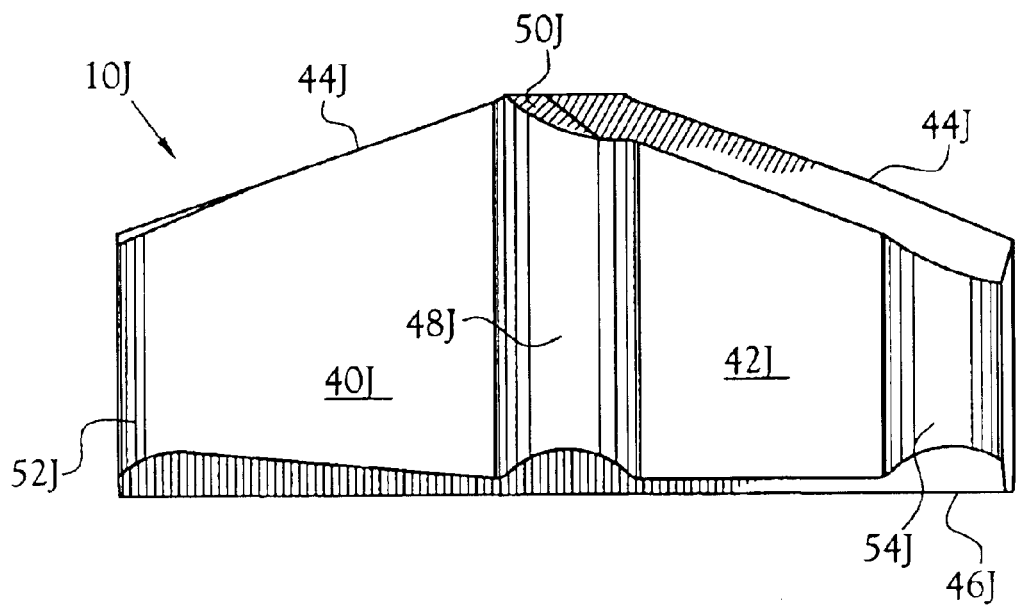
FIG. 45 is an elevation view of the roof bit blade insert of FIG. 44.
Figure 48:
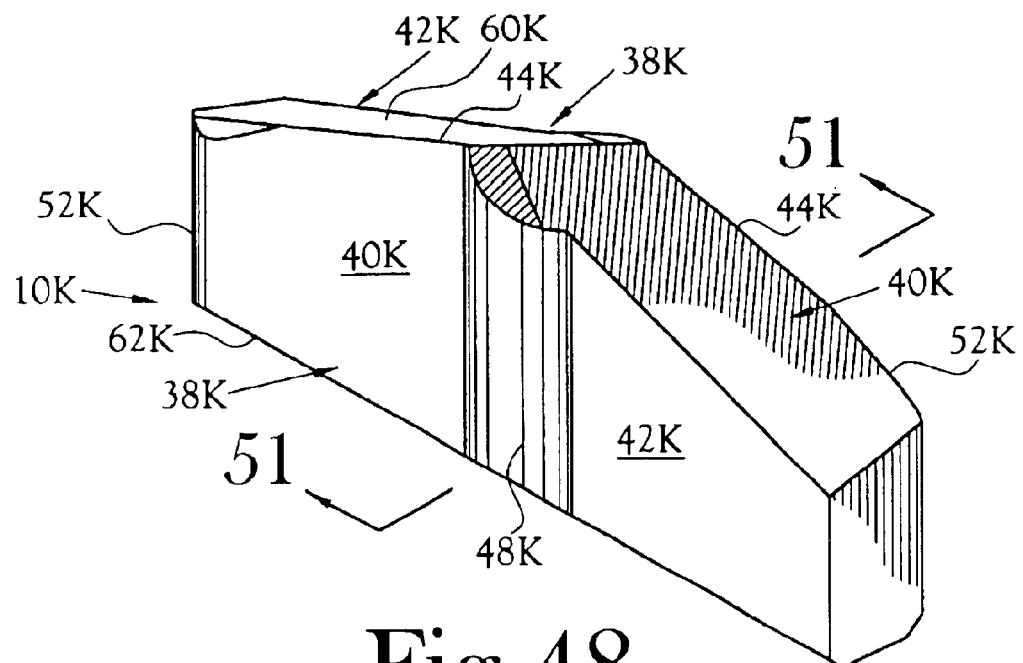
FIG. 48 is a perspective view of a further alternate embodiment of the roof bit blade insert of the present invention wherein the opposing faces are defined by intersecting vertical planes, wherein leading end protrusions are provided, and wherein the leading end of each face defines an outward taper from the center of the blade insert to the outer edge thereof.
Figure 49:
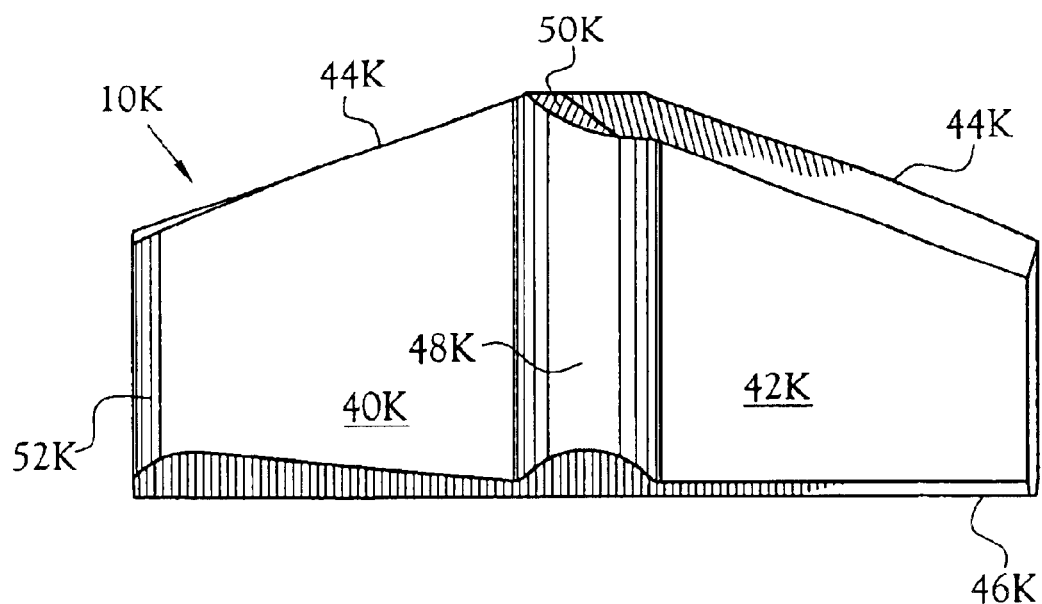
FIG. 49 is an elevation view of the roof bit blade insert of FIG. 48.
Figure 52:
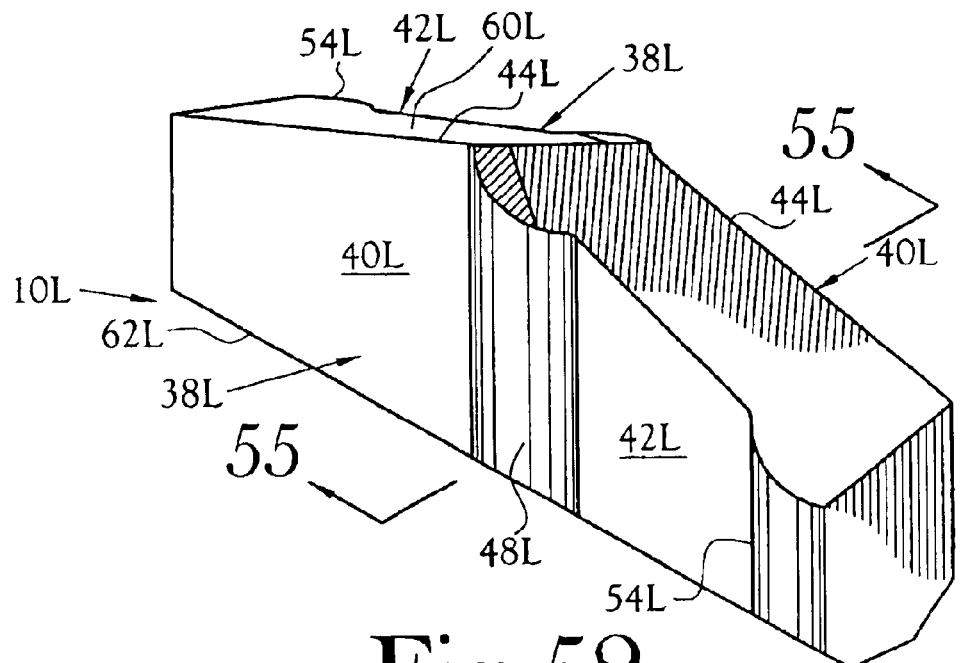
FIG. 52 is a perspective view of a further alternate embodiment of the roof bit blade insert of the present invention wherein the opposing faces are defined by intersecting vertical planes, wherein trailing end protrusions are provided, and wherein the leading end of each face defines an outward taper from the center of the blade insert to the outer edge thereof.
Figure 53:
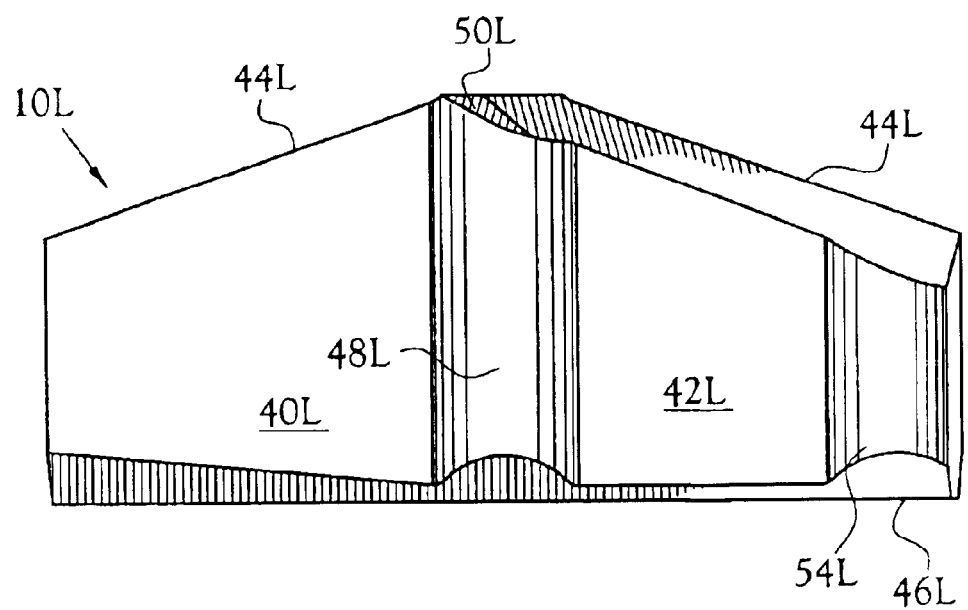
FIG. 53 is an elevation view of the roof bit blade insert of FIG. 52.

FIGS. 40–43 illustrate a further embodiment of the roof bit blade insert 10I of the present invention. The blade 10I defines the opposing faces 38I which are tapered from the top edge 60I to the bottom edge 62I thereof. The leading end 40I of each face 38I defines a butterfly protrusion 56I. Further, the trailing end 42I of each face 38I defines a protrusion 54I. The protrusions 54I defines an arcuate configuration. The butterfly protrusion 56I of the preferred embodiment interferes with the slot 16 of the conventional drill body 12, as does the trailing end protrusion 54I. Accordingly, as illustrated in FIG. 42, the blade 10I is used in association with the drill body 12B illustrated in FIG. 30. The drill body longitudinal recess 26 as described is configured to closely receive the trailing end protrusion 54I and the leading end beveled recess 28 is configured to closely receive the protrusion 56I. In the alternative, as illustrated in FIG. 42A, the blade 10I is used in association with the drill body 12B' illustrated in FIG. 30A.

FIGS. 44–47 illustrate a further embodiment of the roof bit blade insert 10J of the present invention. The blade 10J defines the opposing faces 38J which are defined by intersecting vertical planes. The leading end 40J of each face 38J defines a butterfly protrusion 56J. The leading end 40J of each face 38J further defines a protrusion 52J, which is a curved relief surface transitioning from the protrusion 56J to the end of the blade 10J. Further, the trailing end 42J of each face 38J defines a protrusion 54J. Each of the protrusions 52J,54J defines an arcuate configuration. The butterfly protrusion 56J of the preferred embodiment interferes with the slot 16 of the conventional drill body 12, as does the trailing end protrusion 54J. Accordingly, as illustrated in FIG. 46, the blade 10J is used in association with the drill body 12B illustrated in FIG. 30. The drill body longitudinal recess 26 as described is configured to closely receive the trailing end protrusion 54J and the leading end beveled recess 28 is configured to closely receive the protrusion 56J. In the alternative, as illustrated in FIG. 46A, the blade 10J is used in association with the drill body 12B' illustrated in FIG. 30A.

FIGS. 48–51 illustrate a further embodiment of the roof bit blade insert 10K of the present invention. The blade 10K defines the opposing faces 38K which are defined by intersecting vertical planes. The leading end 40K of each face 38K defines a butterfly protrusion 56K. The leading end 40K of each face 38K further defines a protrusion 52K, which is a curved relief surface transitioning from the protrusion 56K to the end of the blade 10K. The butterfly protrusion 56K of the preferred embodiment interferes with the slot 16 of the conventional drill body 12. Accordingly, as illustrated in FIG. 50, the blade 10K is used in association with the drill body 12C illustrated in FIG. 35. The drill body leading end beveled recess 28 is configured to closely receive the protrusion 56K. In the alternative, as illustrated in FIG. 50A, the blade 10K is used in association with the drill body 12C' illustrated in FIG. 35A.

Figure 54:
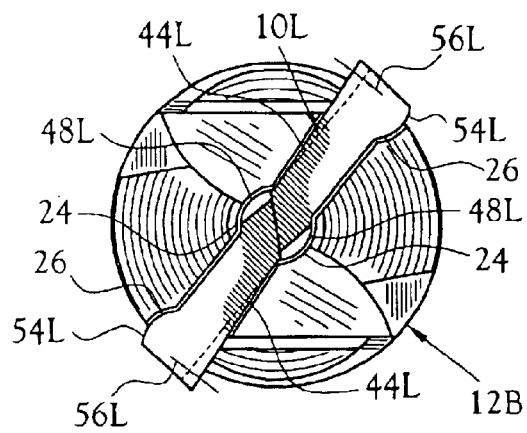
FIG. 54 is a top plan view of the roof bit blade insert of FIG. 52 inserted in the drill body of FIG. 30.
Figure 54A:
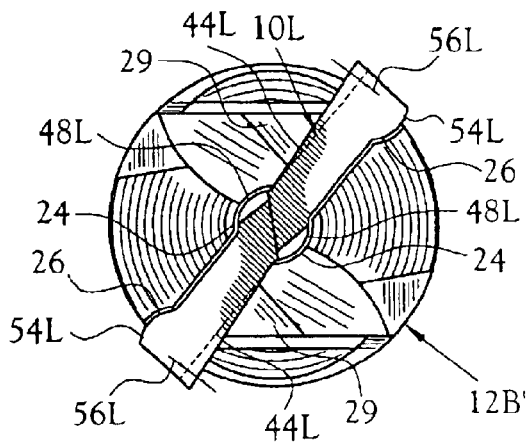
FIG. 54A is a top plan view of the roof bit blade insert of FIG. 52 inserted in the drill body of FIG. 30A.
Figure 55:
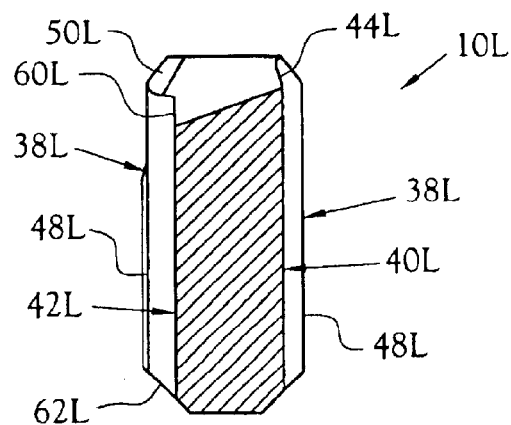
FIG. 55 is an end view, in section along lines 55—55, of the roof bit blade of FIG. 52.
Figure 56:
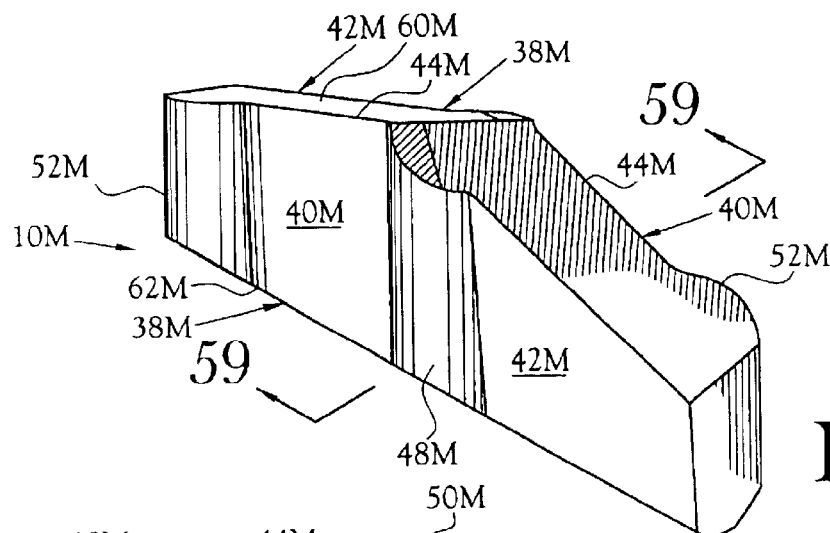
FIG. 56 is a perspective view of a further alternate embodiment of the roof bit blade insert of the present invention wherein the opposing faces are tapered from the top edge to the bottom edge thereof, and wherein leading end protrusions are provided, the leading edge protrusions being defined by a compound curve.
Figure 57:
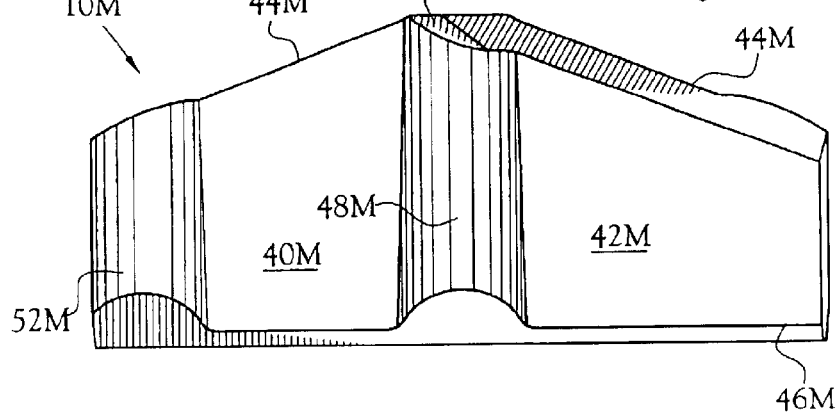
FIG. 57 is an elevation view of the roof bit blade insert of FIG. 56.

FIGS. 52–55 illustrate a further embodiment of the roof bit blade insert 10L of the present invention. The blade 10L defines the opposing faces 38L which are defined by intersecting vertical planes. The leading end 40L of each face 38L defines a butterfly protrusion 56L. Further, the trailing end 42L of each face 38L defines a protrusion 54L. The protrusion 54L defines an arcuate configuration. The butterfly protrusion 56L of the preferred embodiment interferes with the slot 16 of the conventional drill body 12, as does the trailing end protrusion 54L. Accordingly, as illustrated in FIG. 54, the blade 10L is used in association with the drill body 12B illustrated in FIG. 30. The drill body longitudinal recess 26 as described is configured to closely receive the trailing end protrusion 54L and the leading end beveled recess 28 is configured to closely receive the protrusion 56L. In the alternative, as illustrated in FIG. 54A, the blade 10L is used in association with the drill body 12B' illustrated in FIG. 30A.

Figure 58:
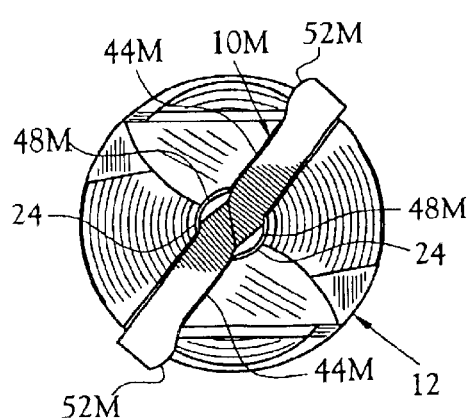
FIG. 58 is a top plan view of the roof bit blade insert of FIG. 56 inserted in the drill body of FIG. 4.
Figure 59:
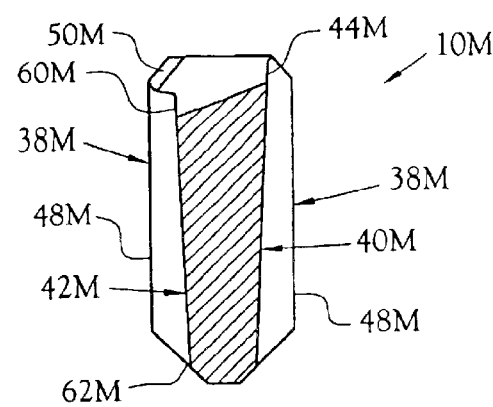
FIG. 59 is an end view, in section along lines 59—59, of the roof bit blade of FIG. 56.
Figure 60:
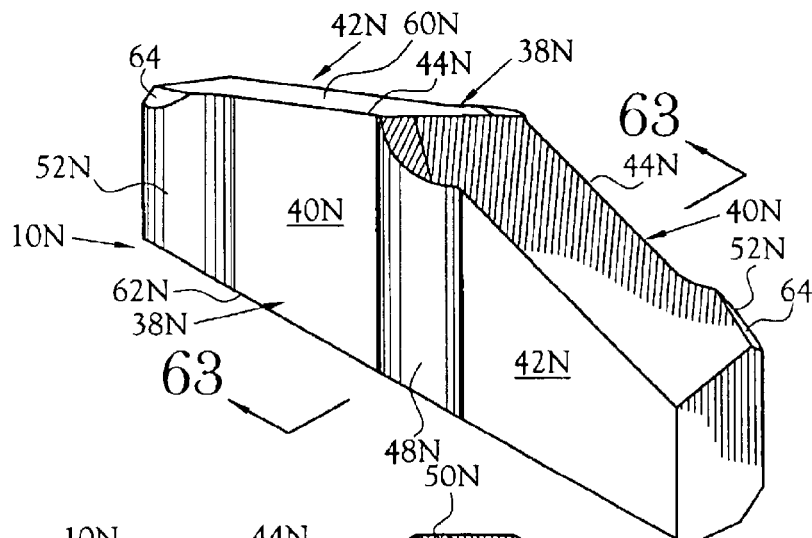
FIG. 60 is a perspective view of a further alternate embodiment of the roof bit blade insert of the present invention wherein the opposing faces are parallel to one another, and wherein leading end protrusions are provided, the leading edge protrusions being defined by a compound curve.
Figure 61:
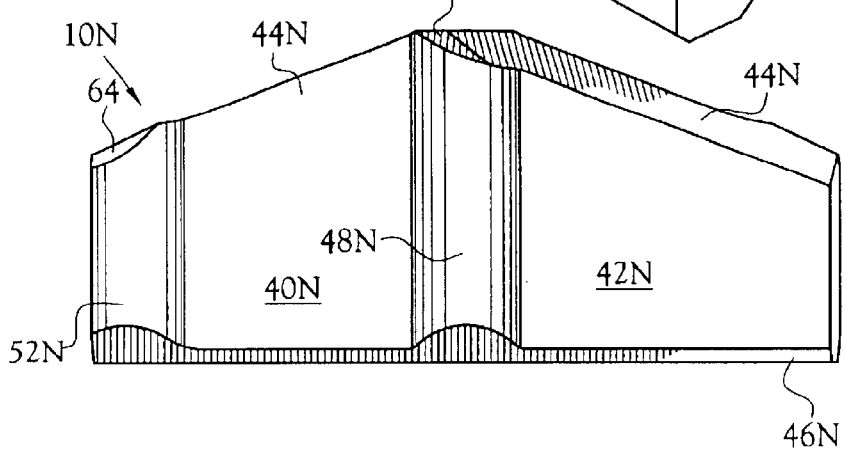
FIG. 61 is an elevation view of the roof bit blade insert of FIG. 60.

FIGS. 56–59 illustrate a further alternate embodiment of the roof bit blade insert 10M of the present invention. The blade 10M defines the opposing faces 38M which are tapered from the top edge 60M to the bottom edge 62M thereof. The leading end 40M of each face 38M defines a protrusion 52M. The protrusion 52M defines compound curve configuration. As in the previous embodiment, the leading end protrusion 52M does not interfere with the slot 16 of the conventional drill body 12. Accordingly, as illustrated in FIG. 58, the blade 10M is used in association with the drill body 12 illustrated in FIG. 4.

Figure 62:
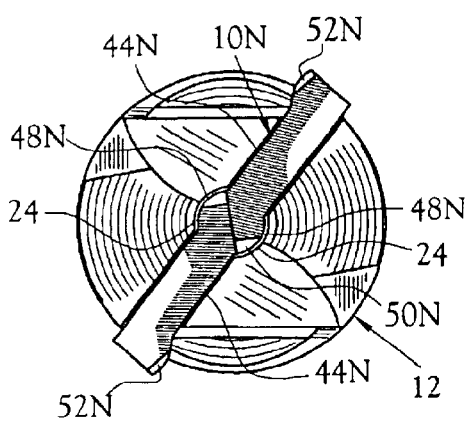
FIG. 62 is a top plan view of the roof bit blade insert of FIG. 60 inserted in the drill body of FIG. 4.
Figure 63:
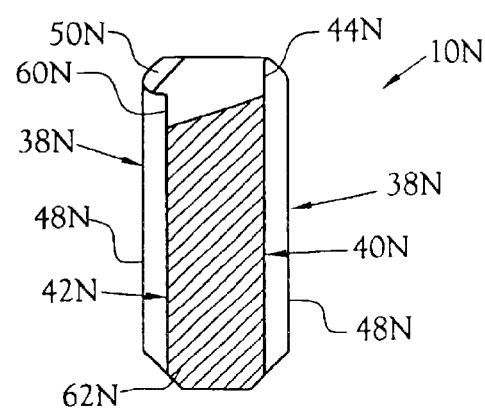
FIG. 63 is an end view, in section along lines 63—63, of the roof bit blade of FIG. 60.
Figure 65:
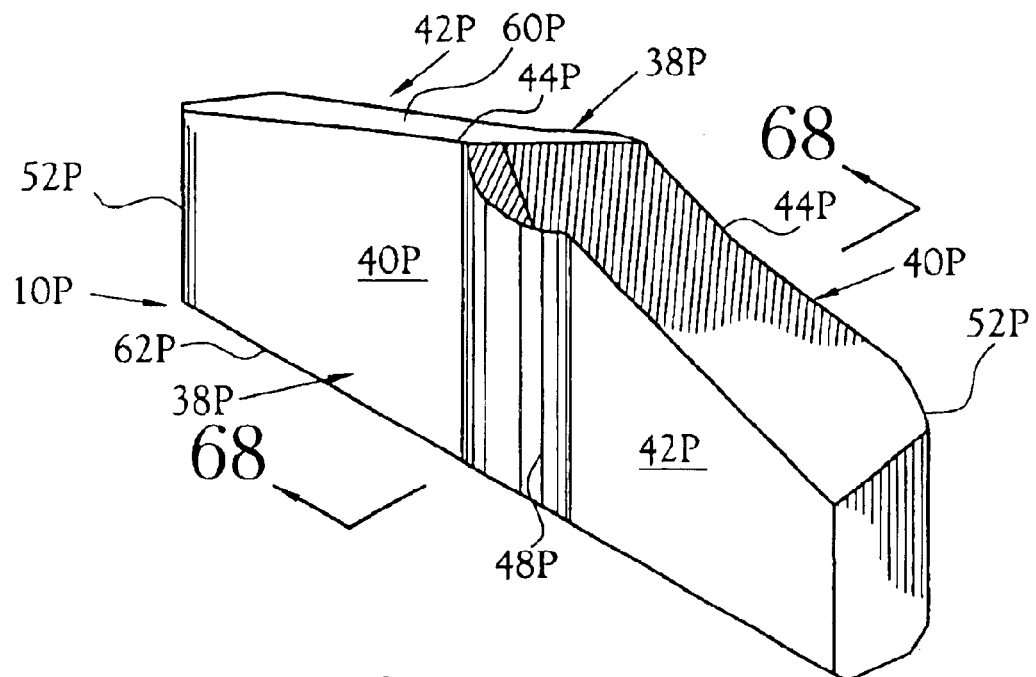
FIG. 65 is a perspective view of a further alternate embodiment of the roof bit blade insert of the present invention wherein a portion of the opposing faces are parallel to one another, wherein leading end protrusions are provided, and wherein the leading end of each face defines an outward taper from an approximate midpoint between the center of the blade insert and the outer edge of the blade insert to the outer edge thereof.
Figure 66:
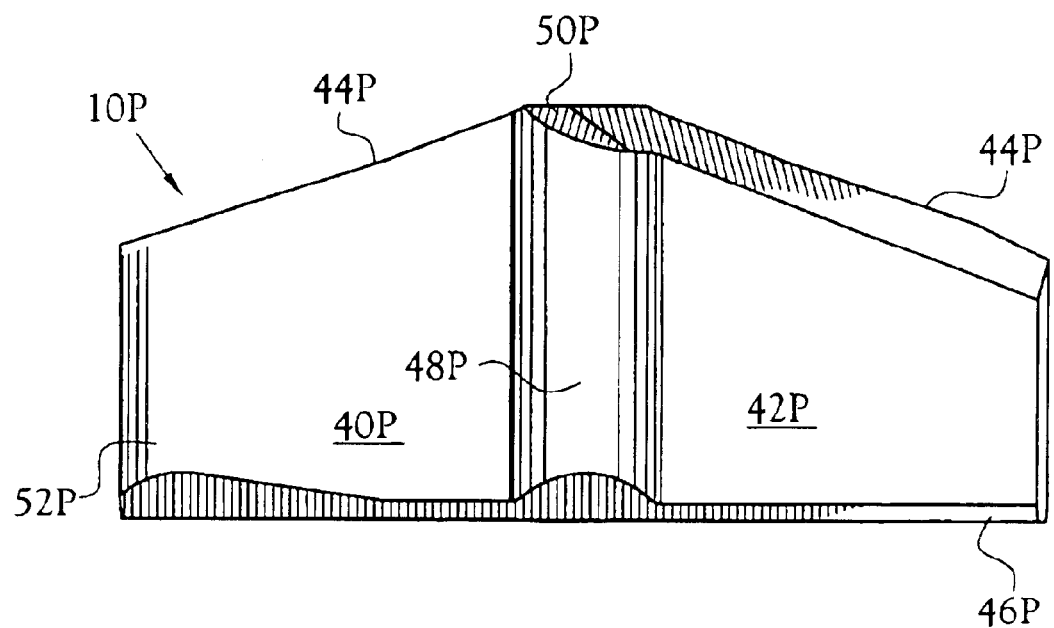
FIG. 66 is an elevation view of the roof bit blade insert of FIG. 65.

FIGS. 60–63 illustrate a further alternate embodiment of the roof bit blade insert 10N of the present invention. The blade 10N defines the opposing faces 38N which are parallel to one another. The leading end 40N of each face 38N defines a protrusion 52N. The protrusion 52N defines a compound curve configuration. As in the first embodiment, the leading end protrusion 52N does not interfere with the slot 16 of the conventional drill body 12. Accordingly, as illustrated in FIG. 62, the blade 10N is used in association with the drill body 12 illustrated in FIG. 4. The leading end protrusion 52N of the blade 10N define a relief 64 as a negative grind to enhance the useful life of the blade 10N. While the relief 64 is only shown in this embodiment, it will be understood that it may be incorporated in any of the blade 10 embodiments disclosed and described herein.

Figure 67:
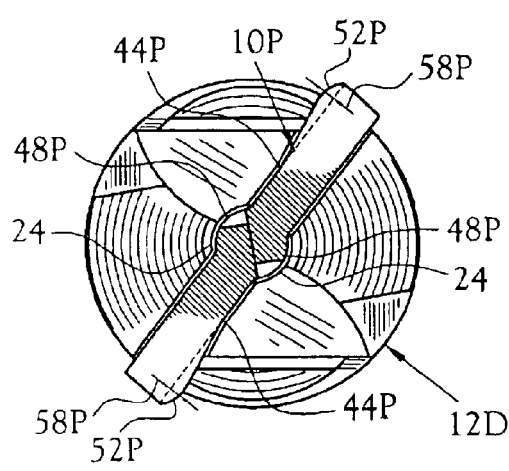
FIG. 67 is a top plan view of the roof bit blade insert of FIG. 65 inserted in the drill body of FIG. 64.
Figure 67A:
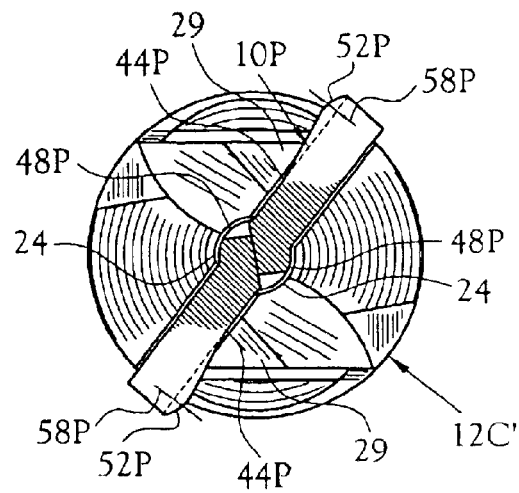
FIG. 67A is a top plan view of the roof bit blade insert of FIG. 65 inserted in the drill body of FIG. 35A.
Figure 68:
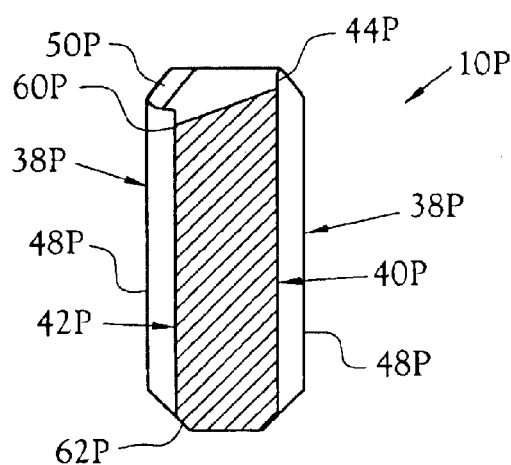
FIG. 68 is an end view, in section along lines 68—68, of the roof bit blade of FIG. 63.

FIGS. 65–68 illustrate a further embodiment of the roof bit blade insert 10P of the present invention. The blade 10P defines the opposing faces 38P, a central portion of which are parallel to one another. The leading end 40P of each face 38P defines a protrusion 58P which is an outward taper from an approximate midpoint between the center of the blade 10P and the outer edge of the blade 10P to the outer edge of the blade 10P. The protrusion 58P is otherwise referred to as a half-butterfly protrusion 58P. The leading end 40P of each face 38P further defines a protrusion 52P, which is a curved relief surface transitioning from the protrusion 58P to the end of the blade 10P. The half-butterfly protrusion 58P of the preferred embodiment interferes with the slot 16 of the conventional drill body 12. Accordingly, as illustrated in FIG. 67, the blade 10P is used in association with the drill body 12D illustrated in FIG. 64. The drill body leading end beveled recess 28A is configured to closely receive the protrusion 58P. In the alternative, as illustrated in FIG. 67A, the blade 10P is used in association with the drill body 12C' illustrated in FIG. 35A. While the blade 10P is illustrated as having parallel faces 38P, and without trailing end protrusions 54, it will be understood that the blade 10P may be modified to include tapered faces 38P and/or trailing end protrusions 54 which have been fully described herein in association with other blades 10, or to eliminate the leading end protrusions 52P.

FIGS. 70–73 illustrate a further alternate embodiment of the roof bit blade insert 10Q of the present invention. The blade 10Q defines the opposing faces 38Q which are parallel to one another. A notch 66Q is defined at the center of the blade 10Q. The center notch 66Q reduces stress created by grinding and allows rock to be more efficiently broken and removed. The blade 10Q is especially suited for use with laminated materials, where horizontal cracks are formed between layers of rock. A curved transition 70Q is provided to allow for grinding of the blade 10Q without immediately defining a point at the top of the cutting edge 44Q, thereby strengthening the transition 70Q and extending the life of the blade 10Q.

Figures 72, 73:
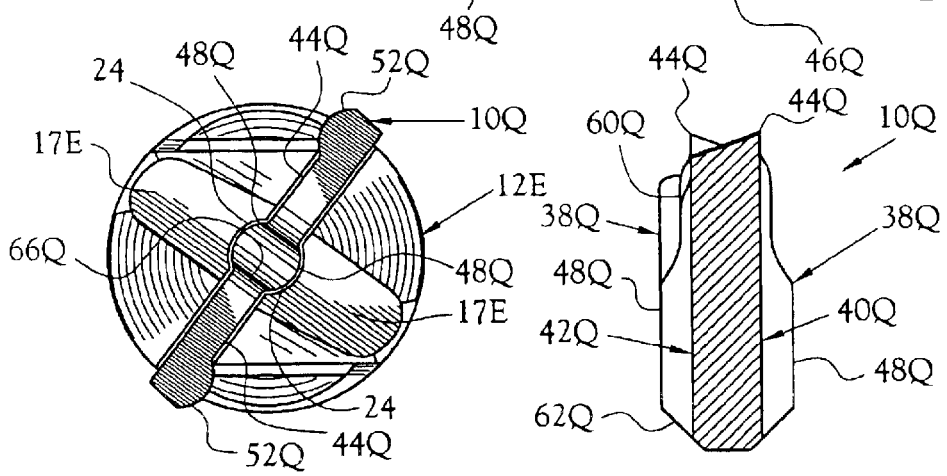
FIG. 72 is a top plan view of the roof bit blade insert of FIG. 70 inserted in the drill body of FIG. 69.
FIG. 73 is an end view, in section along lines 73—73, of the roof bit blade of FIG. 70.

The leading end 40Q of each face 38Q defines a protrusion 52Q. The protrusion 52Q defines an arcuate configuration which does not interfere with the slot 16 of the conventional drill body 12. Accordingly, as illustrated in FIG. 72, the blade 10Q is used in association with the drill body 12E illustrated in FIG. 69, which defines orthogonal slots 17E to evacuate material broken in the center notch 66Q. While the blade 10Q is illustrated as having parallel faces 38Q, and without trailing end protrusions 54, it will be understood that the blade 10Q may be modified to include tapered faces 38Q and/or trailing end protrusions 54 which have been fully described herein in association with other blades 10, or to eliminate the leading end protrusions 52Q. Further, it will be understood that the blade 10Q may be modified to include butterfly protrusions 56 or half-butterfly 58 protrusions as well.

FIGS. 74–77 illustrate a further alternate embodiment of the roof bit blade insert 10R of the present invention. The blade 10R defines the opposing faces 38R which are parallel to one another. A notch 66R is defined at the center of the blade 10R. The centered protrusion 48R defines a relief 68 immediately below the notch 66R. In this embodiment, as compared to the blade 10Q, the blade 10R is suited for all types of strata or materials. The center notch 66R reduces stress created by grinding and allows the drilled material to be more efficiently broken and removed. A curved transition 70R is provided to allow for grinding of the blade 10R without immediately defining a point at the top of the cutting edge 44R, thereby strengthening the transition 70R and extending the life of the blade 10R.

The leading end 40R of each face 38R defines a protrusion 52R. The protrusion 52R defines an arcuate configuration which does not interfere with the slot 16 of the conventional drill body 12. Accordingly, as illustrated in FIG. 75, the blade 10R is used in association with the drill body 12E illustrated in FIG. 69, which defines orthogonal slots 17E to evacuate material broken in the center notch 66R. While the blade 10R is illustrated as having parallel faces 38R, and without trailing end protrusions 54, it will be understood that the blade 10R may be modified to include tapered faces 38R and/or trailing end protrusions 54 which have been fully described herein in association with other blades 10, or to eliminate the leading end protrusions 52R. Further, it will be understood that the blade 10R may be modified to include butterfly protrusions 56 or half-butterfly 58 protrusions as well.

Figure 78:
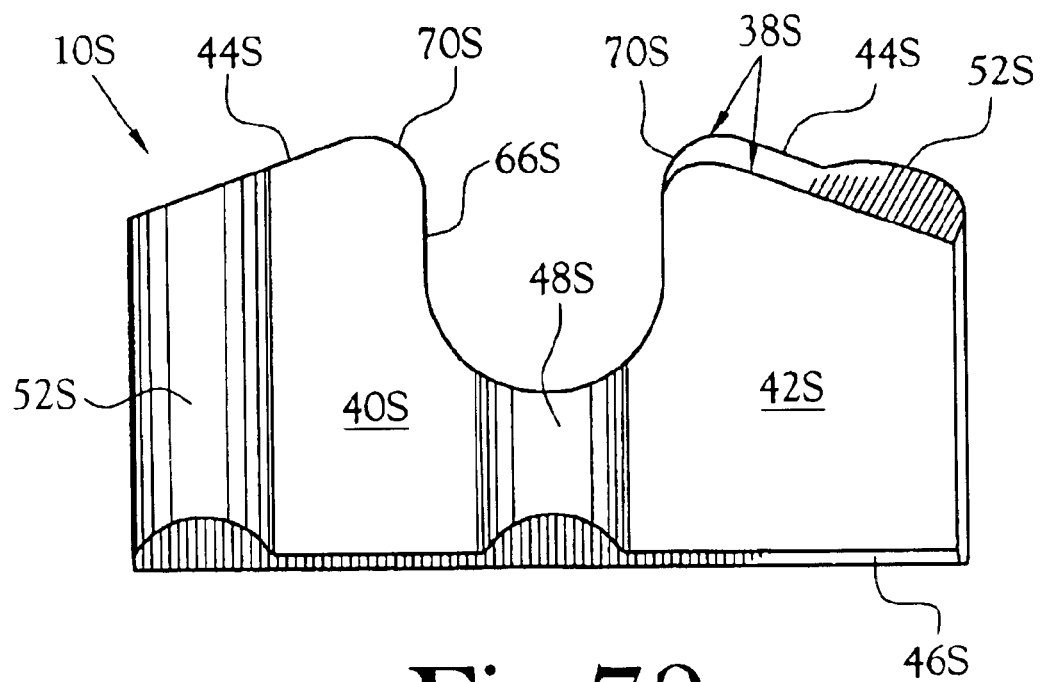
FIG. 78 is an elevation view of a further alternate embodiment of the roof bit blade insert of the present invention wherein the opposing faces are parallel to one another, wherein leading end protrusions are provided, and wherein an enlarged center notch is defined.

FIG. 78 illustrates a further alternate embodiment of the roof bit blade insert 10S of the present invention. The blade 10S defines the opposing faces 38S which are parallel to one another. An enlarged notch 66S is defined at the center of the blade 10S. A curved transition 70S is provided to allow for grinding of the blade 10S without immediately defining a point at the top of the cutting edge 44S, thereby strengthening the transition 70S and extending the life of the blade 10S.

The leading end 40S of each face 38S defines a protrusion 52S. The protrusion 52S defines an arcuate configuration which does not interfere with the slot 16 of the conventional drill body 12. Accordingly, although not illustrated, the blade 10S is used in association with the drill body 12E illustrated in FIG. 69, which defines orthogonal slots 17E to evacuate material broken in the center notch 66S. While the blade 10S is illustrated as having parallel faces 38S, and without trailing end protrusions 54, it will be understood that the blade 10S may be modified to include tapered faces 38S and/or trailing end protrusions 54 which have been fully described herein in association with other blades 10, or to eliminate the leading end protrusions 52S. Further, it will be understood that the blade 10S may be modified to include butterfly protrusions 56 or half-butterfly 58 protrusions as well.

Figure 79:
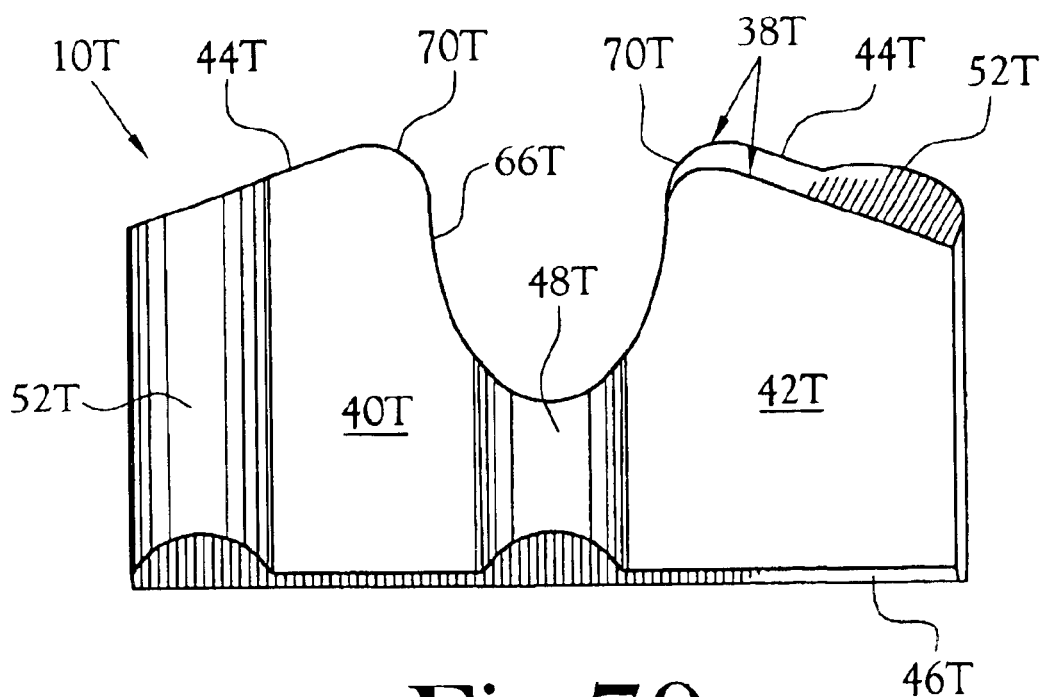
FIG. 79 is an elevation view of a further alternate embodiment of the roof bit blade insert of the present invention wherein the opposing faces are parallel to one another, wherein leading end protrusions are provided, and wherein an enlarged elliptical center notch is defined.

FIG. 79 illustrates a further alternate embodiment of the roof bit blade insert 10T of the present invention. The blade 10T defines the opposing faces 38T which are parallel to one another. An elliptical notch 66T is defined at the center of the blade 10T. A curved transition 70T is provided to allow for grinding of the blade 10T without immediately defining a point at the top of the cutting edge 44T, thereby strengthening the transition 70T and extending the life of the blade 10T.

The leading end 40T of each face 38T defines a protrusion 52T. The protrusion 52T defines an arcuate configuration which does not interfere with the slot 16 of the conventional drill body 12. Accordingly, although not illustrated, the blade 10T is used in association with the drill body 12E illustrated in FIG. 69, which defines orthogonal slots 17E to evacuate material broken in the center notch 66T. While the blade 10T is illustrated as having parallel faces 38T, and without trailing end protrusions 54, it will be understood that the blade 10T may be modified to include tapered faces 38T and/or trailing end protrusions 54 which have been fully described herein in association with other blades 10, or to eliminate the leading end protrusions 52T. Further, it will be understood that the blade 10T may be modified to include butterfly protrusions 56 or half-butterfly 58 protrusions as well.

Figure 80:
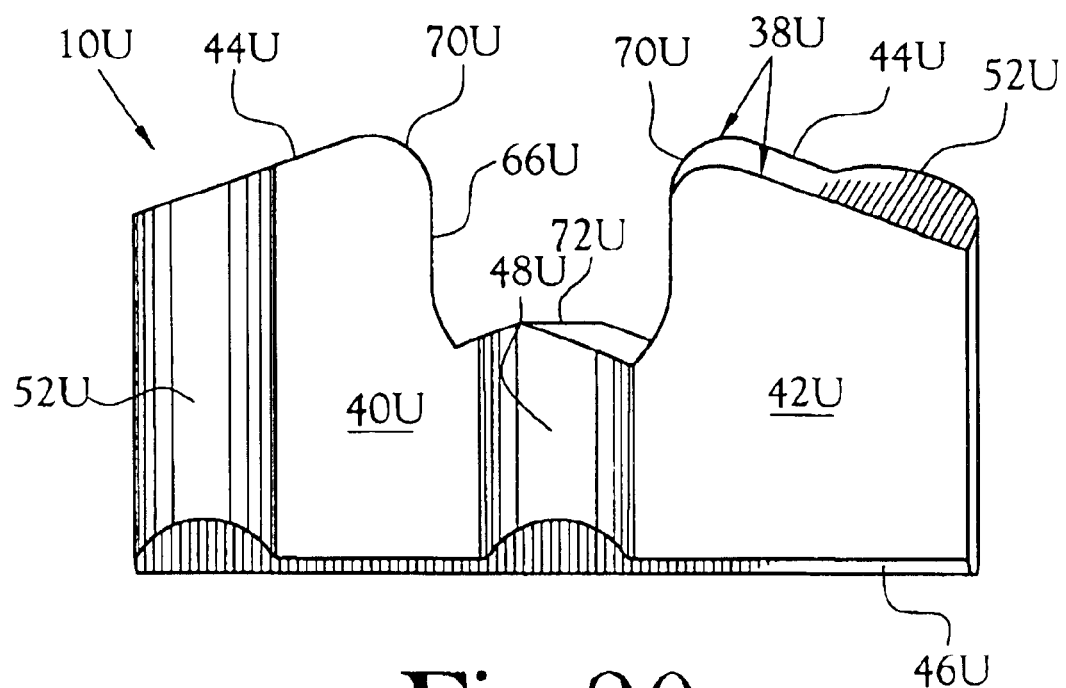
FIG. 80 is an elevation view of a further alternate embodiment of the roof bit blade insert of the present invention wherein the opposing faces are parallel to one another, wherein leading end protrusions are provided, wherein an enlarged center notch is defined, and wherein a drill point is defined at the bottom of the enlarged center notch.

FIG. 80 illustrates a further alternate embodiment of the roof bit blade insert 10U of the present invention. The blade 10U defines the opposing faces 38U which are parallel to one another. An enlarged notch 66U is defined at the center of the blade 10U. A curved transition 70U is provided to allow for grinding of the blade 10U without immediately defining a point at the top of the cutting edge 44U, thereby strengthening the transition 70U and extending the life of the blade 10U. A drill point 72U is defined at the bottom of the notch 66U to assist in breaking material left in the center of the bore hole.

The leading end 40U of each face 38U defines a protrusion 52U. The protrusion 52U defines an arcuate configuration which does not interfere with the slot 16 of the conventional drill body 12. Accordingly, the blade 10U is used in association with the drill body 12E illustrated in FIG. 69, which defines orthogonal slots 17E to evacuate material broken in the center notch 66U. While the blade 10U is illustrated as having parallel faces 38U, and without trailing end protrusions 54, it will be understood that the blade 10U may be modified to include tapered faces 38U and/or trailing end protrusions 54 which have been fully described herein in association with other blades 10, or to eliminate the leading end protrusions 52U. Further, it will be understood that the blade 10U may be modified to include butterfly protrusions 56 or half-butterfly 58 protrusions as well.

Figure 81:
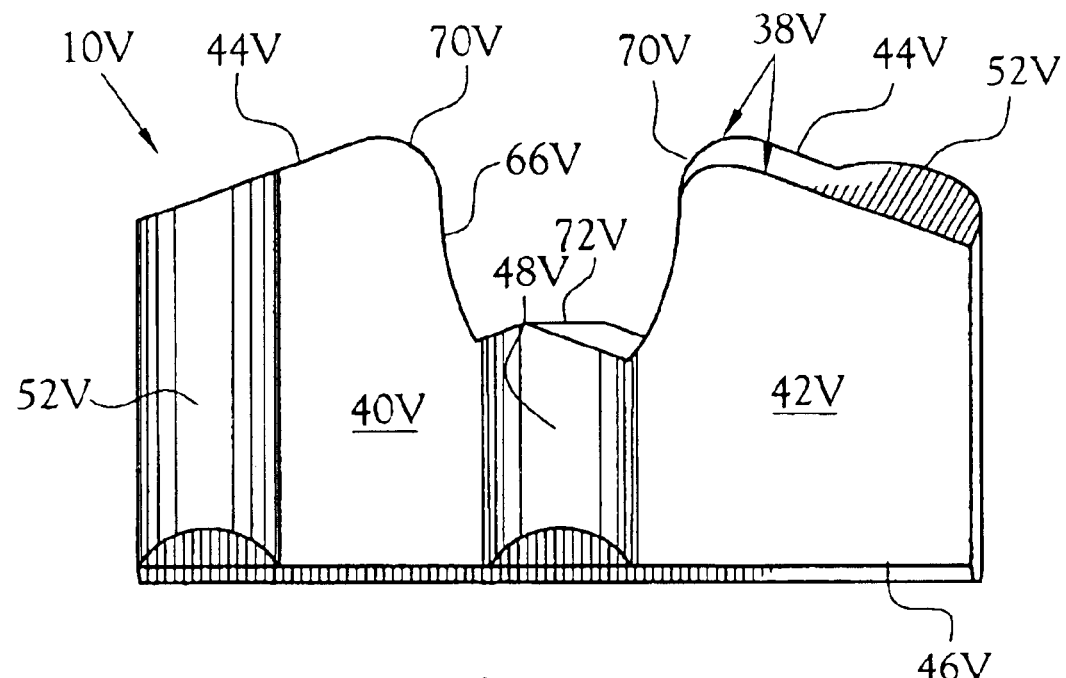
FIG. 81 is an elevation view of a further alternate embodiment of the roof bit blade insert of the present invention wherein the opposing faces are parallel to one another, wherein leading end protrusions are provided, wherein an enlarged elliptical center notch is defined, and wherein a drill point is defined at the bottom of the enlarged elliptical center notch.

FIG. 81 illustrates a further alternate embodiment of the roof bit blade insert 10V of the present invention. The blade 10V defines the opposing faces 38V which are parallel to one another. An elliptical notch 66V is defined at the center of the blade 10V. A curved transition 70V is provided to allow for grinding of the blade 10V without immediately defining a point at the top of the cutting edge 44V, thereby strengthening the transition 70V and extending the life of the blade 10V. A drill point 72V is defined at the bottom of the notch 66V to assist in breaking material left in the center of the bore hole.

The leading end 40V of each face 38V defines a protrusion 52V. The protrusion 52V defines an arcuate configuration which does not interfere with the slot 16 of the conventional drill body 12. Accordingly, the blade 10V is used in association with the drill body 12E illustrated in FIG. 69, which defines orthogonal slots 17E to evacuate material broken in the center notch 66V. While the blade 10V is illustrated as having parallel faces 38V, and without trailing end protrusions 54, it will be understood that the blade 10V may be modified to include tapered faces 38V and/or trailing end protrusions 54 which have been fully described herein in association with other blades 10, or to eliminate the leading end protrusions 52V. Further, it will be understood that the blade 10V may be modified to include butterfly protrusions 56 or half-butterfly 58 protrusions as well.

Figure 82:
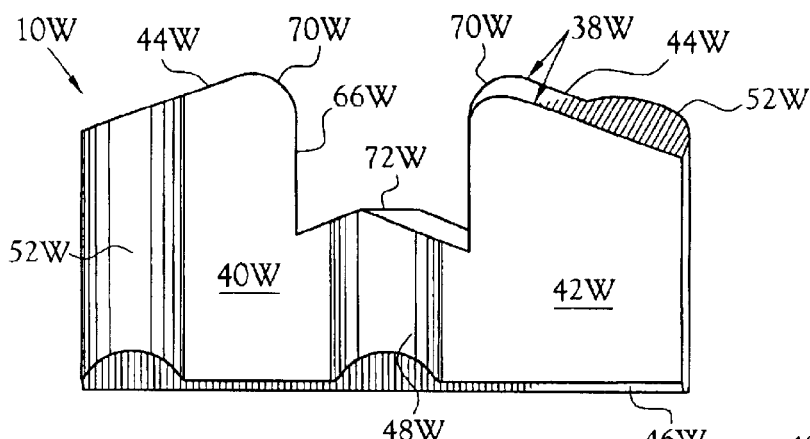
FIG. 82 is an elevation view of a further alternate embodiment of the roof bit blade insert of the present invention wherein the opposing faces are parallel to one another, wherein leading end protrusions are provided, wherein an enlarged center notch having parallel sides is defined, and wherein a drill point is defined at the bottom of the enlarged center notch.
Figure 83:
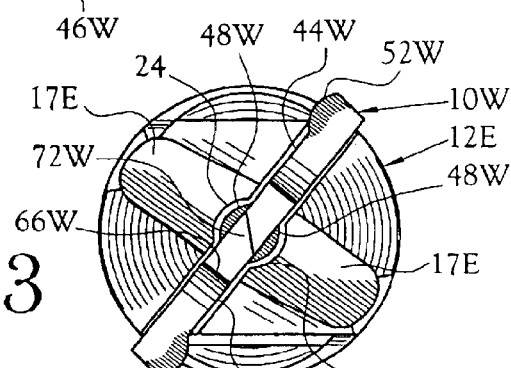
FIG. 83 is a top plan view of the roof bit blade insert of FIG. 82 inserted in the drill body of FIG. 69.

FIGS. 82 and 83 illustrate a further alternate embodiment of the roof bit blade insert 10W of the present invention. The blade 10W defines the opposing faces 38W which are parallel to one another. A rectangular notch 66W is defined at the center of the blade 10W. A curved transition 70W is provided to allow for grinding of the blade 10W without immediately defining a point at the top of the cutting edge 44W, thereby strengthening the transition 70W and extending the life of the blade 10W. A drill point 72W is defined at the bottom of the notch 66W to assist in breaking material left in the center of the bore hole.

The leading end 40W of each face 38W defines a protrusion 52W. The protrusion 52W defines an arcuate configuration which does not interfere with the slot 16 of the conventional drill body 12. Accordingly, as illustrated in FIG. 83, the blade 10W is used in association with the drill body 12E illustrated in FIG. 69, which defines orthogonal slots 17E to evacuate material broken in the center notch 66W. While the blade 10W is illustrated as having parallel faces 38W, and without trailing end protrusions 54, it will be understood that the blade 10W may be modified to include tapered faces 38W and/or trailing end protrusions 54 which have been fully described herein in association with other blades 10, or to eliminate the leading end protrusions 52W. Further, it will be understood that the blade 10W may be modified to include butterfly protrusions 56 or half-butterfly 58 protrusions as well.

Figure 84:
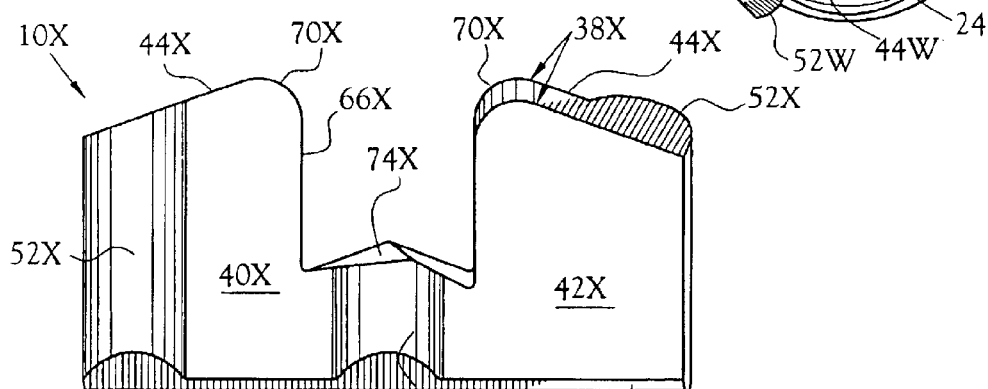
FIG. 84 is an elevation view of a further alternate embodiment of the roof bit blade insert of the present invention wherein the opposing faces are parallel to one another, wherein leading end protrusions are provided, wherein an enlarged center notch having parallel sides is defined, and wherein a chisel point is defined at the bottom of the enlarged center notch.
Figure 85:
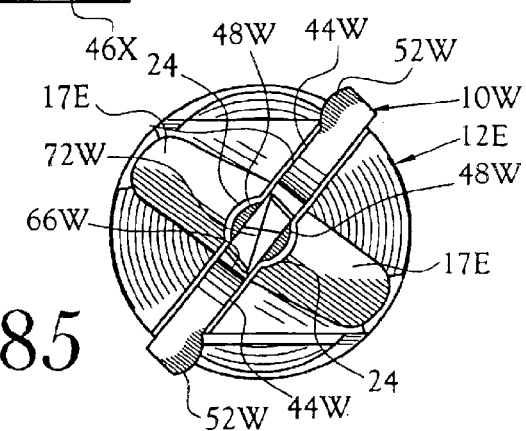
FIG. 85 is a top plan view of the roof bit blade insert of FIG. 84 inserted in the drill body of FIG. 69.
Figure 87:
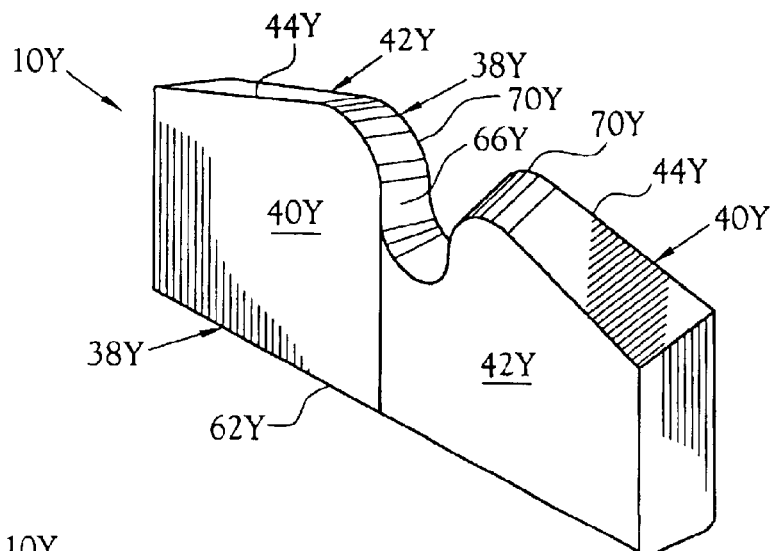
FIG. 87 is a perspective view of a further alternate embodiment of the roof bit blade insert of the present invention wherein the opposing faces are defined by intersecting parallel planes, wherein the centered protrusions are omitted, and wherein the leading end of each face defines an outward taper from the center of the blade insert to the outer edge thereof.
Figure 88:
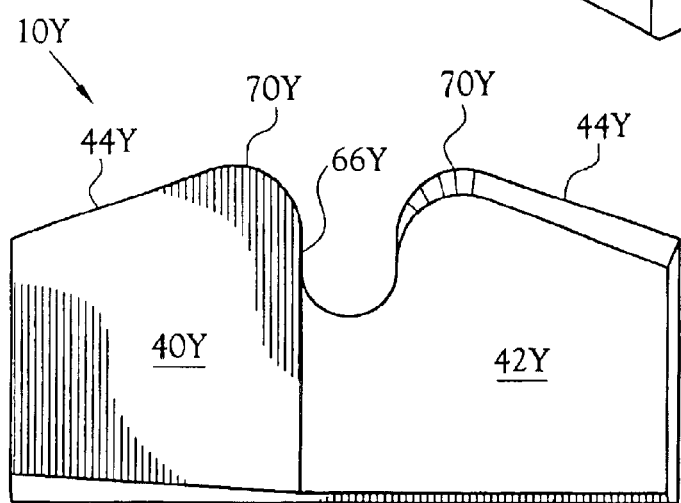
FIG. 88 is an elevation view of the roof bit blade insert of FIG. 87.

FIGS. 84 and 85 illustrate a further alternate embodiment of the roof bit blade insert 10X of the present invention. The blade 10X defines the opposing faces 38X which are parallel to one another. A rectangular notch 66X is defined at the center of the blade 10X. A curved transition 70X is provided to allow for grinding of the blade 10X without immediately defining a point at the top of the cutting edge 44X, thereby strengthening the transition 70X and extending the life of the blade 10X. A chisel point 74X is defined at the bottom of the notch 66X to assist in breaking material left in the center of the bore hole.

The leading end 40X of each face 38X defines a protrusion 52X. The protrusion 52X defines an arcuate configuration which does not interfere with the slot 16 of the conventional drill body 12. Accordingly, as illustrated in FIG. 85, the blade 10X is used in association with the drill body 12E illustrated in FIG. 69, which defines orthogonal slots 17E to evacuate material broken in the center notch 66X. While the blade 10X is illustrated as having parallel faces 38X, and without trailing end protrusions 54, it will be understood that the blade 10X may be modified to include tapered faces 38X and/or trailing end protrusions 54 which have been fully described herein in association with other blades 10, or to eliminate the leading end protrusions 52X. Further, it will be understood that the blade 10X may be modified to include butterfly protrusions 56 or half-butterfly 58 protrusions as well.

Figures 89, 89A:
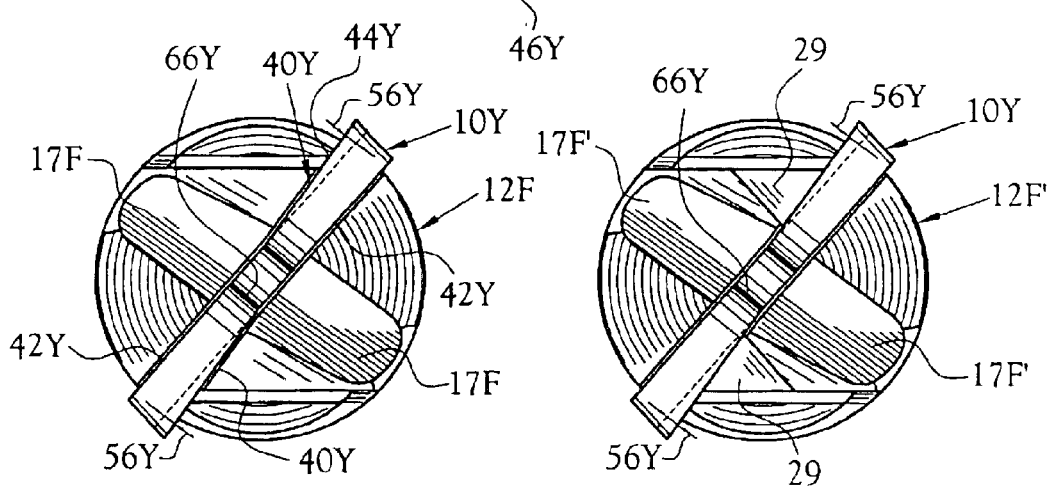
FIG. 89 is a top plan view of the roof bit blade insert of FIG. 87 inserted in the drill body of FIG. 86.
FIG. 89A is a top plan view of the roof bit blade insert of FIG. 87 inserted in the drill body of FIG. 86A.

FIGS. 87–89A illustrate a further embodiment of the roof bit blade insert 10Y of the present invention. The blade 10Y defines the opposing faces 38Y which are defined by intersecting vertical planes. The leading end 40Y of each face 38Y defines a butterfly protrusion 56Y. The blade 10Y does not define a centered protrusion 48 as in other embodiments. However, the butterfly protrusions 56Y serve to center the blade 10Y in the drill body slot 16. The butterfly protrusion 56Y of the preferred embodiment interferes with the slot 16 of the conventional drill body 12. Accordingly, as illustrated in FIG. 89, the blade 10Y is used in association with the drill body 12F illustrated in FIG. 86, which defines orthogonal slots 17F to evacuate material broken in the center notch 66Y. A curved transition 70Y is provided to allow for grinding of the blade 10Y without immediately defining a point at the top of the cutting edge 44Y, thereby strengthening the transition 70Y and extending the life of the blade 10Y. The drill body leading end beveled recess 28 is configured to closely receive the protrusion 56Y. In the alternative, as illustrated in FIG. 89A, the blade 10Y is used in association with the drill body 12F' illustrated in FIG. 86A.

Figure 91:
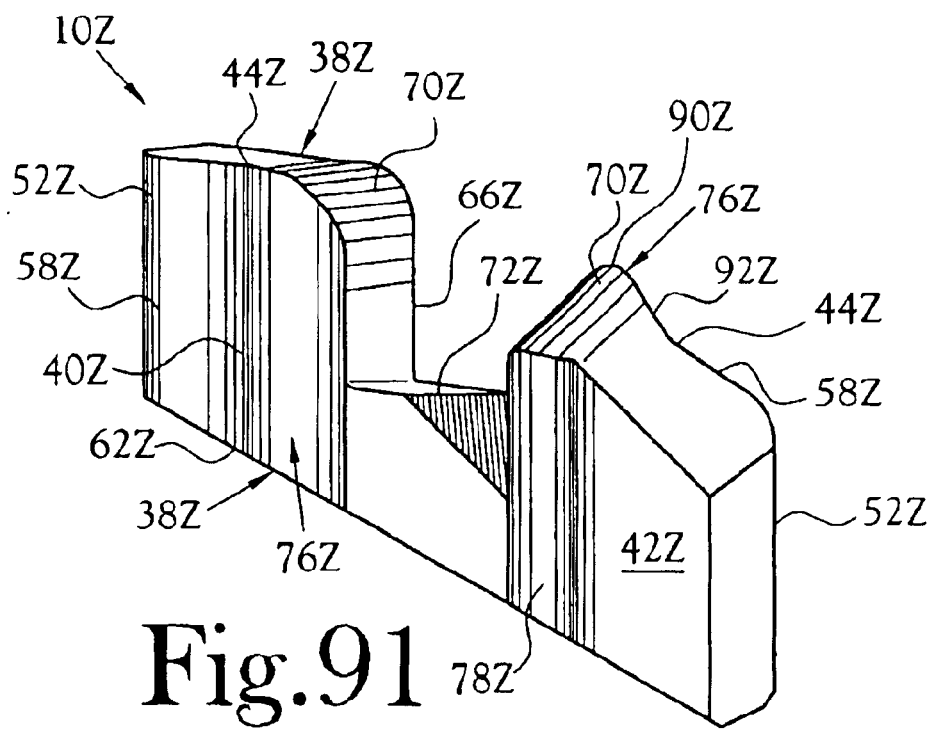
FIG. 91 is a perspective view of a further alternate embodiment of the roof bit blade insert of the present invention wherein the opposing faces are parallel to one another, wherein a rectangular center notch is defined, wherein a drill point is defined at the bottom of the center notch, wherein the leading end of each face defines a half-butterfly protrusion and a curved relief surface transitioning from the protrusion to the end of the blade, wherein each of the leading ends defines a medial protrusion defining a radiused surface terminating at the rectangular notch and a sloped surface terminating proximate the half-butterfly protrusion, and wherein each of the trailing ends defines a medial protrusion which defines a radiused surface terminating at the rectangular notch and toward the distal end of the face.
Figure 92:
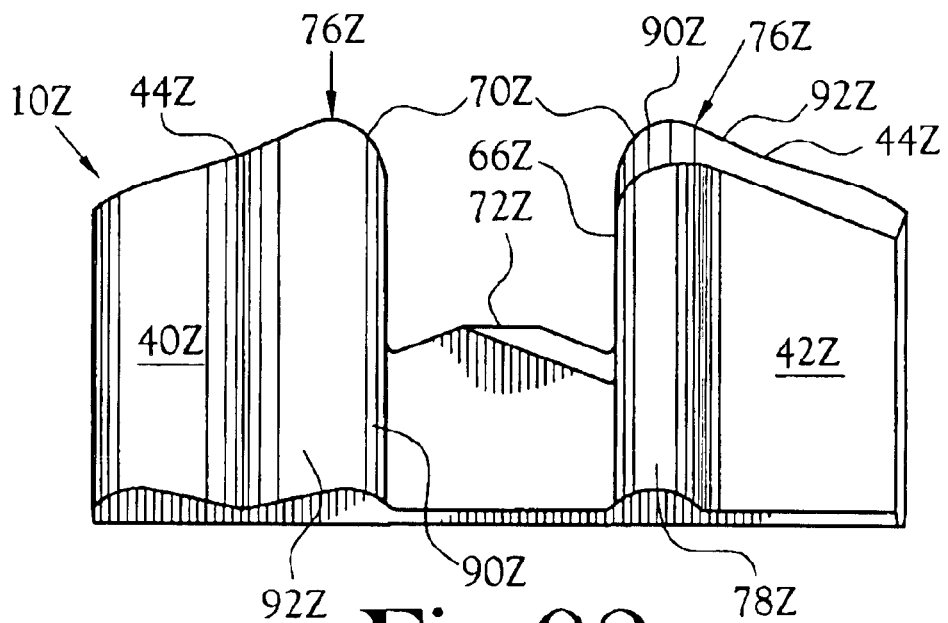
FIG. 92 is an elevation view of the roof bit blade insert of FIG. 91.
Figure 93:
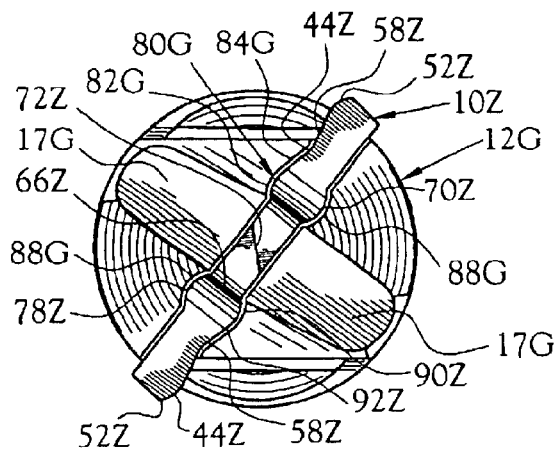
FIG. 93 is a top plan view of the roof bit blade insert of FIG. 91 inserted in the drill body of FIG. 90.

FIGS. 91–93 illustrate a further alternate embodiment of the roof bit blade insert 10Z of the present invention. The blade 10Z defines the opposing faces 38Z which are parallel to one another. A rectangular notch 66Z is defined at the center of the blade 10Z. A curved transition 70Z is provided to allow for grinding of the blade 10Z without immediately defining a point at the top of the cutting edge 44Z, thereby strengthening the transition 70Z and extending the life of the blade 10Z. A drill point 72Z is defined at the bottom of the notch 66Z to assist in breaking material left in the center of the bore hole.

The leading end 40Z of each face 38Z defines a half-butterfly protrusion 58Z. The leading end 40Z of each face 38Z further defines a protrusion 52Z, which is a curved relief surface transitioning from the protrusion 58Z to the end of the blade 10Z. Each of the leading ends 40Z defines a medial protrusion 76Z defining a radiused surface 90Z terminating at the rectangular notch 66Z and a sloped surface 92Z terminating proximate the half-butterfly protrusion 58Z. Finally, each of the trailing ends 42Z defines a medial protrusion 78Z which defines a radiused surface terminating at the rectangular notch 66Z and toward the distal end of the face 38Z.

The half-butterfly protrusion 58Z and the medial protrusions 76Z,78Z of the preferred embodiment interfere with the slot 16 of the conventional drill body 12. Accordingly, as illustrated in FIG. 93, the blade 10Z is used in association with the drill body 12G illustrated in FIG. 90, which defines orthogonal slots 17G to evacuate material broken in the center notch 66Z. The drill body leading end beveled recess 28G is configured to closely receive the half-butterfly protrusion 58Z. The medial recess 80G is configured to receive the medial protrusions 76Z. Each medial recess 88G is configured to closely receive a medial protrusion 78Z. While the blade 10Z is illustrated as having parallel faces 38Z, and without trailing end protrusions 54, it will be understood that the blade 10Z may be modified to include tapered faces 38Z and/or trailing end protrusions 54 which have been fully described herein in association with other blades 10.

Figure 97:
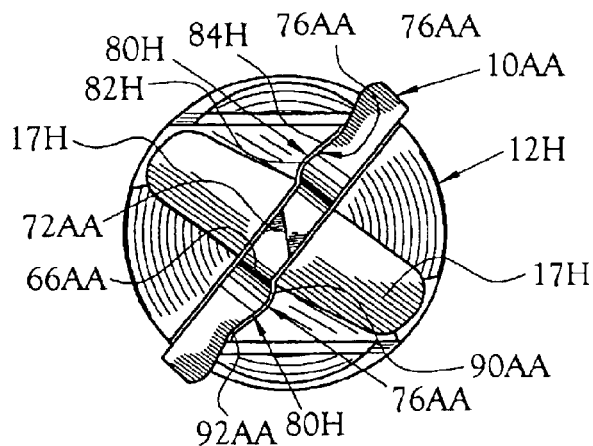
FIG. 97 is a top plan view of the roof bit blade insert of FIG. 95 inserted in the drill body of FIG. 94.
Figure 95:
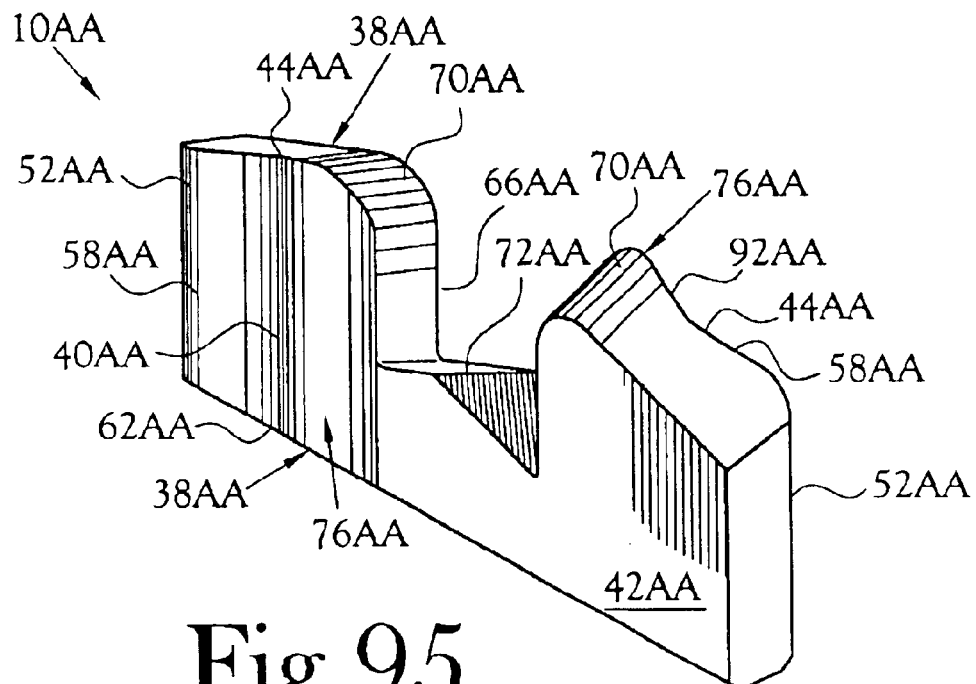
FIG. 95 is a perspective view of a further alternate embodiment of the roof bit blade insert of the present invention wherein the opposing faces are parallel to one another, wherein a rectangular center notch is defined, wherein a drill point is defined at the bottom of the center notch, wherein the leading end of each face defines a half-butterfly protrusion and a curved relief surface transitioning from the protrusion to the end of the blade, and wherein each of the leading ends defines a medial protrusion defining a radiused surface terminating at the rectangular notch and a sloped surface terminating proximate the half-butterfly protrusion.
Figure 96:
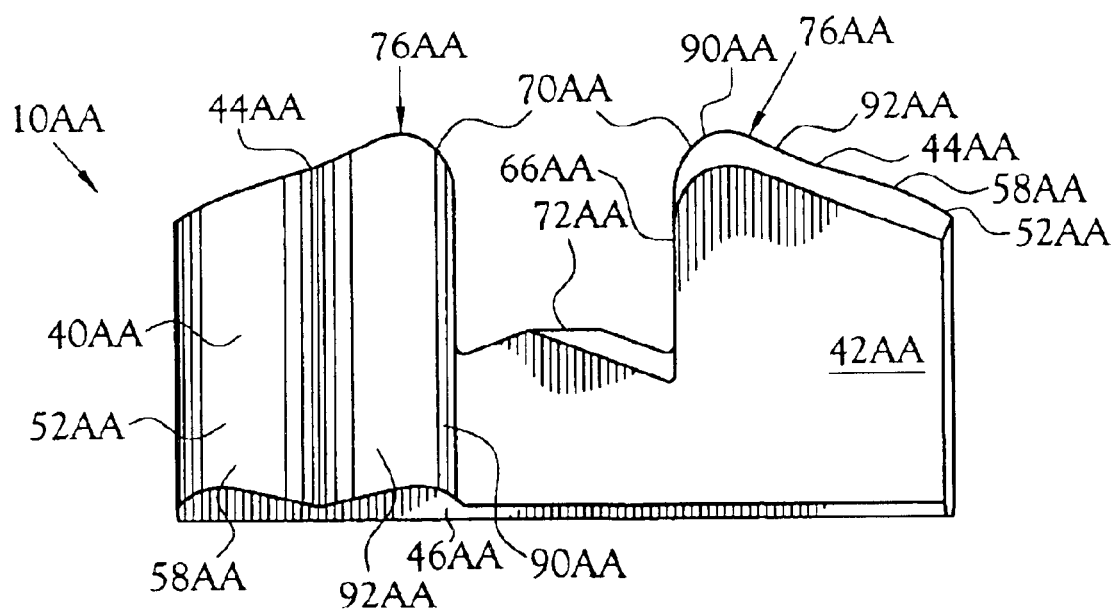
FIG. 96 is an elevation view of the roof bit blade insert of FIG. 95.

FIGS. 95–97 illustrate a further alternate embodiment of the roof bit blade insert 10AA of the present invention. The blade 10AA defines the opposing faces 38AA which are parallel to one another. A rectangular notch 66AA is defined at the center of the blade 10AA. A curved transition 70AA is provided to allow for grinding of the blade 10AA without immediately defining a point at the top of the cutting edge 44AA, thereby strengthening the transition 70AA and extending the life of the blade 10AA. A drill point 72AA is defined at the bottom of the notch 66AA to assist in breaking material left in the center of the bore hole.

The leading end 40AA of each face 38AA defines a half-butterfly protrusion 58AA. The leading end 40AA of each face 38AA further defines a protrusion 52AA, which is a curved relief surface transitioning from the protrusion 58AA to the end of the blade 10AA. Each of the leading ends 40AA defines a medial protrusion 76AA defining a radiused surface 90AA terminating at the rectangular notch 66AA and a sloped surface 92AA terminating proximate the half-butterfly protrusion 58AA.

The half-butterfly protrusion 58AA and the medial protrusions 76AA of the preferred embodiment interfere with the slot 16 of the conventional drill body 12. Accordingly, as illustrated in FIG. 97, the blade 10AA is used in association with the drill body 12H illustrated in FIG. 94, which defines orthogonal slots 17H to evacuate material broken in the center notch 66AA. The drill body leading end beveled recess 28H is configured to closely receive the half-butterfly protrusion 58AA. The medial recess 80H is configured to receive the medial protrusions 76AA. While the blade 10AA is illustrated as having parallel faces 38AA, and without trailing end protrusions 54, it will be understood that the blade 10AA may be modified to include tapered faces 38AA and/or trailing end protrusions 54 which have been fully described herein in association with other blades 10.

Figure 101:
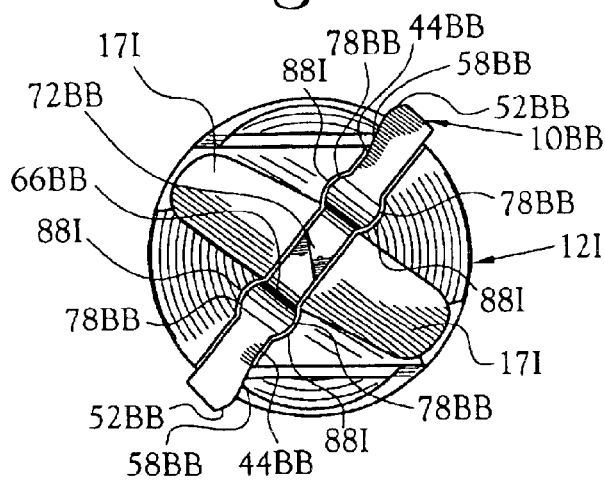
FIG. 101 is a top plan view of the roof bit blade insert of FIG. 99 inserted in the drill body of FIG. 98.
Figure 99:
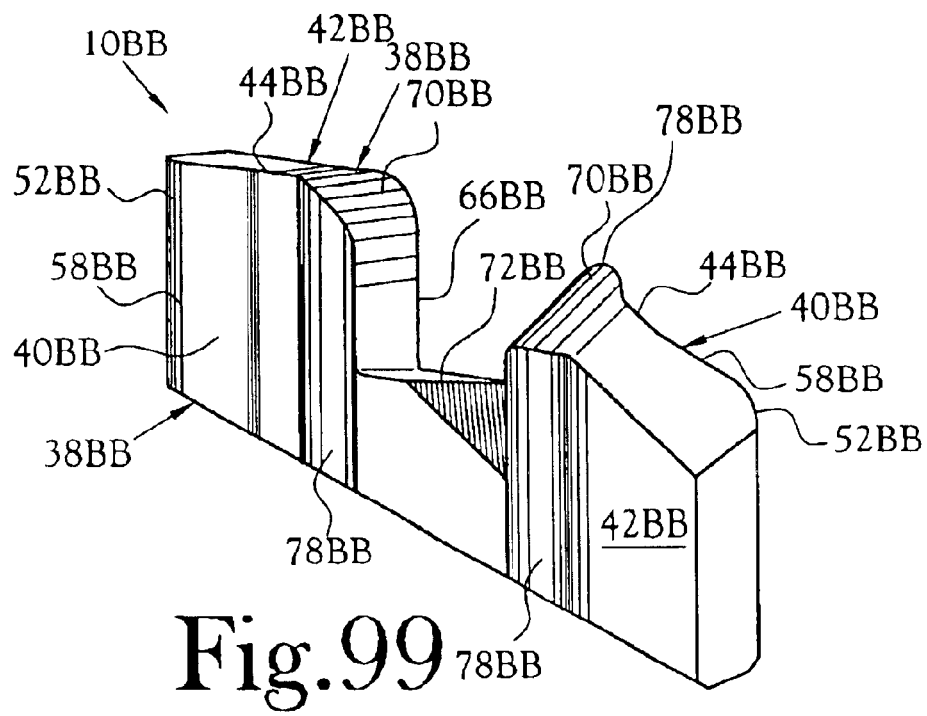
FIG. 99 is a perspective view of a further alternate embodiment of the roof bit blade insert of the present invention wherein the opposing faces are parallel to one another, wherein a rectangular center notch is defined, wherein a drill point is defined at the bottom of the center notch, wherein the leading end of each face defines a half-butterfly protrusion and a curved relief surface transitioning from the protrusion to the end of the blade, and wherein each of the leading ends and the trailing ends of each face defines a medial protrusion which defines a radiused surface terminating at the rectangular notch and toward the distal end of the face.
Figure 100:
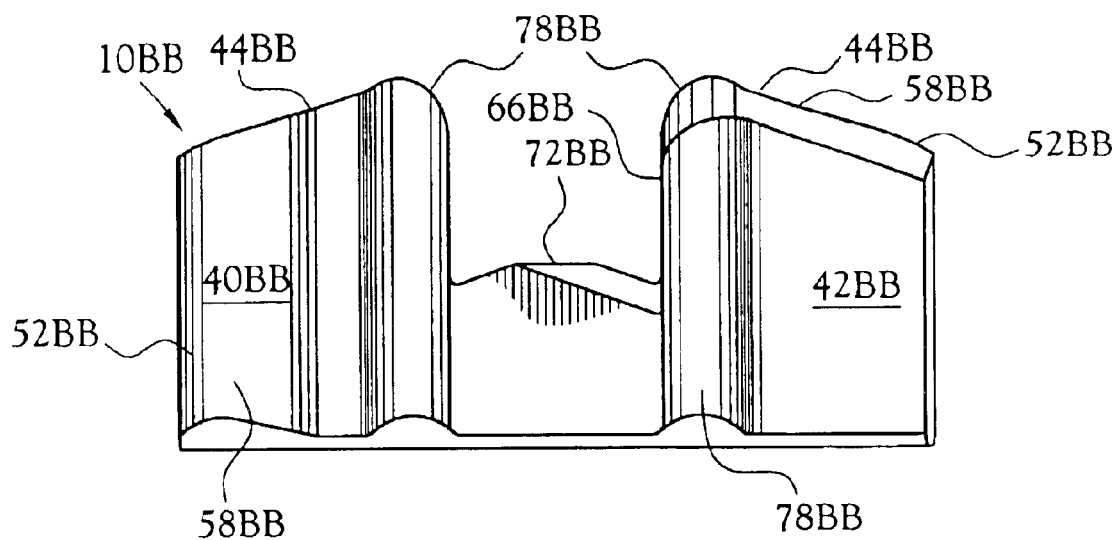
FIG. 100 is an elevation view of the roof bit blade insert of FIG. 99.

FIGS. 99–101 illustrate a further alternate embodiment of the roof bit blade insert 10BB of the present invention. The blade 10BB defines the opposing faces 38BB which are parallel to one another. A rectangular notch 66BB is defined at the center of the blade 10BB. A curved transition 70BB is provided to allow for grinding of the blade 10BB without immediately defining a point at the top of the cutting edge 44BB, thereby strengthening the transition 70BB and extending the life of the blade 10BB. A drill point 72BB is defined at the bottom of the notch 66BB to assist in breaking material left in the center of the bore hole.

The leading end 40BB of each face 38BB defines a half-butterfly protrusion 58BB. The leading end 40BB of each face 38BB further defines a protrusion 52BB, which is a curved relief surface transitioning from the protrusion 58BB to the end of the blade 10BB. Each of the leading ends 40BB and the trailing ends 42BB of each face 38BB defines a medial protrusion 78BB which defines a radiused surface terminating at the rectangular notch 66BB and toward the distal end of the face 38BB.

The half-butterfly protrusion 58BB and the medial protrusions 78BB of the preferred embodiment interfere with the slot 16 of the conventional drill body 12. Accordingly, as illustrated in FIG. 101, the blade 10BB is used in association with the drill body 12I illustrated in FIG. 98, which defines orthogonal slots 17I to evacuate material broken in the center notch 66BB. The drill body leading end beveled recess 28I is configured to closely receive the half-butterfly protrusion 58BB. Each medial recess 88G is configured to closely receive a medial protrusion 78BB. While the blade 10BB is illustrated as having parallel faces 38BB, and without trailing end protrusions 54, it will be understood that the blade 10BB may be modified to include tapered faces 38BB and/or trailing end protrusions 54 which have been fully described herein in association with other blades 10.

From the foregoing description, it will be recognized by those skilled in the art that a roof bit blade insert offering advantages over the prior art has been provided. Namely, the various embodiments of the roof bit blade inserts of the present invention each provide end protrusions. These end protrusions strengthen the ends of the blade to prolong the useful life thereof. The protrusions also assist in centering the blade in a blade body such that when brazed, the blade is centered and stresses during use are equally distributed to both of the symmetrical halves of the blade.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of the general inventive concept.

What is claimed is:

1. A roof bit blade insert adapted to be received by a drill body, said roof bit blade insert comprising:
    a blade having first and second opposing faces, each of said first and second opposing faces defining a leading end and a trailing end, said blade defining a first cutting edge on a top surface of said blade from said leading end of said first face to said trailing end of said second face and a second cutting edge on said top surface of said blade from said leading end of said second face to said trailing end of said first face, said blade further defining a protrusion at said trailing end of each of said first and second opposing faces, said protrusion being provided to strengthen said blade during use, to increase penetration, and to center said blade; and
    a drill body defining an upper end defining a transverse slot for mounting said roof bit blade insert, said slot having opposing parallel faces, said slot defining a recess adapted to receive said trailing end protrusion in a complimentary fashion.

2. The roof bit blade insert of claim 1 wherein said protrusion defines a radiused surface.

3. The roof bit blade insert of claim 2 wherein said radiused surface is defined by a compound curve.

4. The roof bit blade insert of claim 1 wherein said first and second opposing faces are vertically oriented.

5. The roof bit blade insert of claim 1 wherein said first and second opposing faces are sloped to define a taper from said top surface to a bottom surface of said blade.

6. The roof bit blade insert of claim 1 further comprising:
    a notch at the center of said top surface of said blade, said notch defining a symmetrical geometric configuration;
    a first radiused transition from said notch to said first cutting edge; and
    a second radiused transition from said notch to said second cutting edge.

7. The roof bit blade insert of claim 6 further comprising a drill point at a bottom of said notch.

8. The roof bit blade insert of claim 6 further comprising a chisel point at a bottom of said notch.

9. The roof bit blade insert of claim 6 wherein said blade further defines a medial protrusion between a center of said blade and a distal end of said blade on said trailing end of each of said first and second opposing faces, said medial protrusion being provided for strengthening said blade during use and for centering said blade in the drill body.

10. The roof bit blade insert of claim 9 wherein said medial protrusion defines a radiused surface.

11. A roof bit blade insert adapted to be received by a drill body, said roof bit blade insert comprising:
    a blade having first and second opposing faces, each of said first and second opposing faces defining a leading end and a trailing end, said blade defining a first cutting edge on a top surface of said blade from said leading end of said first face to said trailing end of said second face and a second cutting edge on said top surface of said blade from said leading end of said second face to said trailing end of said first face, said blade further defining a leading end protrusion at said leading end of each of said first and second opposing faces and a trailing end protrusion at said trailing end of each of said first and second opposing faces, each of said leading end and trailing end protrusions being provided to strengthen said blade during use, to increase penetration, and to center said blade; and
    a drill body defining an upper end defining a transverse slot for mounting said roof bit blade insert, said slot having opposing parallel faces, said slot defining a recess adapted to receive said trailing end protrusion in a complimentary fashion.

12. The roof bit blade insert of claim 11 wherein each said leading end protrusion and said trailing end protrusion defines a radiused surface.

13. The roof bit blade insert of claim 12 wherein said radiused surface is defined by a compound curve.

14. The roof bit blade insert of claim 11 wherein said leading end protrusion is defined by an outward taper of said leading end of each of said first and second opposing faces from a center of said blade to an outer edge of said blade, said drill body slot defining a recess adapted to receive said leading end protrusion in a complimentary fashion.

15. The roof bit blade insert of claim 14 further comprising a radiused relief surface transitioning from said leading end protrusion to said outer edge of said blade.

16. The roof bit blade insert of claim 11 wherein said leading end protrusion is defined by an outward taper of said leading end of each of said first and second opposing faces from an approximate midpoint between a center of said blade and an outer edge of said blade to said outer edge of said blade, said drill body slot defining a recess adapted to receive said leading end protrusion in a complimentary fashion.

17. The roof bit blade insert of claim 16 further comprising a radiused relief surface transitioning from said leading end protrusion to said outer edge of said blade.

18. The roof bit blade insert of claim 11 wherein said first and second opposing faces are vertically oriented.

19. The roof bit blade insert of claim 11 wherein said first and second opposing faces are sloped to define a taper from said top surface to a bottom surface of said blade.

20. The roof bit blade insert of claim 11 further comprising:
 a notch at the center of said top surface of said blade, said notch defining a symmetrical geometric configuration;
 a first radiused transition from said notch to said first cutting edge; and
 a second radiused transition from said notch to said second cutting edge.

21. The roof bit blade insert of claim 20 further comprising a drill point at a bottom of said notch.

22. The roof bit blade insert of claim 20 further comprising a chisel point at a bottom of said notch.

23. The roof bit blade insert of claim 20 wherein said blade further defines a medial protrusion between a center of said blade and a distal end of said blade on said leading end of each of said first and second opposing faces, said medial protrusion being provided for strengthening said blade during use and for centering said blade in the drill body.

24. The roof bit blade insert of claim 23 wherein said medial protrusion defines a radiused surface.

25. The roof bit blade insert of claim 23 wherein said medial protrusion defines a radiused surface terminating in a sloped surface toward said distal end of said blade.

26. The roof bit blade insert of claim 20 wherein said blade further defines a medial protrusion between a center of said blade and a distal end of said blade on said trailing end of each of said first and second opposing faces, said medial protrusion being provided for strengthening said blade during use and for centering said blade in the drill body.

27. The roof bit blade insert of claim 26 wherein said medial protrusion defines a radiused surface.

28. A roof bit blade insert adapted to be received by a drill body, the drill body defining an upper end defining a transverse slot for mounting said roof bit blade insert, said slot having opposing parallel faces, a lower end of the drill body defining an axial bore adapted to be fitted on a drill steel, said roof bit blade insert comprising:
 a blade having first and second opposing faces, each of said first and second opposing faces defining a leading end and a trailing end, said blade defining a first cutting edge on a top surface of said blade from said leading end of said first face to said trailing end of said second face and a second cutting edge on said top surface of said blade from said leading end of said second face to said trailing end of said first face, said blade further defining a protrusion defining a radiused surface at said leading end of each of said first and second opposing faces, said protrusion being provided to strengthen said blade during use, to increase penetration, and to center said blade in the drill body.

29. The roof bit blade insert of claim 28 wherein said radiused surface is defined by a compound curve.

30. A roof bit blade insert adapted to be received by a drill body, the drill body defining an upper end defining a transverse slot for mounting said roof bit blade insert, said slot having opposing parallel faces, a lower end of the drill body defining an axial bore adapted to be fitted on a drill steel, said roof bit blade insert comprising:
 a blade having first and second opposing faces, each of said first and second opposing faces defining a leading end and a trailing end, said blade defining a first cutting edge on a top surface of said blade from said leading end of said first face to said trailing end of said second face and a second cutting edge on said top surface of said, blade from said leading end of said second face to said trailing end of said first face, said blade further defining a protrusion at said leading end of each of said first and second opposing faces, said protrusion being provided to strengthen said blade during use, to increase penetration, and to center said blade in the drill body, said protrusion being defined by an outward taper of said leading end of each of said first and second opposing faces from a center of said blade to an outer edge of said blade, said drill body slot defining a recess adapted to receive said leading end protrusion in a complimentary fashion.

31. The roof bit blade insert of claim 30 further comprising a radiused relief surface transitioning from said leading end protrusion to said outer edge of said blade.

32. A roof bit blade insert adapted to be received by a drill body, the drill body defining an upper end defining a transverse slot for mounting said roof bit blade insert, said slot having opposing parallel faces, a lower end of the drill body defining an axial bore adapted to be fitted on a drill steel, said roof bit blade insert comprising:
 a blade having first and second opposing faces, each of said first and second opposing faces defining a leading end and a trailing end, said blade defining a first cutting edge on a top surface of said blade from said leading end of said first face to said trailing end of said second face and a second cutting edge on said top surface of said blade from said leading end of said second face to said trailing end of said first face, said blade further defining a protrusion at said leading end of each of said first and second opposing faces, said protrusion being provided to strengthen said blade during use, to increase penetration, and to center said blade in the drill body, said protrusion being defined by an outward taper of said leading end of each of said first and second opposing faces from an approximate midpoint between a center of said blade and an outer edge of said blade to said outer edge of said blade, said drill body slot defining a recess adapted to receive said leading end protrusion in a complimentary fashion.

33. The roof bit blade insert of claim 32 further comprising a radiused relief surface transitioning from said leading end protrusion to said outer edge of said blade.

34. A roof bit blade insert adapted to be received by a drill body, the drill body defining an upper end defining a transverse slot for mounting said roof bit blade insert, said slot having opposing parallel faces, a lower end of the drill body defining an axial bore adapted to be fitted on a drill steel, said roof bit blade insert comprising:
 a blade having first and second opposing faces, each of said first and second opposing faces defining a leading end and a trailing end, said blade defining a first cutting edge on a top surface of said blade from said leading end of said first face to said trailing end of said second face and a second cutting edge on said top surface of said blade from said leading end of said second face to said trailing end of said first face, said first and second opposing faces being sloped to define a taper from said top surface to a bottom surface of said blade, said blade further defining a protrusion at said leading end of each of said first and second opposing faces, said protrusion being provided to strengthen said blade during use, to increase penetration, and to center said blade in the drill body.

35. A roof bit blade insert adapted to be received by a drill body, the drill body defining an upper end defining a transverse slot for mounting said roof bit blade insert, said slot having opposing parallel faces, a lower end of the drill body defining an axial bore adapted to be fitted on a drill steel, said roof bit blade insert comprising;
- a blade having first and second opposing faces, each of said first and second opposing faces defining a leading end and a trailing end;
- a first cutting edge on a top surface of said blade from said leading end of said first face to said trailing end of said second face and a second cutting edge on said top surface of said blade from said leading end of said second face to said trailing end of said first face;
- a protrusion at said leading end of each of said first and second opposing faces, said protrusion being provided to strengthen said blade during use, to increase penetration, and to center said blade in the drill body;
- a notch at the center of said top surface of said blade, said notch defining a symmetrical geometric configuration;
- a drill point at a bottom of said notch;
- a first radiused transition from said notch to said first cutting edge; and
- a second radiused transition from said notch to said second cutting edge.

36. A roof bit blade insert adapted to be received by a drill body, the drill body defining an upper end defining a transverse slot for mounting said roof bit blade insert, said slot having opposing parallel faces, a lower end of the drill body defining an axial bore adapted to be fitted on a drill steel, said roof bit blade insert comprising:
- a blade having first, and second opposing faces, each of said first and second opposing faces defining a leading end and a trailing end;
- a first cutting edge on a top surface of said blade from said leading end of said first face to said trailing end of said second face and a second cutting edge on said top surface of said blade from said leading end of said second face to said trailing end of said first face;
- a protrusion at said leading end of each of said first and second opposing faces, said protrusion being provided to strengthen said blade during use, to increase penetration, and to center said blade in the drill body;
- a notch at the center of said top surface of said blade, said notch defining a symmetrical geometric configuration;
- a chisel point at a bottom of said notch;
- a first radiused transition from said notch to said first cutting edge; and
- a second radiused transition from said notch to said second cutting edge.

37. A roof bit blade insert adapted to be received by a drill body, the drill body defining an upper end defining a transverse slot for mounting said roof bit blade insert, said slot having opposing parallel faces, a lower end of the drill body defining an axial bore adapted to be fitted on a drill steel, said roof bit blade insert comprising:
- a blade having first and second opposing faces, each of said first and second opposing faces defining a leading end and a trailing end;
- a first cutting edge on a top surface of said blade from said leading end of said first face to said trailing end of said second face and a second cutting edge on said top surface of said blade from said leading end of said second face to said trailing end of said first face;
- a protrusion at said leading end of each of said first and second opposing faces, said protrusion being provided to strengthen said blade during use, to increase penetration, and to center said blade in the drill body;
- a notch at the center of said top surface of said blade, said notch defining a symmetrical geometric configuration;
- a first radiused transition from said notch to said first cutting edge;
- a second radiused transition from said notch to said second cutting edge; and
- a medial protrusion between a center of said blade and a distal end of said blade on said leading end of each of said first and second opposing faces, said medial protrusion being provided for strengthening said blade during use and for centering said blade in the drill body.

38. The roof bit blade insert of claim 37 wherein said medial protrusion defines a radiused surface.

39. The roof bit blade insert of claim 37 wherein said medial protrusion defines a radiused surface terminating in a sloped surface toward said distal end of said blade.

* * * * *